United States Patent
Kinoshita et al.

(10) Patent No.: US 6,873,457 B2
(45) Date of Patent: Mar. 29, 2005

(54) OPTICAL AMPLIFIER, EXCITATION LIGHT SOURCE CONTROL METHOD FOR USE IN OPTICAL AMPLIFIER, AND OPTICAL AMPLIFIER CONTROL METHOD

(75) Inventors: Susumu Kinoshita, Kawasaki (JP); Terumi Chikama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/352,941

(22) Filed: Jan. 29, 2003

(65) Prior Publication Data

US 2003/0147123 A1 Aug. 7, 2003

Related U.S. Application Data

(62) Division of application No. 09/404,789, filed on Sep. 24, 1999, now Pat. No. 6,542,291, which is a continuation of application No. PCT/JP98/02515, filed on Jun. 5, 1998.

(30) Foreign Application Priority Data

Feb. 6, 1998 (JP) .......................................... 10-026249

(51) Int. Cl.[7] .............................................. H01S 3/00
(52) U.S. Cl. ............................. 359/341.3; 359/337.12
(58) Field of Search ........................ 359/341.3, 337.12, 359/341.31, 341.32, 341.41, 184, 160; 372/70; 398/181

(56) References Cited

U.S. PATENT DOCUMENTS

| | | | |
|---|---|---|---|
| 5,510,926 A | 4/1996 | Bayart et al. | |
| 5,764,404 A | 6/1998 | Yemane et al. | |
| 5,805,322 A | 9/1998 | Tomofuji | |
| 5,815,613 A | * 9/1998 | Fatehi et al. | 385/22 |
| 5,859,938 A | 1/1999 | Nabeyama et al. | |
| 5,861,980 A | 1/1999 | Ono | |
| 5,966,236 A | * 10/1999 | Okuno | 359/337 |
| 6,023,366 A | 2/2000 | Kinoshita | |
| 6,025,947 A | 2/2000 | Sugaya et al. | |
| 6,055,092 A | 4/2000 | Sugaya et al. | |
| 6,266,169 B1 | 7/2001 | Tomooka et al. | |
| 6,373,625 B1 | 4/2002 | Kobayashi et al. | |

FOREIGN PATENT DOCUMENTS

| | | |
|---|---|---|
| EP | 467396 | 1/1992 |
| EP | 637148 | 2/1995 |
| EP | 0805571 A2 | 11/1997 |
| EP | 0812078 A2 | 12/1997 |
| GB | 2280561 | 2/1995 |
| GB | 2294170 | 4/1996 |
| JP | 4-9929 | 1/1992 |
| JP | 4-165334 | 6/1992 |
| JP | 4-9829 | 7/1992 |
| JP | 4-3029 | 8/1992 |
| JP | 5-235445 | 9/1993 |
| JP | 6-53587 | 2/1994 |
| JP | 6-97883 | 4/1994 |
| JP | 7-147445 | 6/1995 |
| JP | 8-95097 | 4/1996 |
| JP | 10-12951 | 1/1998 |
| JP | 10-22979 | 1/1998 |
| JP | 10-51057 | 2/1998 |

OTHER PUBLICATIONS

"Design of Operational Amplifier Circuit, " written by M. Okamura, published in Sep. 30, 1990, pp. 77–85.

(Continued)

Primary Examiner—Mark Hellner
(74) Attorney, Agent, or Firm—Staas & Halsey LLP

(57) ABSTRACT

An optical amplifier for use in, for example, a wavelength multiplexing optical communication system, in order to allow an excitation light source to be enlargeable or removable in accordance with an increase/decrease in the number of channels in signal light even if the optical communication system is in operation.

67 Claims, 27 Drawing Sheets

OTHER PUBLICATIONS

Technical Report of IEICE by T. Kashiwada, et al., entitled "Al Concentration Dependence of Amplification Characteristics of EDF," 1997, p. 273.

Technical Report of IEICE by M. Yamada, et al., entitled "Fluoride–Based ER–Doped Fiber Amplifier with Inherently Flat Gain Spectrum" in 1995, pp. 13–18.

"Advanced Electronics Series 1–16" written by S. Kawakama, et al., published Jul. 10, 1996, pp. 70–73.

D. Baney, et al., "WDM EDFA Gain Characterization with a Reduced Set of Saturating Channels," IEEE Photonics Technology Letters, vol. 8, No. 12, Dec. 1996, pp. 1615–1617.

* cited by examiner

※ Vzd DENOTES ABSOLUTE VALUE OF VOLTAGE PRESCRIBED WITH BIDIRECTIONAL ZENER DIODE (±Vzd).

OPTICAL AMPLIFIER, EXCITATION LIGHT SOURCE CONTROL METHOD FOR USE IN OPTICAL AMPLIFIER, AND OPTICAL AMPLIFIER CONTROL METHOD

This application is a divisional of application Ser. No. 09/404,789, filed Sep. 24, 1999, now U.S. Pat. No. 6,542, 291, which is a continuation application filed under 35 USC §111(a), based on International Application PCT/JP98/02515, filed Jun. 5, 1998, it being further noted that priority is based on Japanese Patent Application HEI 10-026249, filed Feb. 6, 1998.

TECHNICAL FIELD

The present invention relates to an optical amplifier, a method of controlling an excitation light source in an optical amplifier, and a method of controlling an optical amplifier which are suitably employed for use in, for example, a wavelength multiplexing optical communication system, when increasing or decreasing the number of channels in signal light (the number of wavelengths to be multiplexed in signal light) while the system is in operation.

BACKGROUND ART

In the recent years, wavelength multiplexing optical communication systems have been investigated and developed very actively, and studies have taken place to develop a system which is capable of increasing the number of channels in signal light in answer to the demand for communications.

In addition, a desire exists to upgrade the amplification scale of an optical amplifier, being an essential component of this wavelength multiplexing optical communication system, in accordance with the increase in the number of channels. A similar need also exists on an optical amplifier included in a light wave network or the like.

To meet such a requirement, consideration may be given to a construction in which an optical amplifier capable of amplifying multi-wavelength (for example, approximately 32 channels) multiplexed signal light is introduced from the initial operation into an optical communication system, thus coping with the increase in the number of channels.

In this instance, although being equipped with an excitation light source, for handling the multi-wavelength multiplexed signal light, the optical amplifier is required to be provided with an excitation light source which is capable of supplying a large quantity of excitation light.

However, in addition to the fact that the excitation light source is usually expensive, a small number of channels (for example, approximately 4 channels) are frequently used at the beginning of the system operation, and therefore, if such an optical amplifier capable of dealing with multi-wavelength multiplexed signal light is employed from the first system operation, there is a problem in that the initial investment for the equipment increases to lower the investment efficiency.

For this reason, in order to enhance the equipment investment efficiency, consideration can be given to that another excitation light source is added to the existing optical amplifier in accordance with an increase in the number of channels in signal light while the optical communication system is in operation.

However, if the additional excitation light source is introduced into the control loop of the preexisting excitation light source, the control of these excitation light sources can frequently go unstable. More specifically, supposing that the quantity of an excitation light required for when the optical amplifier obtains a predetermined gain (excitation optical power) is P, difficulty is encountered to singly determine the combination of excitation optical powers of these two excitation light sources to be P in total, so that a plurality of stable operating points appear, which results in unstable excitation light source control.

On the other hand, consideration should also be given to the fact that, after an additional excitation light source is installed to increase the number of channels in signal light, the number of channels is decreased depending on the demand for communications while the optical communication system is in operation, and further, that a need can occur to remove the additionally installed excitation light source.

Accordingly, in the optical communication system being in operation, in order to coping with the increase/decrease in the number of channels, there is a need to provide a construction which allows the installation or the removal of an additional excitation light source without interfering with the working channels.

The present invention has been developed in consideration of such problems, and it is therefore an object of this invention to provide an optical amplifier, an excitation light source control method for use in an optical amplifier and an optical amplifier control method which are capable of stably installing or removing an additional excitation light source in accordance with an increase/decrease in the number of channels in signal light even if the optical communication system is in operation.

DISCLOSURE OF THE INVENTION

For this purpose, an optical amplifier according to this invention comprises an optical amplifying section for amplifying and outputting inputted signal light, a plurality of excitation light sources each for supplying excitation light to the optical amplifying section and an excitation light source control section for controlling operations of the excitation light sources, wherein the excitation light sources are composed of a main excitation light source, whose output amount of the excitation light to be supplied to the optical amplifying section is to be controlled by the excitation light source control section, and an auxiliary excitation light source, whose output of excitation light to be supplied to the optical amplifying section is to be turned on/off under control by the excitation light source control section in accordance with an increase/decrease in the number of channels in signal light to be inputted to the optical amplifying section, and the excitation light source control section includes a control section, which executes control so that the main excitation light source supplies excitation light to the optical amplifying section when the number of channels in signal light to be inputted to the optical amplifying section is equal to or less than a predetermined number of channels, and the main excitation light source and the auxiliary excitation light source cooperatively supply excitation light to the optical amplifying section when the number of channels in the signal light is more than the predetermined number of channels.

Furthermore, an optical amplifier according to this invention comprises an optical amplifying section for amplifying and outputting inputted signal light, a plurality of excitation light sources each for supplying excitation light to the optical amplifying section and an excitation light source control section for controlling operations of the excitation light sources, wherein the excitation light sources are composed of main and auxiliary excitation light sources in which output amounts of the excitation light to be supplied to the optical amplifying section are to be controlled by the excitation light source control section, and the excitation light source control section includes a control section, which executes control so that the main excitation light source supplies excitation light to the optical amplifying section when the number of channels in signal light to be inputted to the optical amplifying section is equal to or less than a predetermined number of channels, and the main excitation light source and the auxiliary excitation light source cooperatively supply excitation light to the optical amplifying section when the number of channels in the signal light is more than the predetermined number of channels.

On the other hand, according to this invention, there is provided an excitation light source control method for use in an optical amplifier which comprises an optical amplifying section for amplifying and outputting inputted signal light, a plurality of excitation light sources each for supplying excitation light to the optical amplifying section and an excitation light source control section for controlling operations of the excitation light sources, with the excitation light sources being composed of a main excitation light source, made so that the output amount of the excitation light to be supplied to the optical amplifying section is to be controlled by the excitation light source control section and an auxiliary excitation light source, whose output of excitation light to be supplied to the optical amplifying section is to be turned on/off under control by the excitation light source control section, in a state where the main excitation light source supplies the excitation light the amount of which corresponds to the number of channels in signal light to be inputted to the optical amplifying section, when the number of channels in signal light to be inputted to the optical amplifying section is more than a predetermined number of channels, the main excitation light source is controlled to output excitation light in a quantity corresponding to the number of channels in the signal light and the auxiliary excitation light source is subsequently controlled to output the excitation light so that a quantity of the excitation light outputted from the auxiliary excitation light source increases, and the total amount of excitation light outputted from the main excitation light source and the auxiliary excitation light source corresponds to the number of channels.

Moreover, according to this invention, there is provided an excitation light source control method according to this invention for use in an optical amplifier which comprises an optical amplifying section for amplifying and outputting inputted signal light, a plurality of excitation light sources each for supplying excitation light to the optical amplifying section and an excitation light source control section for controlling operations of the excitation light sources, with the excitation light sources being composed of main and auxiliary excitation light sources in which the output quantities of their excitation light to be supplied to the optical amplifying section are controlled by the excitation light source control section, in a state where the main excitation light source supplies the excitation light whose quantity corresponds to the number of channels in signal light to be inputted to the optical amplifying section, when the number of channels in signal light to be inputted to the optical amplifying section is more than a predetermined number of channels, the main excitation light source is controlled to output the excitation light in a quantity corresponding to the number of channels in the signal light and the auxiliary excitation light source is subsequently controlled to output the excitation light, and further, the total amount of excitation light outputted from the main excitation light source and the auxiliary excitation light source are controlled to correspond to the number of channels.

Furthermore, according to this invention, there is provided an excitation light source control method for use in an optical amplifier which comprises an optical amplifying section for amplifying and outputting inputted signal light, a plurality of excitation light sources each for supplying excitation light to the optical amplifying section and an excitation light source control section for controlling operations,of the excitation light sources, with the excitation light sources being composed of a main excitation light source, whose output quantity of the excitation light to be supplied to the optical amplifying section is to be controlled by the excitation light source control section and an auxiliary excitation light source, whose output of excitation light to be supplied to the optical amplifying section is to be turned on/off under control by the excitation light source control section, in a state where the main excitation light source and the auxiliary excitation light source cooperatively supply the excitation light whose quantity corresponds to the number of channels in signal light to be inputted to the optical amplifying section, when the number of channels in signal light to be inputted to the optical amplifying section is equal to or less than a predetermined number of channels, the output of excitation light from the auxiliary excitation light source is stopped, and subsequently, the main excitation light source is controlled to output the excitation light whose quantity corresponds to the number of channels in the signal light after decreased.

Still further, according to this invention, there is provided an excitation light source control method for use in an optical amplifier which comprises an optical amplifying section for amplifying and outputting inputted signal light, a plurality of excitation light sources each for supplying excitation light to the optical amplifying section and an excitation light source control section for controlling operations of the excitation light sources, with the excitation light sources being composed of main and auxiliary excitation light sources, in which the output amounts of their excitation light to be supplied to the optical amplifying section are to be controlled by the excitation light source control section, in a state where the main excitation light source and the auxiliary excitation light source cooperatively output excitation light in a quantity corresponding to the number of channels in signal light inputted to the optical amplifying section, when the number of channels in signal light inputted to the optical amplifying section becomes equal to or less than a predetermined number of channels, the output of excitation light from the auxiliary excitation light source is stopped and the main excitation light source is subsequently controlled to output excitation light in a quantity corresponding to the number of channels in the signal light after decreased.

An optical amplifier according to this invention includes an amplification optical fiber, wherein the amplification optical fiber is doped with a rare earth element and receives a plurality of optical signals different in wavelength from each other, with the optical amplifier being designed so that an increase/decrease in the number of excitation light sources, which supply excitation light thereto, are allowed in accordance with the number of optical signals to be inputted.

Moreover, a method of controlling an optical amplifier according to this invention comprises identifying a number of optical signals having different wavelengths, and varying the number of excitation light sources, which supply excitation light to an amplification optical fiber receiving a plurality of optical signals, in accordance with the number of optical signals.

Thus, according to this invention, there is an advantage in that, even in the case that the output of excitation light from the auxiliary light source is controlled in connection with the increase/decrease in the number of channels in inputted signal light, excitation light can be supplied to the optical amplifying section in a quantity corresponding to the number of channels increased or decreased without adversely affecting the channels being in operation. Accordingly, even if the optical communication system is in operation, it is possible to stably install or remove the auxiliary excitation light source in accordance with the increase/decrease in the number of channels in signal light.

BEST MODE FOR CARRYING OUT THE INVENTION (a) Description of the Principle of this Invention The description begins from the principle of this invention.

Figure 1:
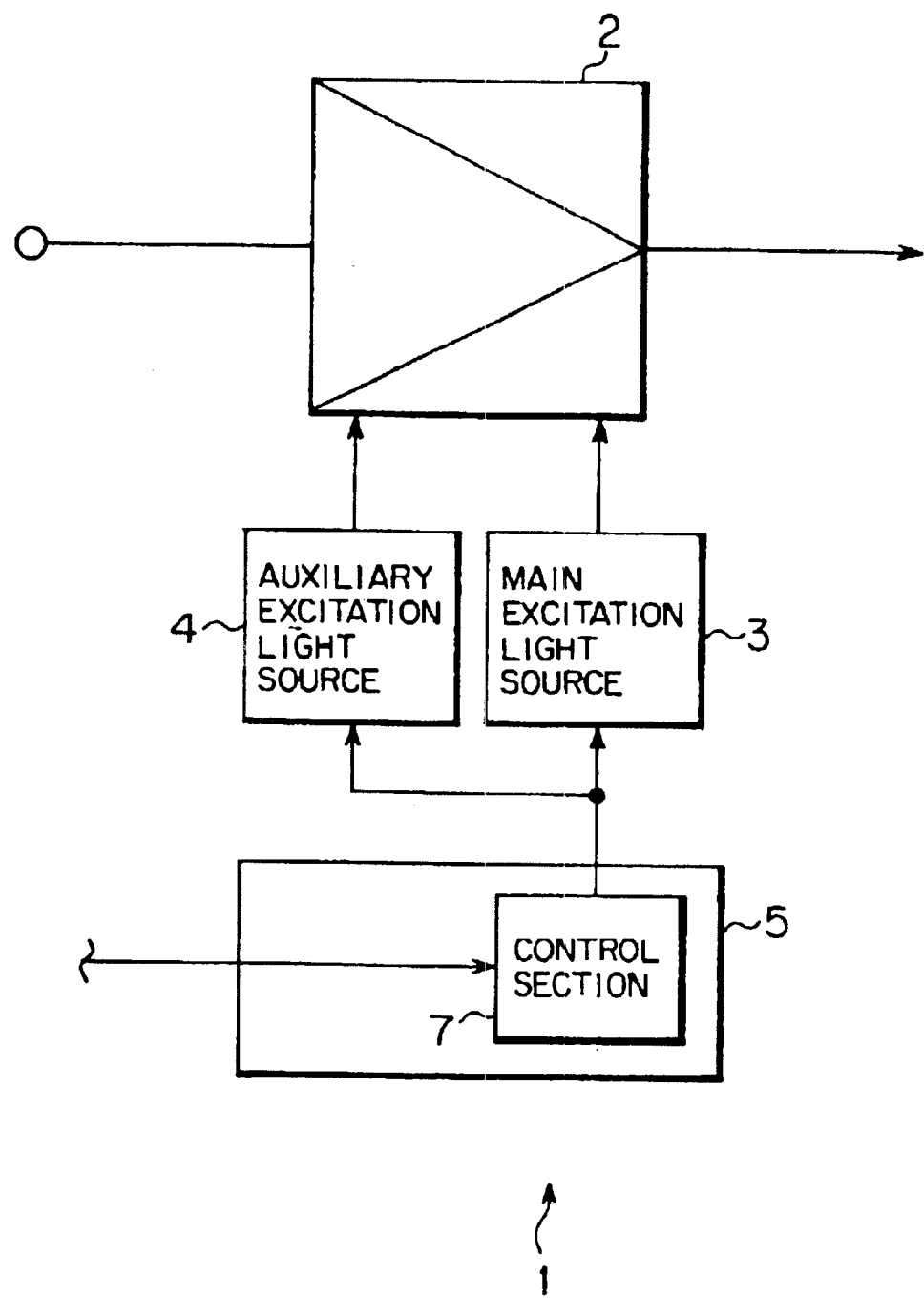
FIG. 1 is a block diagram showing the principle of a construction of an optical amplifier according to the present invention.

FIG. 1 is a block diagram showing the principle of a construction of an optical amplifier according to this invention, and the optical amplifier 1 shown in FIG. 1 is composed of an optical amplifying section 2 for amplifying inputted signal light and for outputting it, a plurality of excitation light sources (a main excitation light source 3 and an auxiliary excitation light source 4) each for supplying excitation light to the optical amplifying section 2, and an excitation light source control section 5.

The main excitation light source 3 is designed so that its excitation light output quantity to be supplied to the optical amplifying section 2 is under the control of the excitation light source control section 5.

Furthermore, the auxiliary excitation light source 4 is designed so that its output of excitation light to be supplied to the optical amplifying section is to be turned on/off under control by the excitation light source control section 5 according to an increase/decrease of the number of channels in signal light to be inputted to the optical amplifying section 2.

Still further, the excitation light source control section 5 is for controlling the operations of the aforesaid excitation light sources 3, 4, and includes a control section 7 which, when the number of channels in signal light to be inputted to the optical amplifying section 2 is equal to or less than a predetermined number of channels, controls the main excitation light source 3 so that it supplies excitation light to the optical amplifying section 2, while, when the number of channels in the signal light is more than the predetermined number of channels, controls the main excitation light source 3 and the auxiliary excitation light source 4 so that they cooperatively supply the excitation light to the optical amplifying section 2.

Besides, in the optical amplifier 1 shown in FIG. 1, it is also appropriate that the aforesaid excitation light sources 3, 4 are composed of main and auxiliary excitation light sources 3, 4 in which the output amounts of their excitation light to be supplied to the optical amplifying section 2 are to be controlled by the excitation light source control section 5, and the excitation light source control section 5 is provided with the control section 7 which executes the control whereby the main excitation light source 3 supplies its excitation light to the optical amplifying section 2 when the number of channels in signal light to be inputted to the optical amplifying section 2 is equal to or less than a predetermined number of channels while the main excitation light source 3 and the auxiliary excitation light source 4 cooperatively supply excitation light to the optical amplifying section 2 when the number of channels in the signal light is more than the predetermined number of channels.

In this case, for a good compromise, in the main excitation light source 3, the output amount of the excitation light to be given to the optical amplifying section 2 is controlled in an analog way by the excitation light source control section 5, while the auxiliary excitation light source 4 develops one figure smaller ratio between the control gain and the control time constant smaller than the ratio between the control gain and the control time constant of the main excitation light source 3 and the output amount of the excitation light to be given to the optical amplifying section 2 is analog-controlled by the excitation light source control section 5.

In this instance, preferably, the excitation light source control section 5 has a primary low-frequency transmission characteristic.

Furthermore, preferably, the optical amplifier 1 shown in FIG. 1 is equipped with a temperature control section for controlling the temperature in the vicinity of the auxiliary excitation light source 4.

The predetermined number of channels mentioned here signifies the number of channels corresponding to the maximum excitation light quantity the main excitation light source 3 is expected to supply.

Still further, the aforesaid excitation light source control section 5 can be made to recognize the number of channels in signal light to be inputted to the optical amplifying section 2 on the basis of number-of-channel information coming from the signal light input side.

Moreover, the aforesaid excitation light source control section 5 can also be constructed to decide, on the basis of information on an operating condition of the main excitation light source 3, whether or not the number of channels in signal light to be inputted to the optical amplifying section 2 is greater than a predetermined number of channels. Incidentally, as the information on the operating condition of the main excitation light source 3, it is possible to use information about a drive current for operating the main excitation light source 3, to use information about a leakage light quantity from the main excitation light source 3, or to use information about an excitation light quantity separated from the main excitation light source 3.

Besides, the excitation light source control section 5 can also be made to decide, on the basis of the monitored result of a power of inputted signal light, whether or not the number of channels in signal light to be inputted to the optical amplifier 2 is greater than a predetermined number of channels.

Furthermore, the optical amplifier 1 shown in FIG. 1 can be equipped with a switching section which switches the control to be executed for the optical amplifying section 2 between level-fixing control and gain-fixing control.

In this instance, the switching section can switch the control for the optical amplifying section 2 from the gain-fixing control to the level-fixing control when the excitation light source control section 5 controls the output of excitation light from the auxiliary excitation light source 4.

Still further, the control section 7 can also be constructed to, when recognizing that the output side end portion of the optical amplifier 2 is in an open condition, adjust the total amounts of excitation light from the main excitation light source 3 and the auxiliary excitation light source 4 for lowering the level of the outputting signal light of the optical amplifying section 2 to below a predetermined value, while, when recognizing that the output side end portion goes into a connected condition, adjusting the excitation light amount from the main excitation light source 3 for setting the level of the outputting signal light of the optical amplifying section 2 at a normal value with maintaining the outputting state of the auxiliary excitation light source 4, conforming to the decision result by an decision section 6.

An excitation light source control method according to this invention for use in an optical amplifier comprising an optical amplifying section for amplifying inputted signal light and for outputting it, a plurality of excitation light sources each for supplying excitation light to the optical amplifying section and an excitation light source control section for controlling operations of the excitation light sources, with the excitation light sources being composed of a main excitation light source, in which the output amount of its excitation light to be supplied to the optical amplifying section is to be controlled by the excitation light source control section, and an auxiliary excitation light source, whose output of excitation light to be supplied to the optical amplifying section is to be turned on/off under control by the excitation light source control section, is characterized in that, in a state where the main excitation light source outputs excitation light in a quantity corresponding to the number of channels in signal light inputted to the optical amplifying section, when the number of channels in the signal light inputted to the optical amplifying section exceeds a predetermined number of channels, the main excitation light source is controlled to output excitation light in an amount corresponding to the number of channels in the signal light, and the auxiliary excitation light source is subsequently controlled to output excitation light so that the excitation light amount from the auxiliary excitation light source increases, and the total amount of excitation light from the main excitation light source and the auxiliary excitation light source is controlled to reach a quantity corresponding to the number of channels.

Furthermore, an excitation light source control method according to this invention for use in an optical amplifier comprising an optical amplifying section for amplifying inputted signal light and for outputting it, a plurality of excitation light sources each for supplying excitation light to the optical amplifying section and an excitation light source control section for controlling operations of the excitation light sources, with the excitation light sources being composed of main and auxiliary excitation light sources, in which the output amounts of their excitation light to be supplied to the optical amplifying section is to be controlled by the excitation light source control section, is characterized in that, in a state where the main excitation light source outputs excitation light in a quantity corresponding to the number of channels in signal light inputted to the optical amplifying section, when the number of channels in the signal light inputted to the optical amplifying section exceeds a predetermined number of channels, the main excitation light source is controlled to output excitation light in an amount corresponding to the number of channels in the signal light, and the auxiliary excitation light source is subsequently controlled to output excitation light, and the total amount of excitation light from the main excitation light source and the auxiliary excitation light source is controlled to reach a quantity corresponding to the number of channels.

Still further, an excitation light source control method according to this invention for use in an optical amplifier comprising an optical amplifying section for amplifying inputted signal light and for outputting it, a plurality of excitation light sources each for supplying excitation light to the optical amplifying section and an excitation light source control section for controlling operations of the excitation light sources, with the excitation light sources being composed of a main excitation light source, in which the output amount of its excitation light to be supplied to the optical amplifying section is to be controlled by the excitation light source control section and an auxiliary excitation light source, whose output of excitation light to be supplied to the optical amplifying section is to be turned on/off under control by the excitation light source control section, is characterized in that, in a state where the main excitation light source and the auxiliary excitation light source cooperatively output excitation light in an amount corresponding to the number of channels in signal light inputted to the optical amplifying section, when the number of channels in the signal light inputted to the optical amplifying section is equal to or less than a predetermined number of channels, the output of excitation light from the auxiliary light source is stopped and the main excitation light source is subsequently controlled to output excitation light in an amount corresponding to the number of channels in the signal light after decreased.

Moreover, an excitation light source control method according to this invention for use in an optical amplifier comprising an optical amplifying section for amplifying inputted signal light and for outputting it, a plurality of excitation light sources each for supplying excitation light to the optical amplifying section and an excitation light source control section for controlling operations of the excitation light sources, with the excitation light sources being composed of main and auxiliary excitation light sources, in which the output amounts of their excitation light to be supplied to the optical amplifying section is to be controlled by the excitation light source control section, is characterized in that, in a state where the main excitation light source and the auxiliary excitation light source cooperatively output excitation light in an amount corresponding to the number of channels in signal light inputted to the optical amplifying section, when the number of channels in the signal light inputted to the optical amplifying section is equal to or less than a predetermined number of channels, the output of excitation light from the auxiliary light source is stopped and the main excitation light source is subsequently controlled to output excitation light in an amount corresponding to the number of channels in the signal light after decreased.

In this instance, in the above-described excitation light source control method for use in an optical amplifier, the predetermined number of channels is characterized by signifying the number of channels corresponding to the maximum excitation light quantity the main excitation light source is expected to supply.

Furthermore, a feature of the above-described excitation light source control method for use in an optical amplifier is that a guard time is taken, which is a waiting time for switching the control for the optical amplifying section between the level-fixing control and the gain-fixing control, with the switching of the number of channels in the signal light being inhibited during the guard time.

The optical amplifier according to this invention is characterized by including an amplification optical fiber doped with a rare earth element, receives a plurality of optical signals different in wavelength from each other, and designed so that an increase/decrease in the number of excitation light sources, which supply excitation light thereto, are allowed in accordance with the number of optical signals to be inputted.

Moreover, a method of controlling an optical amplifier according to this invention comprises; identifying a number of optical signals having different wavelengths, and varying the number of excitation light sources, which supply excitation light to an amplification optical fiber receiving a plurality of optical signals, accordance with the number of optical signals.

Thus, according to this invention, there is an advantage in that, even in the case that the output of the excitation light from the auxiliary light source is controlled in connection with the increase/decrease in the number of channels in inputted signal light, excitation light can be supplied to the optical amplifying section in a quantity corresponding to the number of channels increased or decreased without adversely affecting the channels being in operation. Accordingly, even if the optical communication system is in operation, it is possible to stably install or remove the auxiliary excitation light source, in accordance with the increase/decrease in the number of channels in signal light.

(b) Description of First Embodiment

An embodiment of this invention will be described hereinbelow with reference to the drawings.

(b1) Construction of Optical Amplifier according to First Embodiment

Figure 2:
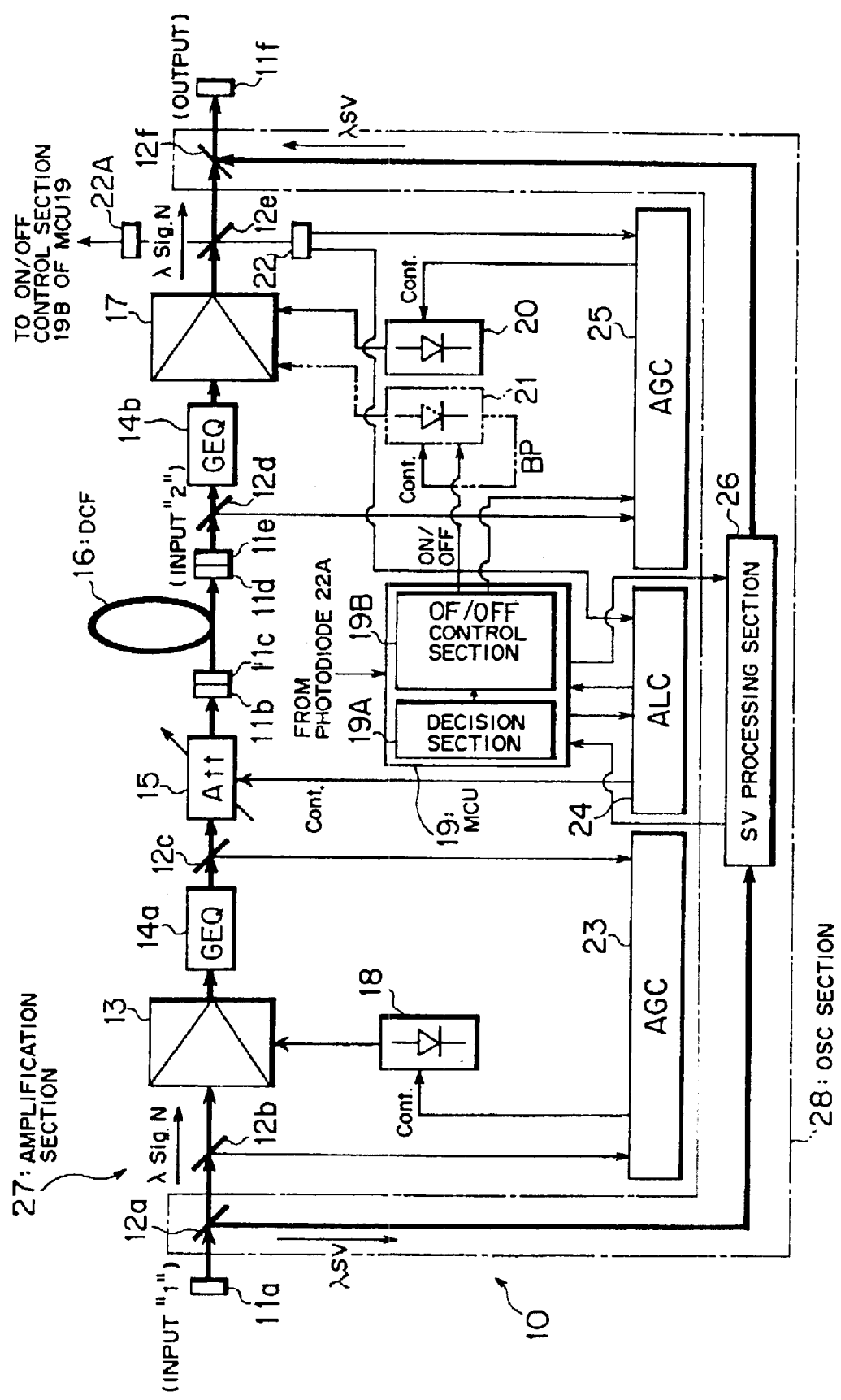
FIG. 2 is a block diagram showing a construction of an optical amplifier according to a first embodiment of this invention.
Figure 4:
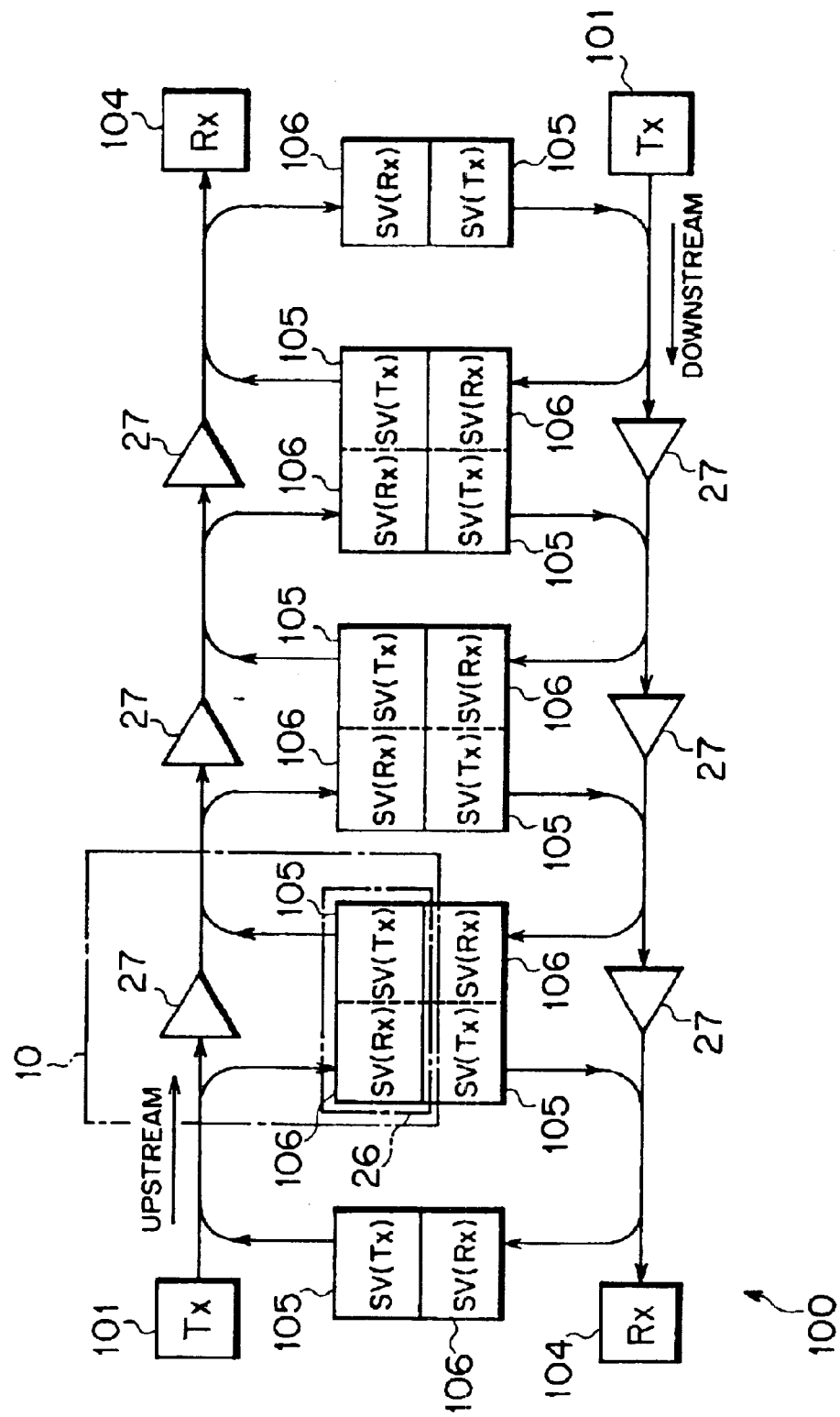
FIG. 4 is a block diagram illustratively showing a construction of a wavelength multiplexing optical communication system employing the optical amplifier according to the first embodiment of this invention.

FIG. 2 is a block diagram showing a construction of an optical amplifier according to the first embodiment of this invention, and the optical amplifier 10 shown in FIG. 2 is used as an optical in-line amplifier, which relays and amplifies signal light, for example, in a wavelength multiplexing optical communication system 100 shown in FIG. 4.

The optical communication system 100 shown in FIG. 4 covers the entire system, provided with a signal transmission section (Tx) 101 for transmitting signal light, a plurality of optical amplifiers 10 and a signal receive section (Rx) 104 on the upstream and downstream sides of signal light, respectively, and also provided with a monitoring signal transfer system, which comprises a plurality of monitoring signal transmitting sections [SV (Tx)] 105 for transmitting and transferring a monitoring signal and a plurality of monitoring signal receiving sections [SV (Rx)] 106 for receiving the monitoring signal from the monitoring signal transmission sections 105.

Furthermore, the optical amplifier 10 is an optical amplifier based upon a constant signal light output control method, and, as shown in FIG. 2, is made up of, in the order from the input side, a connector 11a, a branch coupler 12a (demultiplexer) for fetching a monitoring signal included in signal light, a branch coupler 12b for taking out part of the signal light before amplification, an optical amplifying section (for example, Erbium-Doped Fiber; EDF) 13 for amplifying the signal light at a predetermined gain, a gain equalizer (GEQ) 14a, a branch coupler 12c for taking out part of the signal light after amplification, a variable attenuator (Att) 15 for adjusting the output amount of the signal light inputted through the branch coupler 12c, connectors 11b, 11c, a dispersion compensating fiber (DCF) 16 for compensating the dispersion having arisen in the signal light during transmission, connectors 11d, 11e, a branch coupler 12d for taking out part of the signal light undergoing the compensation of dispersion, a gain equalizer (GEQ) 14b, an optical amplifying section (EDF) 17 for amplifying the signal light at a predetermined gain, a branch coupler 12e for taking out part of the signal light after amplification, a multiplex coupler (multiplexer) 12f for multiplexing a monitoring signal from a monitoring signal processing section (SV processing section) 26 which will be described herein later, and a connector 11f.

Incidentally, the connectors 11a, 11f are for purpose of making a connection of the optical amplifier 10 to a signal optical transmission line of the optical communication system 100, while the connectors 11b to 11e are for putting the DCF 16 in the optical amplifier 10.

Besides, in FIG. 2, the signal light to be inputted to the optical amplifier 10 is designated at $\lambda_{sig.\ N}$ (N: the number of wavelengths multiplexed, $N \leq 32$).

In addition, the optical amplifying section 13 is connected with an excitation light source 18 for supplying excitation light to the optical amplifying section 13 and an automatic gain control section (AGC) 23 for controlling the excitation light source 18 on the basis of the signal lights before and after the amplification, taken out through the branch coupler 12b and the branch coupler 12c, respectively.

The optical amplifying section 17 is connected with a main excitation light source 20 and an auxiliary excitation light source 21 for supplying excitation light to the optical amplifying section 17, and further connected with a monitoring photodiode 22 for receiving signal light taken out through the branch coupler 12e, an automatic gain control section (AGC) 25 for controlling the main excitation light source 20 on the basis of the output signal from the photodiode 22 and of the signal light taken out through the branch coupler 12d, a microcontrol unit (MCU) 19 for performing the control on the presence or absence of the output of excitation light from the auxiliary excitation light source 21 (ON/OFF control of the auxiliary excitation light source 21), and an automatic level control section (ALC) 24 for controlling the variable attenuator (Att) 15 on the basis of the output signal from the photodiode 22 and of the MCU 19. Besides, the optical amplifying section 17 is connected to a reflected light monitoring photodiode 22A for receiving the signal light re-inputted from the output side connector 11f (reflected light).

Incidentally, the AGC 23 is for controlling the optical amplifying section 13 so that the level ratio of the signal lights before and after the amplification (gain) constant by referring to the levels of the signal lights before and after the amplification to thereby control the excitation light source 18, while the AGC 25 is for controlling the optical amplifying section 17 so that the level ratio of the signal lights before and after the amplification remains constant by referring to the levels of the signal lights before and after the amplification to thereby control the main excitation light source 20 and the auxiliary excitation light source 21.

Furthermore, the ALC 24 is for controlling the optical amplifying section 17 so that the level of the signal light after the amplification remains constant by referring to the level of the signal light after the amplification to control the variable attenuator 15.

Moreover, the optical amplifier 10 shown in FIG. 2 is provided with the monitoring signal processing section (SV processing section) 26.

The SV processing section 26 is for controlling the MCU 19 and the AGC 25 on the basis of a monitoring signal demultiplexed through the branch coupler 12a, reproducing this monitoring signal, and, further, outputting it through the multiplex coupler 12f to the output side of the optical amplifier 10.

In this instance, the monitoring signal is included in signal light to be inputted to the optical amplifier 10 as mentioned before, and a wavelength different from the wavelength of the signal light is allocated thereto. In FIG. 2, the monitoring signal is denoted by at $\lambda_{sv}$. Further, depending upon the condition of the optical communication system 100, the monitoring signal includes a number-of-channel variation notice signal, having information on the number of channels in signal light, and a freeze release signal for releasing the optical amplifying section 17 from freeze processing, which will be described herein later.

Figure 5:
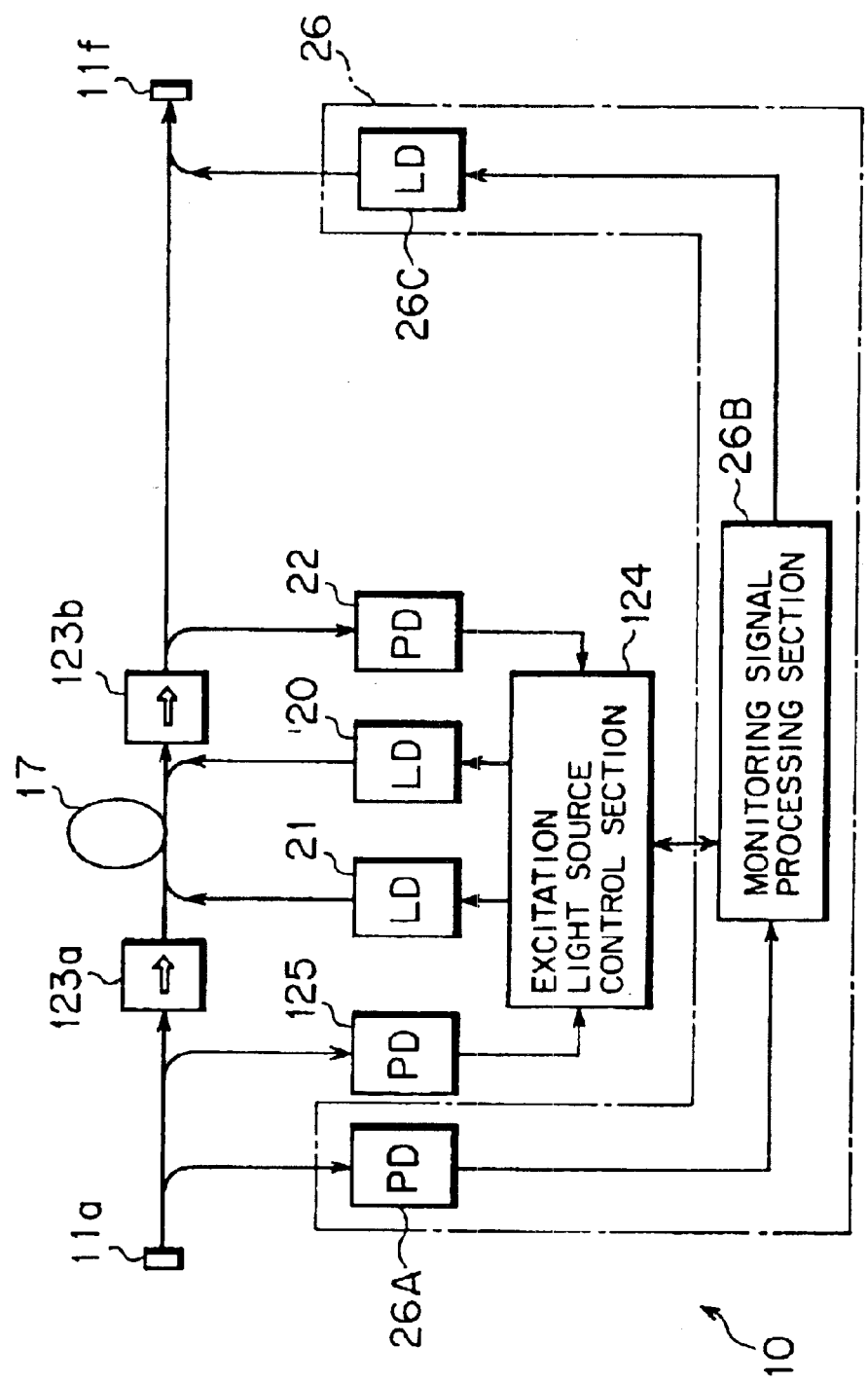
FIG. 5 is a block diagram illustratively showing a construction of a principal portion of the optical amplifier according to the first embodiment of this invention.

Concretely, as shown in FIG. 5, this SV processing section 26 is comprising a photodiode (PD) 26A for receiving a monitoring signal demultiplexed through the branch coupler 12a, a monitoring signal processing section 26B for extracting the number-of-channel information, included in the number-of-channel variation notice signal, or the freeze release signal from the signal received by the photodiode 26A, and a laser diode (LD) 26C for reproducing the monitoring signal.

Incidentally, this SV processing section 26 functions as the monitoring signal transmitting section 105 and the monitoring signal receiving section 106 in the optical communication system 100, mentioned before with reference to FIG. 4.

Furthermore, as shown in FIG. 2, the branch coupler 12a, the SV processing section 26 and the multiplexing coupler 12f constitute an OSC section 28, and the other components organize an amplification section 27.

The optical amplifier 10 shown in FIG. 2 is capable of amplifying signal light in answer to the case that the number of channels in signal light increases or decreases while the optical communication system 100 is in use (while operating), and this function principally relies on the optical amplifying section 17, the main excitation light source 20, the auxiliary excitation light source 21, the MCU 19, the monitoring photodiode 22, the AGC 25, the ALC 24, the variable attenuator 15 and the SV processing section 26.

In this instance, the optical amplifying section 17 is for amplifying signal light inputted through the components on the input side at a predetermined gain by the excitation energy of excitation light supplied from the main excitation light source 20 and the auxiliary excitation light source 21 and outputting the amplified signal light, and is made up of a rare earth doped fiber [concretely, Erbium-Doped Fiber (EDF)].

Furthermore, the main excitation light source 20 is a light source which supplies excitation light to the optical amplifying section 17, and is made so that its excitation light output quantity is controlled by the AGC 25 in an analog manner. This main excitation light source 20 exists from the first operation in the optical communication system 100.

In this instance, the main excitation light source 20 is for outputting excitation light corresponding to 8 channels (excitation light of a quantity required for amplifying signal light corresponding to 8 channels) as an expected maximum output, and for the purpose of securing a control dynamic range for one channel (see the reference mark D in FIG. 10), there is a need to use a type capable of outputting excitation light for extra two channels. That is, as this main excitation light source 20, employed is a type which is capable of outputting excitation light corresponding to 10 channels in total as the maximum output.

Still further, the auxiliary excitation light source 21 is a light source for supplying excitation light to the optical amplifying section 17, and the control for the presence or absence of the output of its excitation light (ON/OFF control) is implemented through the MCU 19. The auxiliary excitation light source 21 is controlled through the use of, for example, a non-shown back power (BP) monitor so that its excitation light output becomes constant.

In this case, this auxiliary excitation light source 21, unlike the main excitation light source 20, is capable of installing or removing in accordance with an increase/decrease in the number of channels in signal light to be inputted to the optical amplifying section 17. Hence, in FIG. 2, the auxiliary excitation light source 21 is indicated with a virtual line.

Additionally, as the auxiliary excitation light source 21, employed is a type which is capable of outputting excitation light corresponding to 8 channels as the maximum output.

Besides, it is also appropriate that the main excitation light source 20 and the auxiliary excitation light source 21 are placed before and after the optical amplifying section 17.

In this instance, if the optical amplifier 10 is constructed such that the main excitation light source 20 is located on the downstream side of the optical amplifying section 17 while the auxiliary excitation light source 21 is situated on the upstream side of the optical amplifying section 17, as shown in FIG. 5, for example, it is possible that, when the number of channels in signal light to be inputted to the optical amplifier 10 is equal to or less than a predetermined number of channels, only the main excitation light source 20 for the rearward excitation is put into operation to thereby accomplish the power consumption saving and, when being greater than the predetermined number of channels, the auxiliary excitation light source 21 for the forward excitation is also put to use so that a high output is attainable.

Furthermore, the optical amplifier 10 can also be made such that, unlike the case shown in FIG. 5, the main excitation light source 20 is provided on the upstream side of the optical amplifying section 17 while the auxiliary excitation light source 21 is put on the downstream side of the optical amplifying section 17. In this case, when the number of channels in signal light to be inputted to the optical amplifier 10 is equal to or less than a predetermined number of channels, only the main excitation light source 20 for the preceding excitation is operated to effect the noise reduction, and when being greater than the predetermined number of channels, the auxiliary excitation light source 21 for the succeeding excitation is also put to use so that a high output is obtainable.

Moreover, the MCU 19 is equipped with a decision section 19A and an ON/OFF control section 19B for the ON/OFF control of the auxiliary excitation light source 21. Incidentally, the functions equivalent to the decision section 19A and the ON/OFF control section 19B are realized through the processing by softwares.

The decision section 19A is for recognizing the number of channels in signal light to be inputted to the optical amplifying section 17 on the basis of information on the number of channels in signal light extracted in the SV processing section 26 to decide whether or not the number of channels in the signal light recognized is more than a predetermined number of channels preset in a memory in the decision section 19A or the like (not shown). Incidentally, the pre-determined number of channels preset signifies the number of channels corresponding to the maximum excitation light quantity the main excitation light source 20 is expected to supply, and in the case that the main excitation light source 20 outputs the excitation light corresponding to 8 channels as the expected maximum output, the predetermined number of channels is set to "8".

Furthermore, the ON/OFF control section 19B, when the decision section 19A has decided that the number of channels in signal light to be inputted to the optical amplifying section 17 is equal to or less than the predetermined number of channels, OFF-controls the auxiliary excitation light source 21 (controls the auxiliary excitation light source 21 so that it does not output excitation light), whereas, when the decision section 19A has decided that the number of channels in the signal light is greater than the predetermined number of channels, ON-controlling the auxiliary excitation light source 21 (controls the auxiliary excitation light source 21 so that it outputs excitation light).

More specifically, the ON/OFF control section 19B, when the number of channels in signal light to be inputted into the optical amplifying section 17 is 8 or less, turns OFF the auxiliary excitation light source 21 so that only the main excitation light source 20 outputs excitation light, whereas, when the number of channels in the signal light is more than 8, turning ON the auxiliary excitation light source 21 so that the main excitation light source 20 and the auxiliary excitation light source 21 are controlled to cooperatively output excitation light.

At this time, since the control of the main excitation light source 20 is done with the above-mentioned AGC 25, the AGC 25 and the ON/OFF control section 19B function as a control section to execute the control whereby only the main excitation light source 20 outputs excitation light when the result of the decision by the decision section 19A shows that the number of channels in signal light to be inputted to the optical amplifying section 17 is equal to or less than a predetermined number of channels, while implementing the control so that the main excitation light source 20 and the auxiliary excitation light source 21 cooperatively output excitation light when the number of channels in the signal light is greater than the predetermined number of channels.

Additionally, the ON/OFF control section 19B also has a function to recognize the connecting condition of the output side end portion (concretely, the connector 11f) of the optical amplifying section 17 on the basis of the output signal of the reflected light monitoring photodiode 22A.

Moreover, the AGC 25 and the ON/OFF control section 19B, functioning as the foregoing control section, are provided with a safeguard, wherein, when recognizing that the output side end portion of the optical amplifying section 17 goes open, they adjust the excitation light quantity to be supplied from the main excitation light source 20 and the auxiliary excitation light source 21 to reduce the level of the signal light outputted from the optical amplifying section 17 to below a predetermined value for the safe measure purpose, while, when recognizing that the output side end portion is placed into connection, they adjust the excitation light quantity to be supplied from the main excitation light source, while maintaining outputting condition of excitation light from the auxiliary excitation light source 21 conforming to the decision result by the decision section 19A, in order to set the level of the signal light outputted from the optical amplifying section 17 to a normal value. This operation for the safeguard will be described in detail in "(b2) Operation of Optical Amplifier according to First Embodiment".

Figure 3:
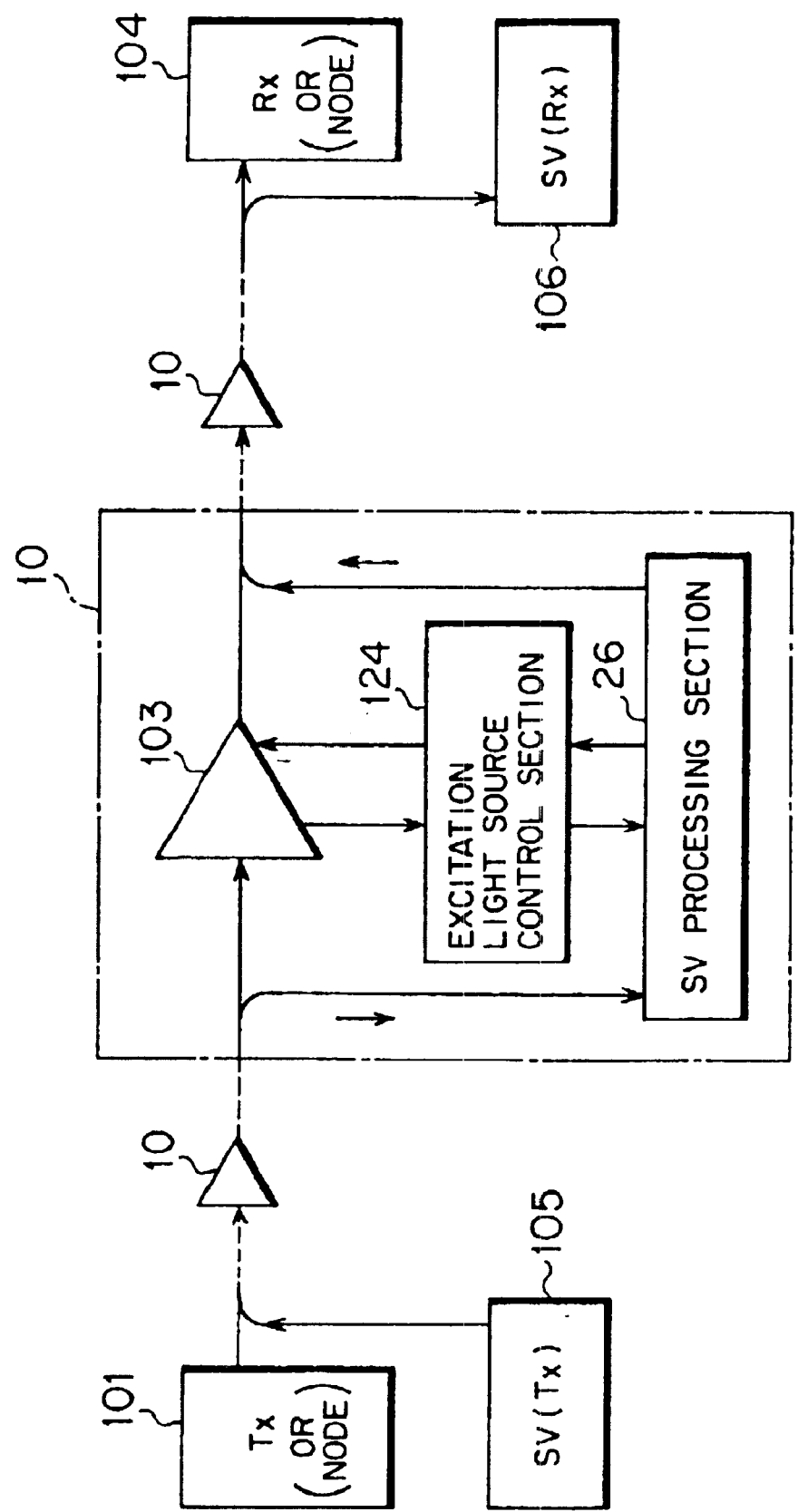
FIG. 3 is a block diagram illustratively showing a construction of a principal portion of a wavelength multiplexing optical communication system employing the optical amplifier according to the first embodiment of this invention.

In this instance, the aforesaid AGC 25 and MCU 19 function as an excitation light source control section for controlling the operations of the main excitation light source 20 and the auxiliary excitation light source 21. In FIGS. 3 and 5, this excitation light source control section is designated at a reference numeral 124.

Furthermore, the aforesaid ALC 24 and variable attenuator 15 function as a switching section for switching the control to be executed for the optical amplifying section 17 between level-fixing control and gain-fixing control in response to an increase/decrease in the number of channels in signal light to be inputted to the optical amplifying section 17.

Concretely, when the decision section 19A of the MCU 19 has decided that the number of channels in signal light to be inputted to the optical amplifying section 17 increases or decreases, the ALC 24 fixes the attenuation factor of the variable attenuator 15 to conduct freeze processing, wherein switching the control to be executed as a whole for the optical amplifying section 17 from the level-fixing control to the gain-fixing control, and further, when the ON/OFF control section 19B of the MCU 19 controls the presence or absence of the output of excitation light from the auxiliary excitation light source 21, the ALC 24 varies the attenuation factor of the variable attenuator 15 to perform freeze release processing, wherein switching the control to be wholly done for the optical amplifying section 10 from the gain-fixing control to the level-fixing control. Thus, the ALC 24 and the variable attenuator 15 function as the foregoing switching section. The freeze processing and the freeze release processing will be described in detail in "(b2) Operation of Optical Amplifier according to First Embodiment".

FIG. 5, used for the above description, is an illustration of a construction of a principal portion of the optical amplifier 10. Although being omitted from the optical amplifier 10 in FIG. 2, isolators 123a, 123b for preventing the input of reflected light are provided before and after the optical amplifying section 17. In addition, the numeral 124 represents the above-mentioned excitation light source control section, and the numeral 125 depicts a photodiode for receiving the signal light taken out through the branch coupler 12d (see FIG. 2) (this photodiode 125 is also omitted from the optical amplifier 10 in FIG. 2).

Furthermore, FIG. 3 shows a construction of a principal portion in a case where the aforesaid optical amplifier 10 is applied to the optical communication system 100 shown in FIG. 4. In FIG. 3, the numeral 103 denotes an optical amplifying section, including components in the optical amplifier 10 shown in FIG. 2 other than the AGC 25, the MCU 19 and the SV processing section 26.

(b2) Operation of Optical Amplifier according to First Embodiment

With the above-described construction, in the optical communication system 100 to which the optical amplifier 10 according to the first embodiment of this invention is applied, the signal light transmitted from the signal transmission section 101 on the signal light upstream side (or downstream side) travels through an optical transmission line while being multi-relayed and amplified by a plurality of optical amplifiers 10, and then received by the signal receive section 104 on the signal light upstream side (or downstream side).

At this time, the signal light inputted is amplified in the optical amplifiers 10, and if an increase/decrease in the number of channels in the inputted signal light takes place, the main excitation light source 20 and the auxiliary excitation light source 21 are controlled to supply the optical amplifying section 17 with excitation light in the amount conforming to the number of channels after the increase/decrease.

The following description will be given of broadly classified two cases; the case (1) that the number of channels in signal light to be inputted to the optical amplifier 10 increases, and the case (2) that the number of channels in signal light to be inputted to the optical amplifier 10 decreases.

(1) Instance wherein the Number of Channels in Signal Light to be Inputted to Optical Amplifier 10 Increases In this instance, as a premise, let it be assumed that the signal light to be inputted to the optical amplifier 10 takes 8 channels or less and that, in the optical amplifier 10, only the main excitation light source 20 outputs excitation light in a quantity conforming to the number of channels in the signal light. Incidentally, the maximum output (power limit) of excitation light from the main excitation light source 20 is equivalent to 10 channels.

The description will be made hereinbelow of the case that the number of channels in the signal light increases from "8" to "9".

First of all, when signal light including a monitoring signal is inputted through the connector 11a into the optical amplifier 10, the signal light passes through the branch couplers 12a, 12b and then comes into the optical amplifying section 13, while the monitoring signal is taken out through the branch coupler 12a to be inputted to the SV processing section 26.

Furthermore, after being amplified by the optical amplifying section 13, the aforesaid signal light is inputted through the GEQ 14a and the demultiplexing coupler 12c into the variable attenuator 15 and, after the output quantity thereof is adjusted by this variable attenuator 15, is inputted through the dispersion compensating fiber 16, the branch coupler 12d and GEQ 14b into the optical amplifying section 17.

Still further, in the case that the number of channels in the signal light increases, a number-of-channel variation notice signal is included in the aforesaid monitoring signal, and in the SV processing section 26, information about the number of channels in the inputted signal light is extracted from the number-of-channel variation notice signal, and this number-of-channel information comes into the MCU 19 and the AGC 25.

Then, the decision section 19A of the MCU 19 recognizes the number of channels in the inputted signal light on the basis of the aforesaid number-of-channel information and thereby decides whether or not the number of channels of this inputted signal light is more than a predetermined number of channels "8" preset in the decision section 19A.

Figure 6:
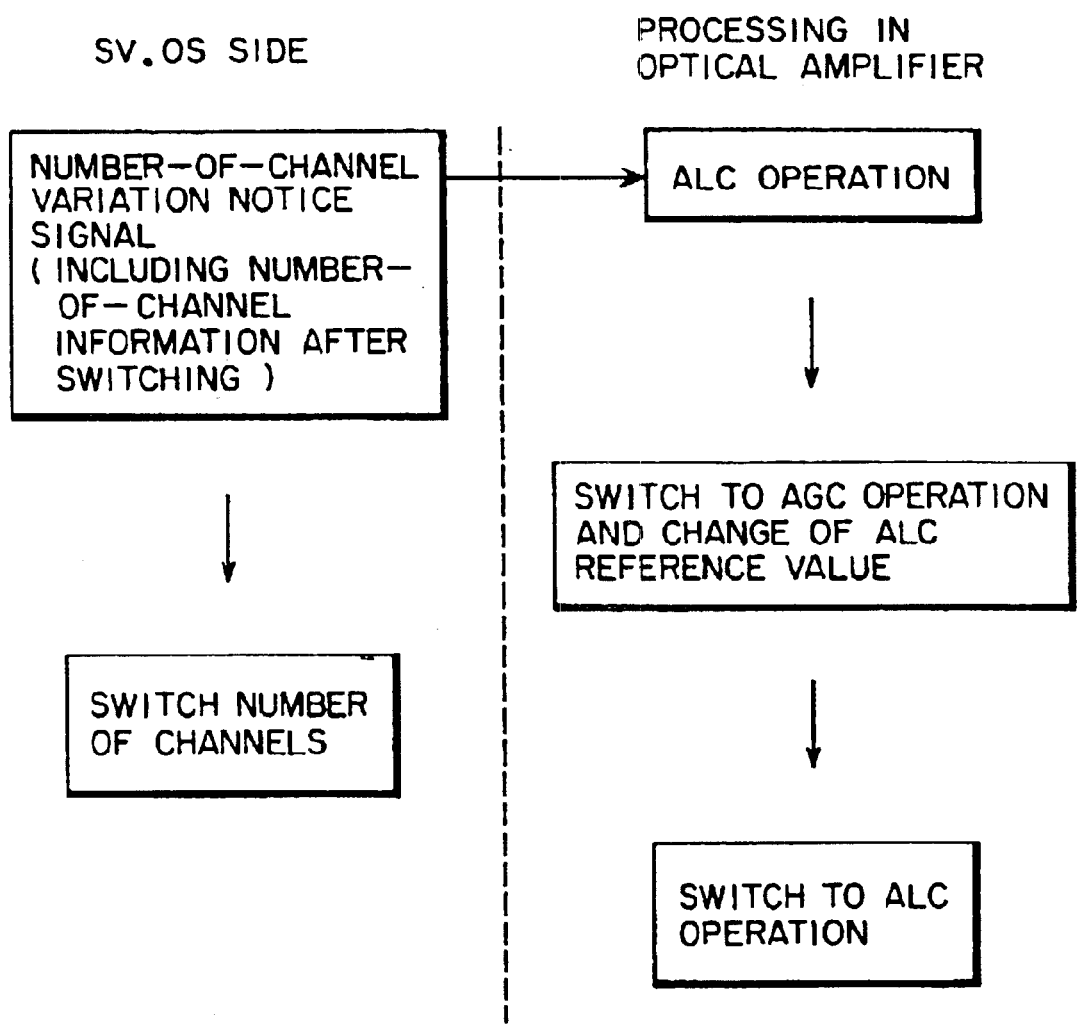
FIGS. 6 to 12 are illustrations for explaining an operation of the optical amplifier according to the first embodiment of this invention.
Figure 7:
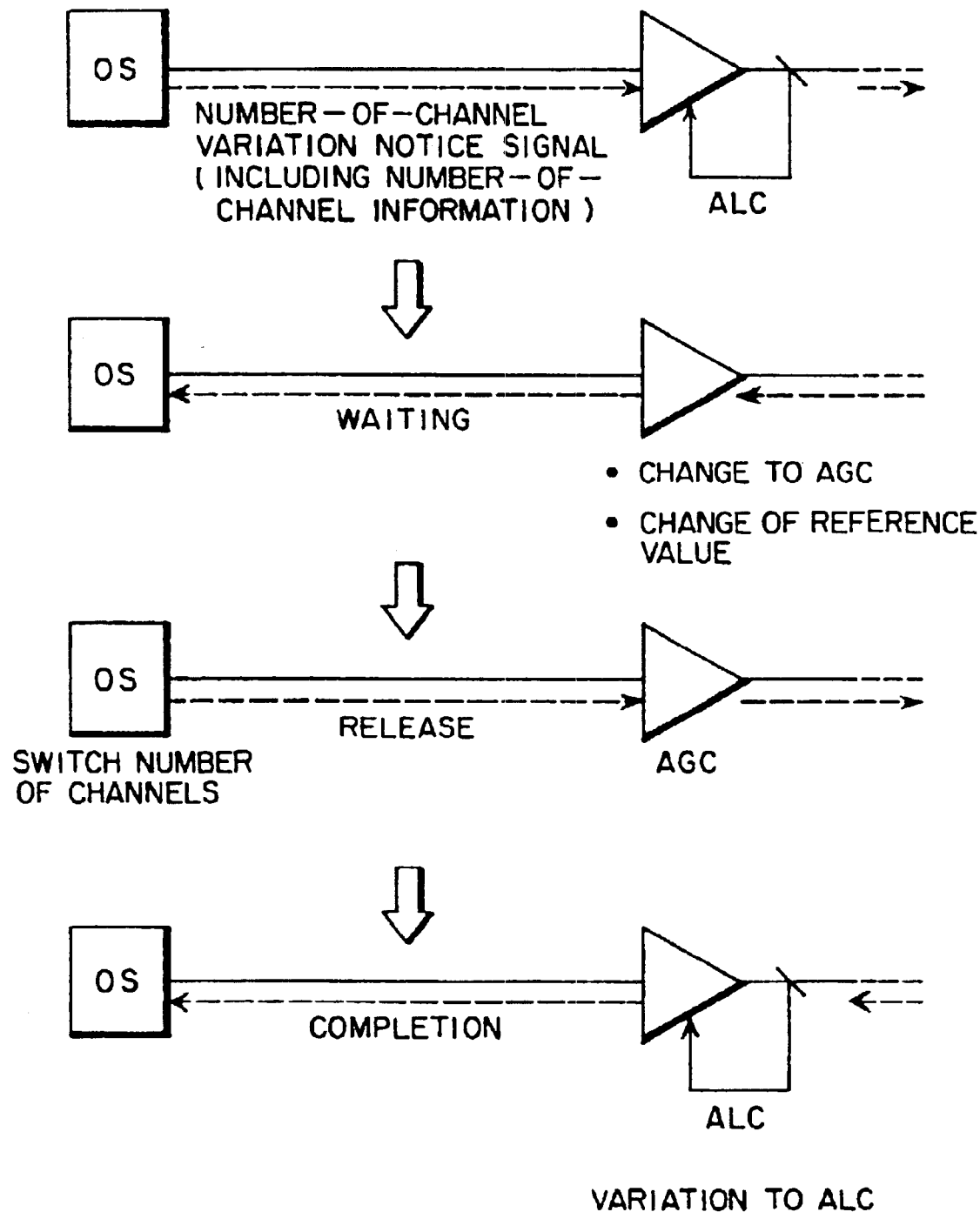

When the decision section 19A has decided that the number of channels in the signal light inputted to the optical amplifying section 17 is more than the predetermined channel number "8" (that is, when the number of channels in the signal light increases to "9"), the MCU 19 and the AGC 25 control the quantity of the excitation light to be supplied to the optical amplifying section 17 as follows (see FIGS. 6 and 7).

Figure 9:
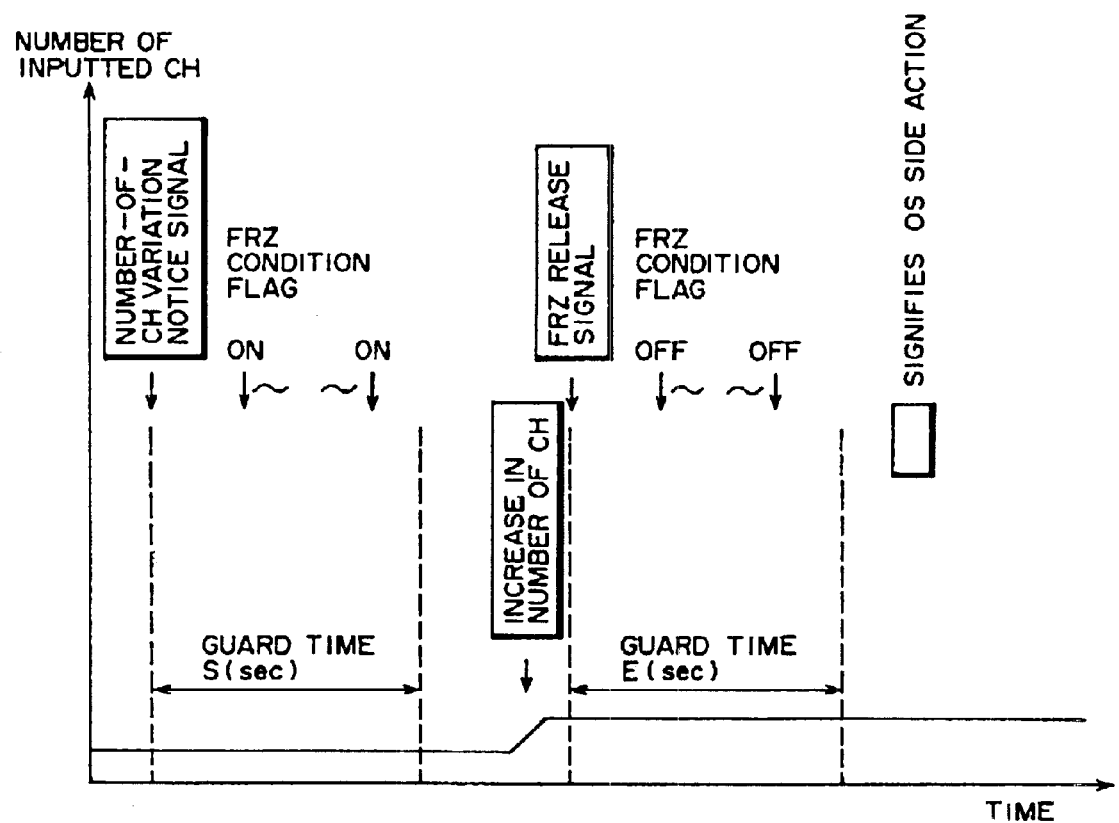

FIG. 9 shows the reception timings of a number-of-channel variation notice signal (ch-number variation notice signal), included in a monitoring signal in the case that the number of channels in light signal increases, and a freeze release signal (FRZ release signal), and also shows the relationships between these timings and the corresponding events taking place due to these signals. In FIG. 9, the guard time signifies a waiting time to be taken for switching the control to be implemented for the optical amplifying section 17 between the level-fixing control and the gain-fixing control, and in other words, is a time for inhibiting the switching of the number of channels in the signal light. As shown in FIG. 9, there exist two kinds [guard time S (sec) and guard time E (sec)]. The preparation of these guard times also becomes important.

Figure 10:
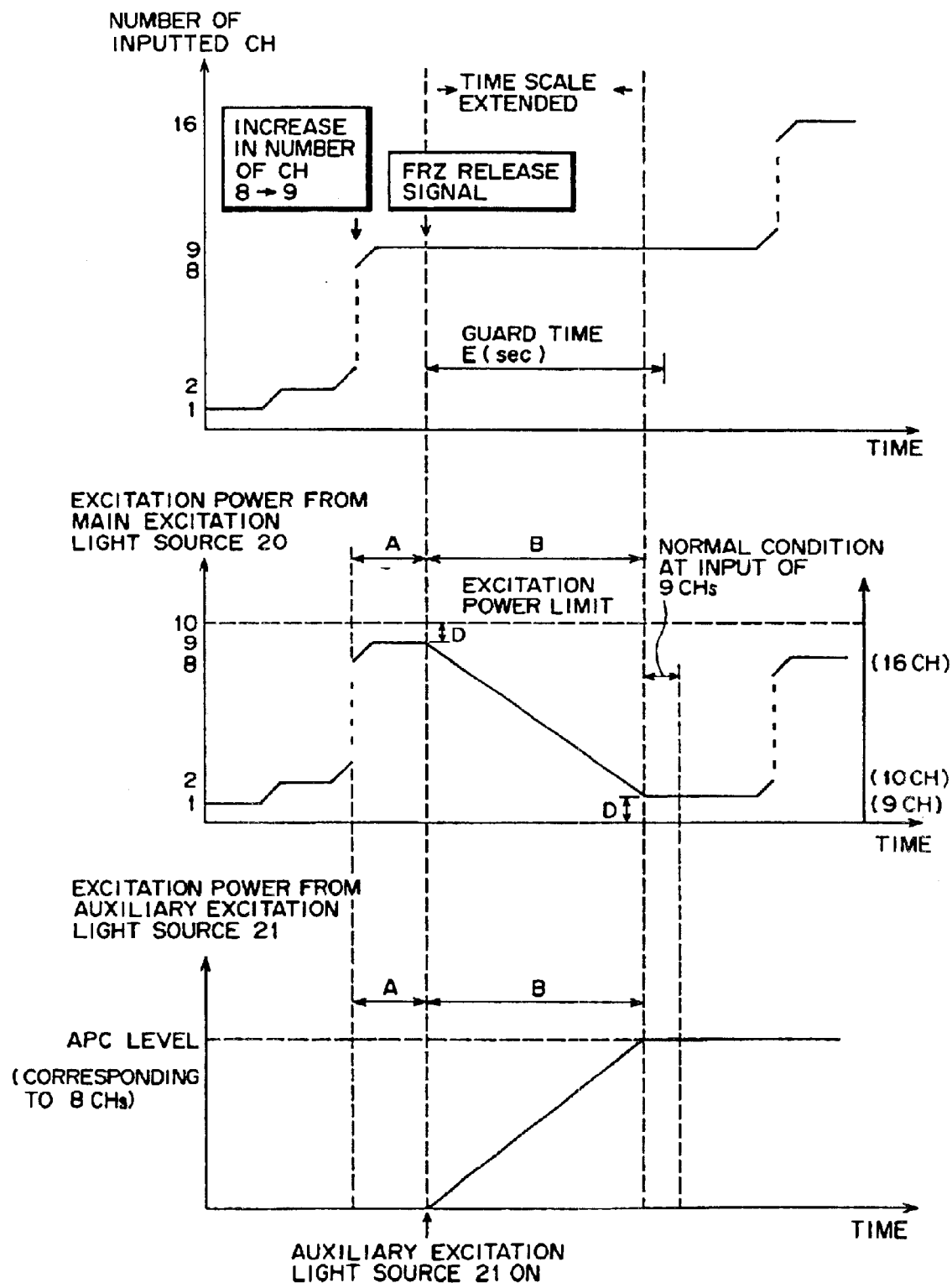

In addition, FIG. 10 shows the variation of the quantities of excitation light (excitation light powers) from the main excitation light source 20 and the auxiliary excitation light source 21 when the number of channels in signal light increases.

In the case that the number of channels in signal light to be inputted to the optical amplifying section 17 increases, the ALC 24 fixes the attenuation factor of the variable attenuator 15 to conduct the above-mentioned freeze processing to the optical amplifying section 17. At this time, the reference value (the value of the output level of the signal light corresponding to the number of channels after the increase) to be taken for the level-fixing control is updated.

If the number of channels increases from "8" to "9", the AGC 25 controls the main excitation light source 20 so that the main excitation light source 20 outputs excitation light in a quantity conforming to the number of channels in the signal light after the increase (the excitation light quantity corresponding to 9 channels), exceeding the maximum excitation light quantity the main excitation light source 20 is expected to supply (the excitation light quantity corresponding to 8 channels). That is, the AGC 25 executes the control to make only the main excitation light source 20 output the excitation light corresponding to 9 channels (see reference mark A in FIG. 10).

Subsequently, in response to a freeze release signal from the OS (the signal transmission section 101 of the optical communication system 100) side, the ALC 24 returns the attenuation factor of the variable attenuator 15 to the variable condition to conduct the above-mentioned freeze release processing for the optical amplifying section 10. Further, the ON/OFF control section 19B turns ON the auxiliary excitation light source 21 so that the auxiliary excitation light source 21 is controlled to output excitation light.

In this way, as indicated by the reference mark B in FIG. 10, the auxiliary excitation light source 21, undergoing only the ON/OFF-control, gradually outputs excitation light, while the main excitation light source 20, being under the level-fixing control, outputs excitation light in a quantity determined considering the excitation light quantity outputted from the auxiliary excitation light source 21.

Finally, the excitation light corresponding to one channel is outputted from the main excitation light source 20 and the excitation light corresponding to 8 channels is outputted from the auxiliary excitation light source 21, thus causing the output of the excitation light corresponding to 9 channels in total. Incidentally, as shown in FIG. 10, the auxiliary excitation light source 21 fully rises within the guard time E.

As described above, according to the first embodiment, since the auxiliary excitation light source 21 is turned ON after the number of channels has been increased from "8" to "9", it is possible to prevent a lack of the control dynamic range (see the reference mark D in FIG. 10), which would occur when the output excitation light quantity from the main excitation light source 20 becomes zero. Accordingly, it is possible to more certainly accomplish the output control of the signal light amplified by the optical amplifier 10.

Additionally, because of slowly building up the excitation light of the auxiliary excitation light source 21, the control of the main excitation light source 20 is followable, and the amplification of the signal light is feasible without adversely affecting the other channels before increase.

Besides, if the number of channels in signal light increases but does not exceed 8 channels, the excitation light from the auxiliary excitation light source 21 is unnecessary.

(2) Instance wherein the Number of Channels in Signal Light to be Inputted to Optical Amplifier 10 Decreases In this instance, as a premise, let it be assumed that the signal light to be inputted to the optical amplifier 10 holds 9 or more channels and that, in the optical amplifier 10, the main excitation light source 20 and the auxiliary excitation light source 21 cooperatively output excitation light in an amount corresponding to the number of channels in the signal light.

The following description is about the case that the number of channels in the signal light decreases from "9" to "8". At this time, the excitation light corresponding to one channel is outputted from the main excitation light source 20 while the excitation light corresponding to 8 channels is outputted from the auxiliary excitation light source 21.

In this instance, as in the case of the above-described (1), the monitoring signal is taken out from the inputted signal light by the branch coupler 12a, and the number-of-channel information on the inputted signal light is extracted from the number-of-channel variation notice signal, included in this monitoring signal, by the SV processing section 26, and further, this number-of-channel information is inputted to the MCU 19 and the AGC 25.

Furthermore, in the MCU 19, the decision section 19A recognizes the number of channels in the inputted signal light on the basis of the aforesaid number-of-channel information to decide whether or not the number of channels in the inputted signal light is more than a predetermined number of channels "8" preset in the decision section 19A.

Figure 8:
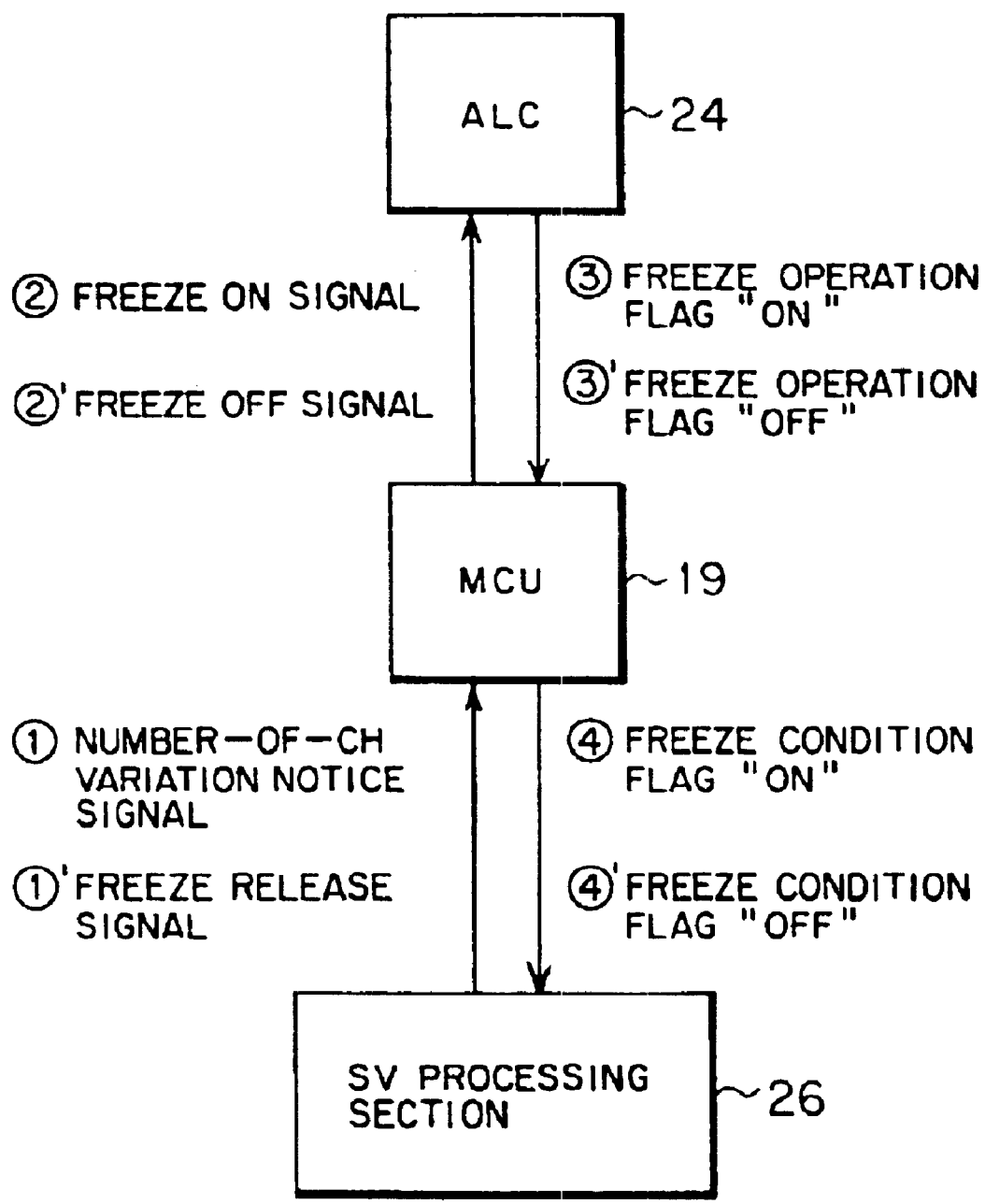

In the case that the decision section 19A has decided that the number of channels in the signal light to be inputted to the optical amplifying section 17 is less than the predetermined number of channels "8" (that is, when the number of channels in the signal light decreases to "8"), the quantity of the excitation light to be supplied to the optical amplifying section 17 is controlled as follows (see FIGS. 6 to 8).

Figure 11:
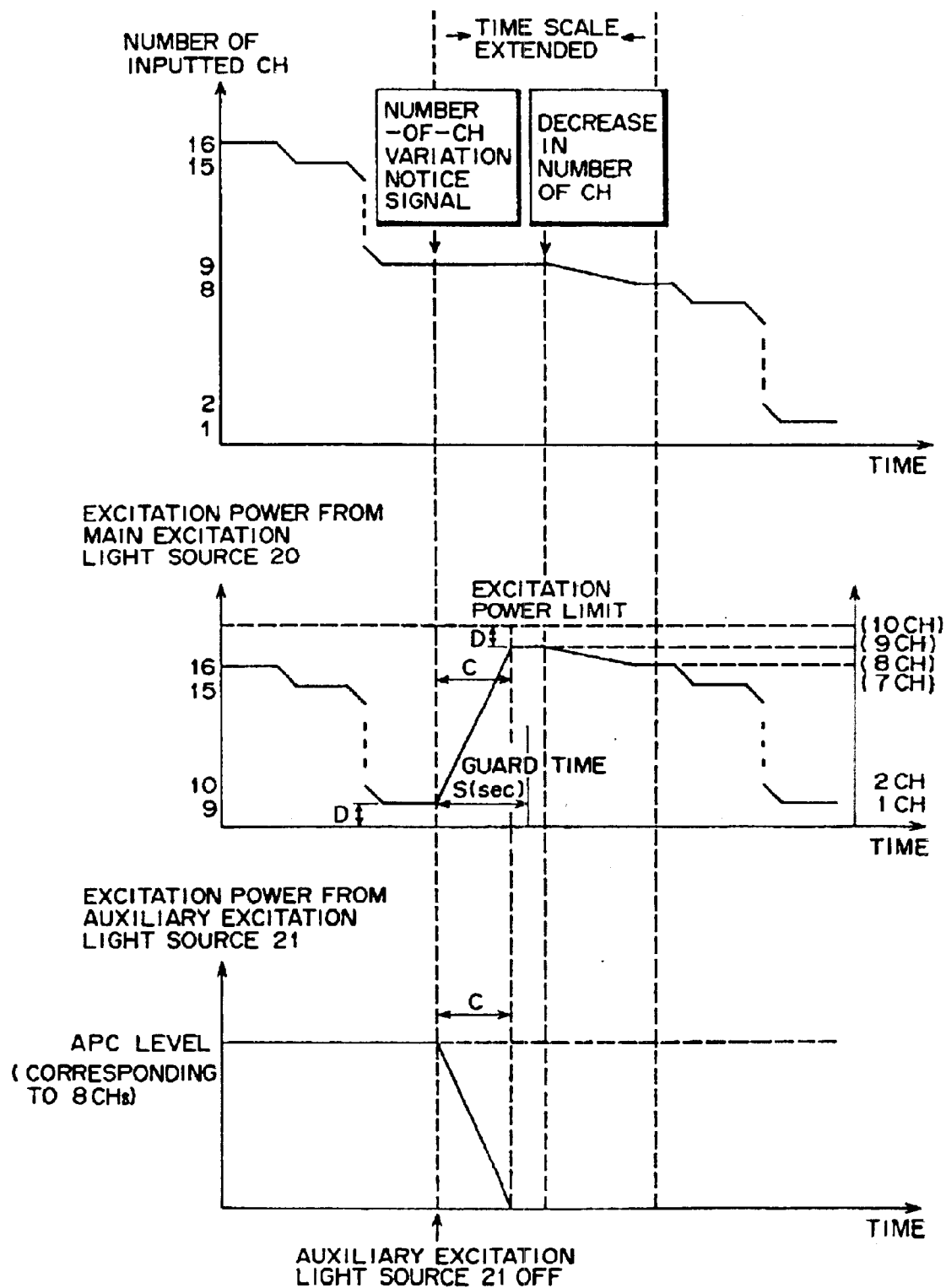

FIG. 11 shows the variation of excitation light quantities (excitation light powers) from the main excitation light source 20 and the auxiliary excitation light source 21 when the number of channels in signal light decreases.

In the case that the number of channels in the signal light to be inputted to the optical amplifying section 17 decreases from "9" to "8", first, the ON/OFF control section 19B turns OFF the auxiliary excitation light source 21 so that the auxiliary excitation light source 21 is controlled not to output excitation light.

In this way, as indicated by the reference mark C in FIG. 11, the excitation light quantity from the auxiliary excitation light source 21, undergoing only the ON/OFF control decreases gradually, while the excitation light is outputted from the main excitation light source 20, undergoing the level-fixing control, in a quantity determined in consideration of the excitation light quantity to be outputted from the auxiliary excitation light source 21. As a result, the excitation light quantity from the auxiliary excitation light source 21 goes to zero, and the excitation light corresponding to 9 channels is outputted from the main excitation light source 20.

Following this, as in the case of the above-described (1), the ALC 24 fixes the attenuation factor of the variable attenuator 15 to conduct the above-mentioned freeze processing for the optical amplifying section 17. At this time, the reference for the level-fixing control value (the value of the output level of the signal light conforming to the number of channels after decreased) is also updated.

Thereafter, the AGC 25 controls the main excitation light source 20 to output the excitation light in a quantity conforming to the number of channels in the signal light after the decrease (the excitation light corresponding to 8 channels).

Incidentally, when receiving a freeze release signal from the OS side after the completion of the decrease in the number of channels in the signal light, the ALC 24 returns the variable attenuator 15 to the attenuation factor variable condition, thereby performing the above-mentioned freeze release processing to the optical amplifying section 10.

Besides, as shown in FIG. 11, the auxiliary excitation light source 21 completely stops during the guard time S.

As described above, according to the first embodiment, since the auxiliary excitation light source 21 is turned OFF before the number of channels decreases from "9" to "8", it is possible to prevent a lack of the control dynamic range (see the reference mark D in FIG. 11), which would occur when the output excitation light quantity from the main excitation light source 20 becomes zero, and, further, to certainly accomplish the excitation light output control (in its turn, the signal light output control).

Additionally, because of gradually decreasing the excitation light of the auxiliary excitation light source 21, the control of the main excitation light source 20 is followable, and the amplification of the signal light is feasible without adversely affecting the other channels before decrease.

Besides, if the number of channels in signal light decreases but the decrease occurring above 9 channels or the decrease occurring below 8 channels, the ON/OFF control of the auxiliary excitation light source 21 is unnecessary.

Moreover, a description will be made of the above-mentioned freeze processing and freeze release processing. FIG. 8 shows the interchange of signals at the above-mentioned freeze processing and freeze release processing. In FIG. 8, the circled numerals 1 to 4 represent the interchange of signals in the freeze processing, while the circled numerals 1' to 4' designate the interchange of signals in the freeze release processing.

First, in conducting the freeze processing, when the MCU 19 receives a number-of-channel variation notice signal from the SV processing section 26 (see the circled numeral 1), the MCU 19 decides that the processing of making an increase/decrease in the number of channels in the signal light to be inputted to the optical amplifying section 17 is conducted as mentioned above, and thereafter (X1 ms later), the MCU 19 outputs a freeze ON signal to the ALC 24 (see the circled numeral 2). When receiving this freeze ON signal, the ALC 24 fixes the attenuation factor of the variable attenuator 15 to perform the freeze processing for the optical amplifier 17. Further, the ALC 24 outputs a freeze operation flag "ON" to the MUC 19 (see the circled numeral 3). Incidentally, if difficulty is encountered in outputting the freeze operation flag "ON", an alarm is given. Finally, the MCU 19 outputs a freeze state flag "ON" for informing that the optical amplifier 17 is in the freeze processing conducted condition, with the freeze state flag "ON" being transmitted through the SV processing section 26 to the external (the other optical amplifiers or the like in the optical communication system 100) (see the circled numeral 4).

Besides, in the case that the number of channels in the sign al light decreases from "9" to "8", as shown in FIG. 11, when receiving the number-of-channel variation notice signal as a trigger, the MCU 19 turns OFF the auxiliary excitation light source 21.

Furthermore, the waiting time (X1 ms) is for freezing the optical amplifiers 10 (see FIG. 4) connected in the form of multi-stage not simultaneously but in the order from the signal light input side, and different length of time is set to be different at every optical amplifier 10.

On the other hand, in conducting the freeze release processing, when receiving a freeze release signal from the SV processing section 26 (see the circled numeral 1'), the MCU 19 makes a decision that the control for the presence or absence of the output of the auxiliary excitation light source 21 is implemented, and thereafter (X2 ms later), the MCU 19 outputs a freeze OFF signal to the ALC 24 (see the circled numeral 2'). When receiving this freeze OFF signal, the ALC 24 returns the variable attenuator 15 to the attenuation factor variable condition, thereby releasing from the freeze processing conducted for the optical amplifier 19. Further, the ALC 24 outputs a freeze operation flag "OFF" to the MCU 19 (see the circled numeral 3'). Incidentally, if difficulty is encountered in outputting the freeze operation flag "OFF", an alarm is given. Finally, the MCU 19 outputs a freeze state flag "OFF" for informing that the optical amplifier 17 is in the normal condition (that is, it is released from the freeze), with the freeze state flag "OFF" being transmitted through the SV processing section 26 to the external (the other optical amplifiers and others in the optical communication system 100) (see the circled numeral 4').

Besides, in the case that the number of channels in the signal light increases from "8" to "9", as shown in FIG. 10, when receiving a freeze release signal as a trigger, the MCU 19 turns ON the auxiliary excitation light source 21.

Furthermore, the waiting time (X2 ms) is for releasing the freeze in the order from the signal light input side, and is set to be different at every optical amplifier 10.

The transmission of the freeze state flags "ON" and "OFF" to the external is because, in the optical communication system 100, there is a need for a plurality of optical amplifiers 10, organizing the optical communication system 100, to simultaneously conduct the freeze processing and the freeze release processing, involved with the increase/decrease in the number of channels in signal light.

Still further, in the optical amplifier 10, as a safeguard, the AGC 25 and the ON/OFF control section 19B adjust the level of the output signal light from the optical amplifying section 17 in accordance with the connecting condition of the output side end portion of the optical amplifier 10.

Figure 12:
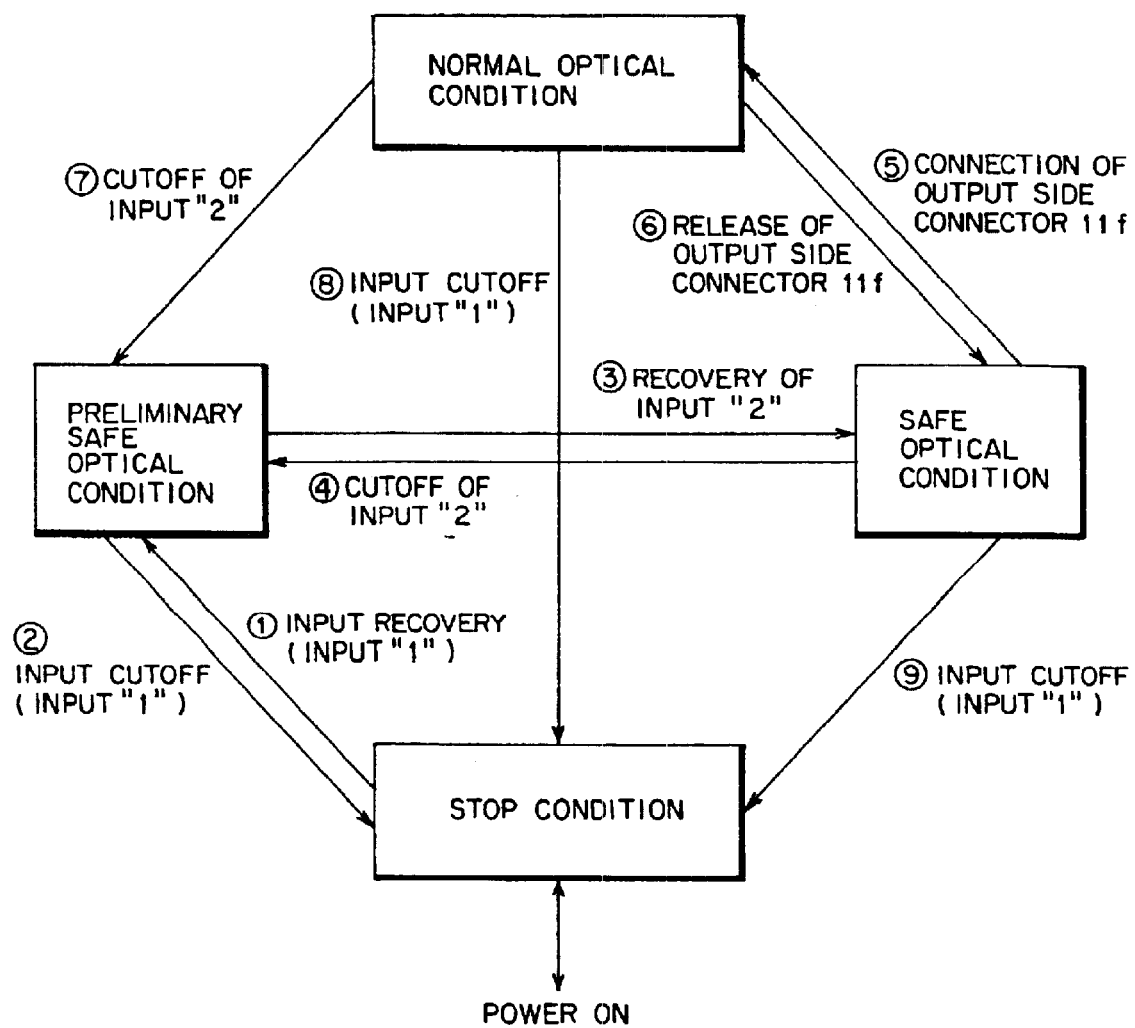

FIG. 12 is an illustration of the state transition of the optical amplifier 10. As shown in FIG. 12, if the optical amplifier 10 is in the step condition, excitation light is not yet outputted from the main excitation light source 20, and when the input recovery of the signal light (concretely, the recovery of an input "1" in FIG. 2) comes about (see the circled numeral 1), signal light at a low level is outputted from the optical amplifying section 17 (preliminary safe optical condition). Besides, at this time, if the input cutoff of the signal light (the cutoff of the input "1") occurs (see the circled numeral 2), the optical amplifier 10 returns to the stop condition.

In addition, if the recovery of the input "2" shown in FIG. 2 takes place (see the circled numeral 3), signal light with a level higher than that in the preliminary safe optical condition is outputted from the optical amplifying section 17 (safe optical condition). Incidentally, at this time, if the cutoff of the input "2" comes about (see the circled numeral 4), the optical amplifier 10 returns to the preliminary safe optical condition.

Furthermore, the ON/OFF control section 19B recognizes the connecting condition of the output side end portion of the optical amplifier 17 (concretely, the connector 11f) on the basis of the output signal of the reflected light monitoring photodiode 22A.

In this case, when the recognition is made that the connector 11f goes into the connecting condition (see the circled numeral 5), the AGC 25 adjusts the quantity of the excitation light to be supplied from the main excitation light source 20 while maintaining the outputting condition of excitation light from the auxiliary excitation light source 21 conforming to the decision result by the decision section 19A (that is, if the number of channels in the inputted signal light is "9" ore more, the auxiliary excitation light source 21 is turned ON, and when the number of channels in the inputted signal light is "8" or less, the auxiliary excitation light source 21 is maintained in the OFF condition), thus setting the level of the output signal light from the optical amplifying section 17 to a normal value (normal optical condition). Incidentally, at this time, if recognition is made that the connector 11f is released (see the circled numeral 6), the AGC 25 and the ON/OFF control section 19B adjust the quantities of the excitation light to be supplied from the main excitation light source 20 and the auxiliary excitation light source 21 (in more detail, placing the auxiliary excitation light source 21 into the OFF condition), and reduce the level of the output signal light from the optical amplifying section 17 to below a predetermined value, thus returning to the aforesaid safe optical condition.

Moreover, if the cutoff of the input "2" occurs under the aforesaid normal optical condition (see the circled numeral 7), the optical amplifier 10 returns to the preliminary safe optical condition, and if the input cutoff (the cutoff of the input "1") of the signal light occurs under the normal optical condition (see the circled numeral 8), the optical amplifier 10 returns to the stopped condition.

Besides, if the input cutoff (the cutoff of the input "1") of the signal light occurs under the aforesaid safe optical condition (see the circled numeral 9), the optical amplifier 10 returns to the stop condition.

In this way, the level of the output signal light from the optical amplifying section 17 is adjustable in accordance with the connecting condition of the output side end portion of the optical amplifier 17, so that an appropriate safeguard can be taken in accordance with the condition of the optical amplifier 10.

As described above, in the optical amplifier 10 according to the first embodiment of this invention, the AGC 25 and the MCU 19 (that is, the excitation light source control section 124) control the operations of the main excitation light source 20 and the auxiliary excitation light source 21, and therefore, even if the auxiliary excitation light source 21 is turned ON/OFF in connection with the increase/decrease in the number of channels in the inputted signal light, it is possible to supply the optical amplifying section 17 with excitation light in a quantity conforming to the number of channels after increased or decreased without exerting adverse influence on the channels being in operation. Accordingly, even if the optical communication system 100 is in operation, the auxiliary excitation light source 21 is capable of stably installing or removing in accordance with an increase/decrease in the number of channels in the signal light.

In addition, since the auxiliary excitation light source 21 is not incorporated into the control loop of the AGC 25, it is possible to stably operate the AGC 25 at a high speed, and further, to place the auxiliary excitation light source 21 at an arbitrary position (for example, a position remote enough to avoid thermal influence on the other components).

(c) Description of Modification of First Embodiment

Although, in the above-described first embodiment, the decision section 19A of the MCU 19 recognizes the number of channels in inputted signal light on the basis of a number-of-channel information, extracted from a number-of-channel variation notice signal included in a monitoring signal, to decide whether or not the number of channels in the inputted signal light is more than a predetermined number of channels "8", it is also appropriate that a decision section of an MCU decides, on the basis of information about an operating condition of the main excitation light source 20, whether or not the number of channels in inputted signal light is more than a predetermined number of channels "8". The other points are the same as those in the first embodiment.

Concretely, a drive current for operating the main excitation light source 20 can be used as the information about the operating condition of the main excitation light source 20. Further, it is also possible that, as shown in FIG. 13, an MCU 19' is constructed with a hardware and a control signal from the AGC 25 is inputted through the MCU 19' to the main excitation light source 20.

Figure 13:
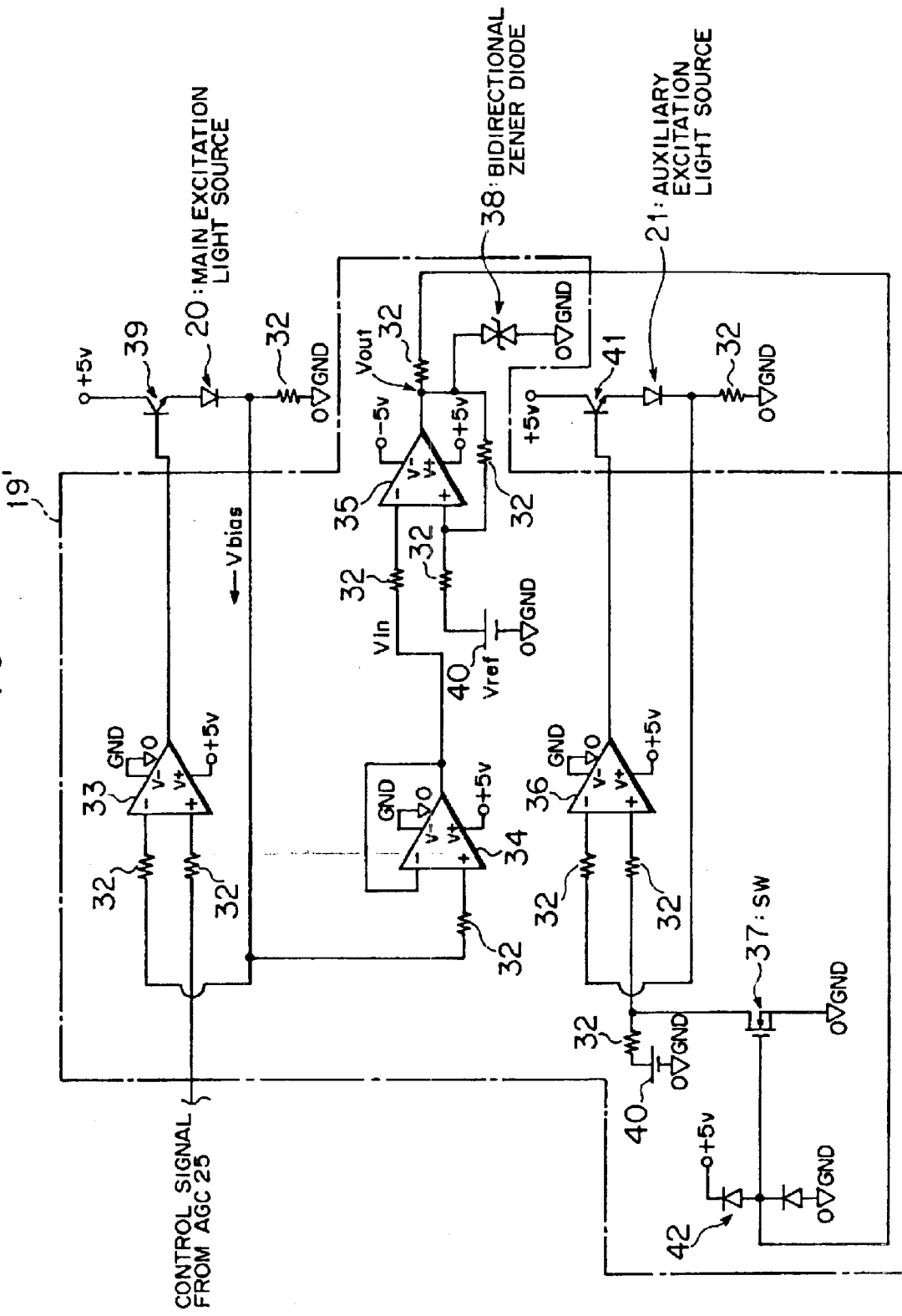
FIG. 13 is an illustration for explaining a construction of an optical amplifier according to a modification of the first embodiment of this invention.

In this case, as shown in FIG. 13, the MCU 19' comprises a plurality of resistors 32, a plurality of operational amplifiers (OP amplifiers) 33 to 36, a switch (SW) 37, a bidirectional Zener diode 38, a power source 40, and a voltage clamping diode 42.

Besides, transistors 39, 41 are connected to the main excitation light source 20 and the auxiliary excitation light source 21, respectively.

In this instance, the operational amplifier 34 serves as a buffer amplifier which receives a voltage developing from a drive current flowing through the resistor 32 (Vbias) connected to the main excitation light source 20, while the operational amplifier 35 is an inverting comparator with a hysteresis and functions as a decision section. Further, the operational amplifier 36 is an operational amplifier for driving a power transistor and works like the operational amplifier 33.

A description will be given of the control to be executed for the main excitation light source 20 and the auxiliary excitation light source 21 at this time. When a control signal from the AGC 25 is inputted through the operational amplifier 33 of the MCU 19' to the main excitation light source 20, a drive current flows through the main excitation light source 20, thereby creating a condition that excitation light is outputted from the main excitation light source 20.

When the drive current for the main excitation light source 20 is low, the voltage generated by the drive current (Vhigh) is below a threshold of the operational amplifier 35 (Vth, h) (this threshold corresponds to the value of a voltage generated by a drive current for the main excitation light source 20 when the number of channels is "8"), and hence, the output voltage of the operational amplifier 35 becomes Vhigh (see FIG. 14). Accordingly, the switch 37 turns ON, and the input voltage of the operational amplifier 36 is 0V, so that a drive current does not flow through the auxiliary excitation light source 21.

At this time, since the operational amplifying section 17 is subjected to the gain-fixing control by the AGC 25, when the number of channels in signal light to be inputted increases, the drive current for the main excitation light source 20 increases in order to increase the output amount of excitation light from the main excitation light source 20.

Figure 14:
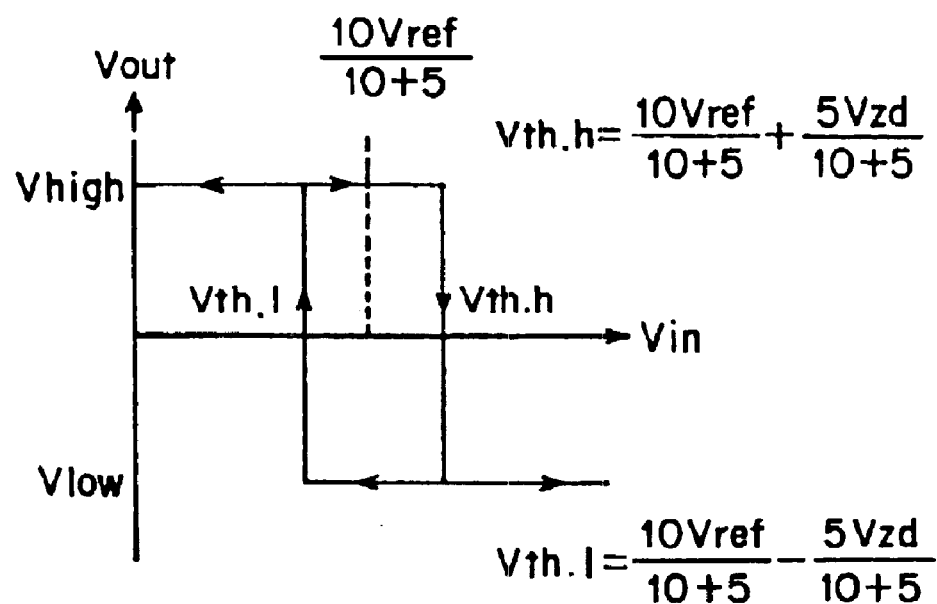
FIG. 14 is an illustration for explaining an operation of the optical amplifier according to the modification of the first embodiment of this invention.

If the drive current increases in this way and the voltage generated by the drive current (Vhigh) exceeds the threshold of the operational amplifier 35 (Vth, h), the output voltage of the operational amplifier 35 becomes Vlow (see FIG. 14). Accordingly, the switch 37 takes the OFF condition, and a drive current passes through the auxiliary excitation light source 21.

In the case of controlling the main excitation light source 20 and the auxiliary excitation light source 21 in this way, the same advantages as those of the above-described first embodiment are obtainable.

(d) Description of Second Embodiment

Figure 17:
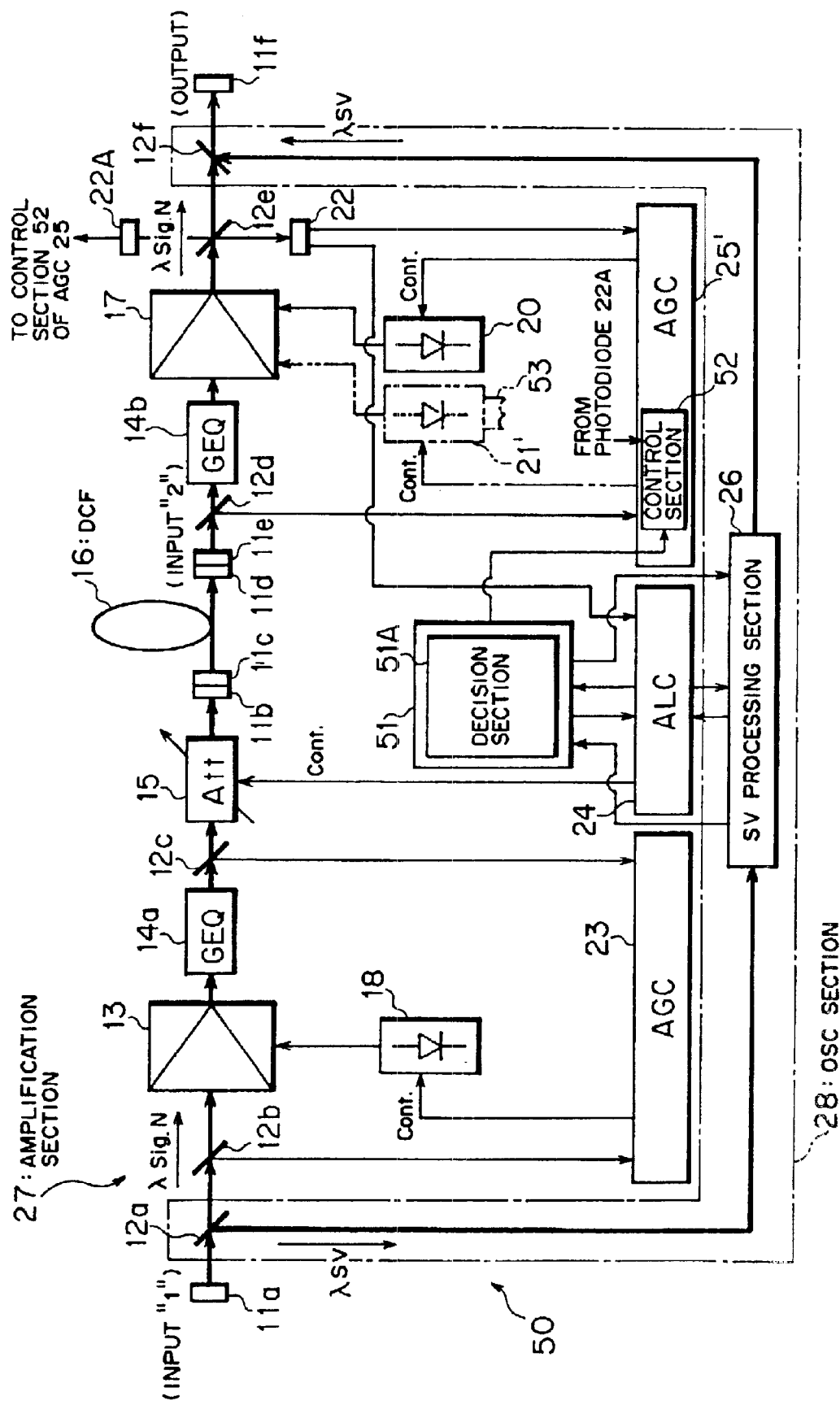
FIG. 17 is a block diagram showing a construction of the optical amplifier according to the second embodiment of this invention.

Whereas, in the above-described first embodiment, the auxiliary excitation light source 21 is not built in the control loop of the AGC 25, an auxiliary excitation light source 21' can stably be incorporated into the control loop of an AGC 25' by constructing an optical amplifier as shown in FIG. 17.

FIG. 17 is a block diagram showing a construction of an optical amplifier according to a second embodiment of this invention, and the optical amplifier 50, shown in FIG. 17, is also used as an optical amplifier for amplifying signal light, for example, in the wavelength-multiplexing optical communication system 100 shown in, FIG. 4, like the optical amplifier 10 according to the first embodiment.

This optical amplifier 50 is the same as that according to the above-described first embodiment, except that an auxiliary excitation light source 21' is provided in place of the auxiliary excitation light source 21, an MCU 51 is provided in place of the MCU 19, an AGC 25' is used instead of the AGC 25, the auxiliary excitation light source 21 is incorporated into the control loop of the AGC 25' as mentioned above, a temperature control section 53 is additionally attached to the auxiliary excitation light source 21, and an output signal from a reflected light monitoring photodiode 22A is inputted to the aforesaid control section 52.

In this instance, the MCU 51 is provided with a decision section 51A, while the AGC 25' is equipped with a control section 52. This control section 52 substantially has the same function as that of the ON/OFF control section 19B in the first embodiment. Further, in the second embodiment, the AGC 25' has a primary low-frequency transmission characteristic. Incidentally, this is the most general and basic control system.

Furthermore, the auxiliary excitation light source 21' has one figure smaller ratio between a control gain $G_2$ and a control time constant $\tau_2$ ($G_2/\tau_2$) than the ratio between a control gain $G_1$ and a control time constant $\tau_1$ of an main excitation light source 20 ($G_1/\tau_1$), and its excitation light output quantity is analog-controlled by the AGC 25'.

Besides, since this auxiliary excitation light source 21' is also capable of installing or removing in accordance with an increase/decrease in the number of channels in signal light to be inputted to an optical amplifying section 17, the auxiliary excitation light source 21' is indicated with a virtual line in FIG. 17. In addition, because of being incorporated into the control loop of the AGC 25', the auxiliary excitation light source 21' is located in the vicinity of the AGC 25'.

As mentioned above, if an auxiliary excitation light source to be installed is put in the preexisting control loop of the main excitation light source 20, a plurality of stable operating points exist to make the control unstable, but the stabilization of the control becomes possible by determining the control characteristic of the auxiliary excitation light source 21' as mentioned above. In this case, if the control gains are the same ($G_1=G_2$), a stable control system can be constructed in a manner that,the control time constants ($\tau_1$, $\tau_2$) are varied by one or more figures. Incidentally, an auxiliary excitation light source whose control time constant is set to be infinite is equivalent to the auxiliary excitation light source 21 in the above-described first embodiment.

Besides, the temperature control section 53 is for controlling the temperature in the vicinity of the auxiliary excitation light source 21', and for example, is constructed with a thermistor and a Peltier device.

In this case, since an excitation LD chip forming an excitation light source, normally generates an intense heat and since the operating temperature is required to be around the room temperature (ordinary temperature) for obtaining a high excitation light output, the temperature control section 53 is driven for executing the temperature control before the light emission of the auxiliary excitation light source 21'. At this time, there is need a protection time to be taken until the temperature is controlled to become stable.

Furthermore, after the temperatures in the vicinity of the auxiliary excitation light source 21' become stable 5 around the room temperature, the auxiliary excitation light source 21' is energized with a drive current to be operated with being incorporated into the control loop of the AGC 25', thereby allowing the construction of a stable control system.

With the above-described construction, also in the optical amplifier 50 according to the second embodiment of this invention, as in the case of the optical amplifier 10 according to the first embodiment, the amplification of signal light inputted is achievable, and, when the number of channels in the inputted signal light increases or decreases, the main excitation light source 20 and the auxiliary excitation light source 21' are controlled in order to supply the optical amplifying section 17 with excitation light in an amount corresponding to the number of channels after increased or decreased.

In this optical amplifier 50, as well as the optical amplifier 10 according to the first embodiment, a monitoring signal is separated from inputted signal light by means of a branch coupler 12a, and information on the number of channels in the inputted signal light is extracted from a number-of-channel variation notice signal, included in the monitoring signal, by the SV processing section 26 and, further, this number-of-channel information is inputted to the decision section 51A of the MCU 51.

The decision section 51A recognizes the number of channels in the inputted signal light on the basis of the aforesaid number-of-channel information to decide whether or not the number of channels in the inputted signal light is greater than a predetermined number of channels "8", preset within the decision section 51A.

In addition, the decision result by the decision section 51A is inputted to the control section 52 of the AGC 25' so that the output quantities of excitation light from the main excitation light source 20 and the auxiliary excitation light source 21' are controlled by the AGC 25' in accordance with the decision result. In this case, the control for the output quantities of excitation light from the main excitation light source 20 and the auxiliary excitation light source 21' are done as in the above-described first embodiment.

This optical amplifier 50 operates in the same way as that according to the first embodiment at the other points.

As described above, in the optical amplifier 50 according to the second embodiment of this invention, since the auxiliary excitation light source 21' can stably be incorporated into the control loop of the AGC 25', as in the case of the above-described optical amplifier 10 according to the first embodiment, even if the output quantity of excitation light from the auxiliary excitation light source 21' is controlled in conjunction with the increase/decrease in the number of channels in the inputted signal light, it is possible to supply the optical amplifying section 17 with the excitation light of an amount corresponding to the number of channels after increased or decreased without exerting adverse influence on the channels being in operation. Accordingly, even though the optical communication system 100 is in operation, the auxiliary excitation light source 21' is capable of stably installing or removing in accordance with an increase/decrease in the number of channels in signal light.

Besides, in this optical amplifier 50, since the auxiliary excitation light source 21' is built in the control loop of the AGC 25', it is possible to shorten the above-mentioned guard time.

Incidentally, even in the optical amplifier 50 according to the second embodiment, as in the case of the modification of the first embodiment, it is also appropriate that a decision section of an MCU decides, on the basis of information about an operating condition of the main excitation light source 20 (definitely, a drive current for operating the main excitation light source 20), whether or not the number of channels in inputted signal light is more than a predetermined number of channels "8".

Figure 27:
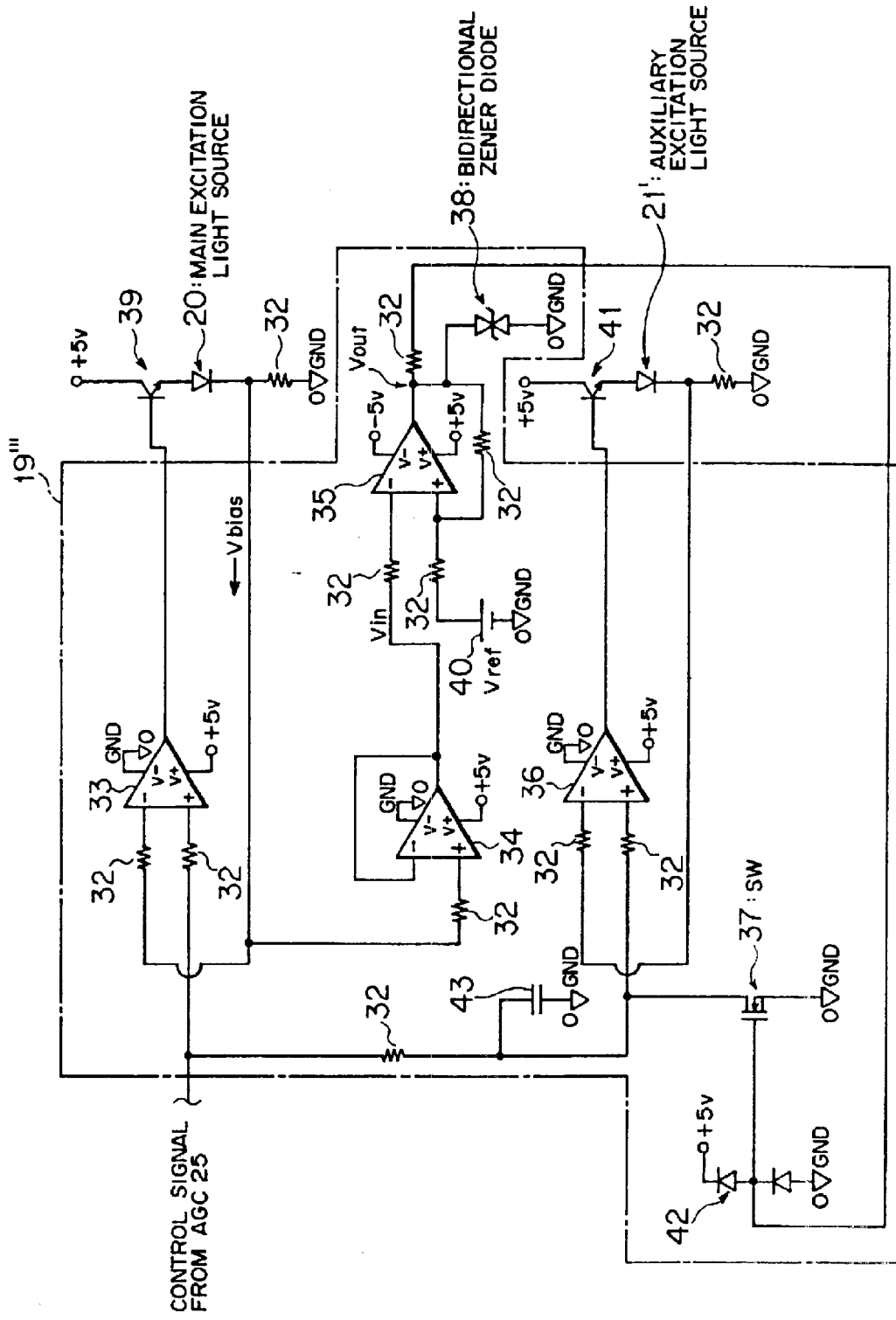
FIG. 27 is an illustration for describing the modification of the construction of the optical amplifier according to the second embodiment of this invention.

In this case, an MCU 19''' can be constructed as, shown in FIG. 27. The MCU 19''', shown in FIG. 27, substantially has the same construction as that of the MCU 19, shown in FIG. 13. A control signal from the AGC 25 is also inputted through the operational amplifier 36 to the auxiliary excitation light source 21' and, in order for the auxiliary excitation light source 21' to show a slower response as compared with the main excitation light source 20, a low-pass filter comprising a resistor 32 and a capacitor 43 lies in a control line to the auxiliary excitation light source 21'.

Additionally, as the information about the operating condition of the main excitation light source 20, it is also possible to use information on a leakage light quantity from the main excitation light source 20 or information on the quantity of the excitation light from the main excitation light source 20.

Figure 15:
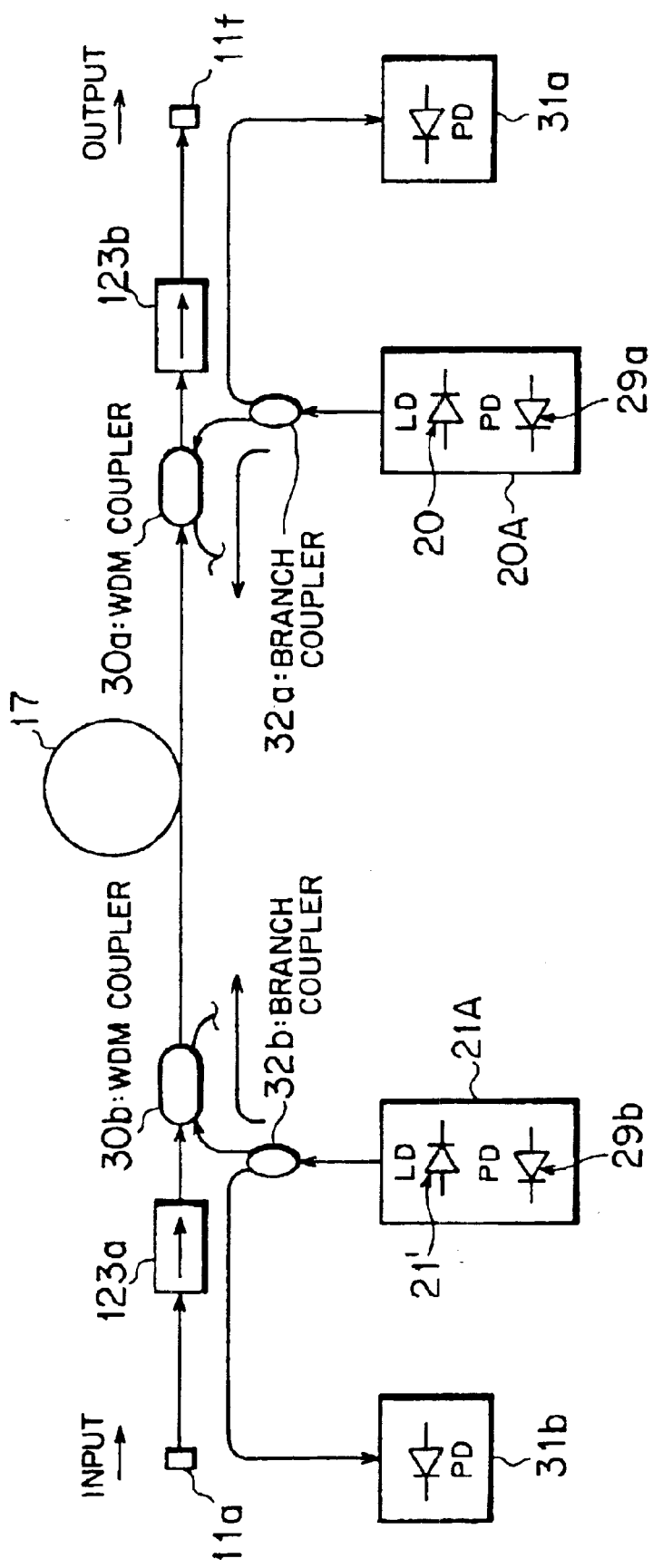
FIGS. 15 and 16 are illustrations for describing a modification of a construction of an optical amplifier according to a second embodiment of this invention.

In this case, as shown in FIG. 15, the optical amplifier 10 requires the installation of back power monitoring photodiodes 29a, 29b for monitoring the leakage light (back powers) from the main excitation light source 20 and the auxiliary excitation light source 21', respectively, and the installation of excitation light monitoring photodiodes 31a, 31b for monitoring the excitation light separated from the main excitation light source 20 and the auxiliary excitation light source 21', respectively. In this instance, the back power monitoring photodiodes 29a, 29b are installed at positions opposite to the light emission ends of the main excitation light source 20 and the auxiliary excitation light source 21', respectively.

Incidentally, in FIG. 15, the numeral 20A represents a main excitation light source module made up of the main excitation light source 20 and the back power monitoring photodiode 29a, and the numeral 21A designates an auxiliary excitation light source module composed of the auxiliary excitation light source 21' and the back power monitoring photodiode 29b. Further, the numerals 30a and 30b depict WDM couplers for multiplexing signal light and excitation light, while numerals 32a and 32b denote distributing couplers for separating excitation light.

Figure 16:
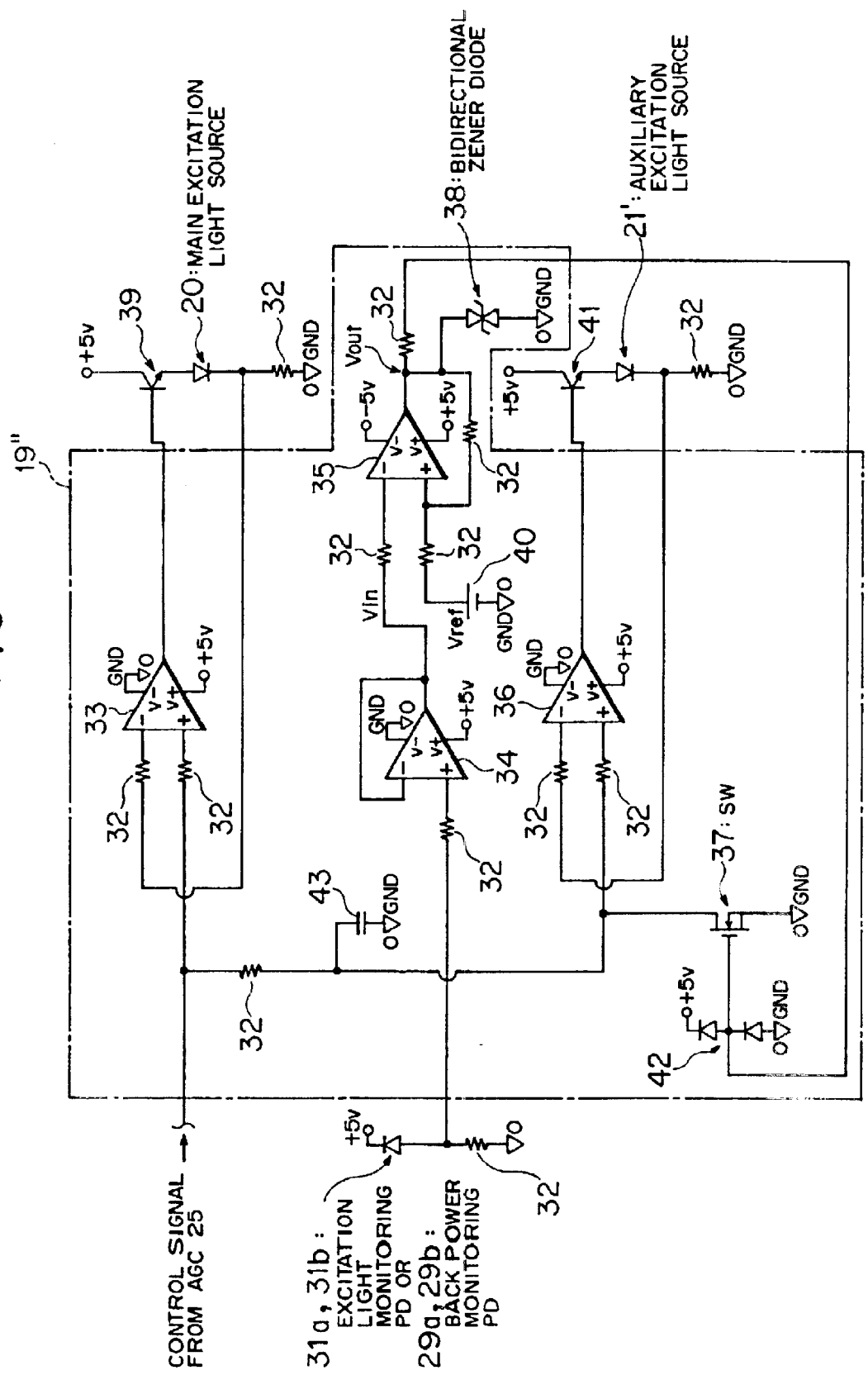

In this case, an MCU 19" is constructed with a hardware as shown in FIG. 16, and a control signal from the AGC 25 is made to be inputted through the MCU 19" to the main excitation light source 20 and the auxiliary excitation light source 21'.

Although the MCU 19" substantially has the same arrangement as that of the MCU 19' shown in FIG. 13, inputted to an operational amplifier 34 is not a voltage generated by a drive current for the main excitation light source 20 as in the case of the MCU 19' shown in FIG. 13, but a voltage generated by a current developing in the back power monitoring photodiodes 29a, 29b or the excitation light monitoring photodiodes 31a, 31b (photocurrent).

Like the MCU 19''' shown in FIG. 27, this MCU 19" is provided with a low-pass filter comprising a resistor 32 and a capacitor 43 lies in a control line to the auxiliary excitation light source 21', in order for the auxiliary excitation light source 21' to show a slower response as compared with the main excitation light source 20.

In addition, the control to be executed for the main excitation light source 20 and the auxiliary excitation light source 21' at this time are substantially similar to those mentioned before with reference to FIGS. 13 and 14.

It is naturally possible also in a first modification to employ, as the information about the operating condition of the main excitation light source 20, information on a leakage light amount from the main excitation light source 20 or information on an excitation light amount distributed from the main excitation light source 20.

(e) Others

A description will be made hereinbelow of modifications of the operations of the optical amplifiers 10 and 50 according to the above-described first and second embodiments.

(1) Instance of Securing Control Dynamic Range Corresponding to 2 Channels

In this instance, there is a need to use, as the excitation light source 20, a type which outputs, in addition to excitation light corresponding to 9 channels as the expected maximum output, extra excitation light corresponding to 3 channels. That is, in this case, as the main excitation light source 20, there is used as a type which is capable of outputting excitation light corresponding to 12 channels in total as the maximum output.

Figure 18:
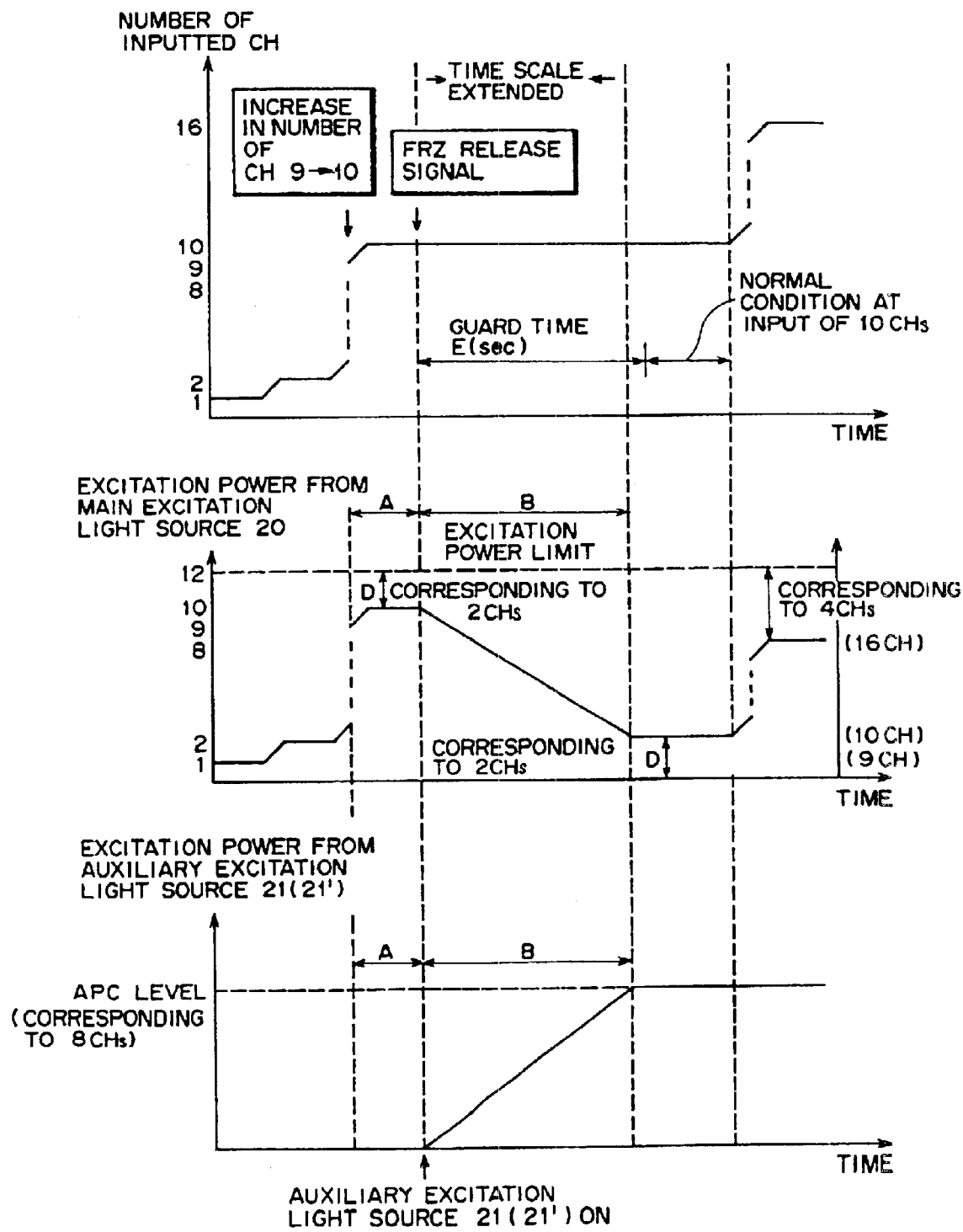
FIGS. 18 to 26 are illustrations for describing a modification of the operations of the optical amplifiers according to the first and second embodiments of this invention.
Figure 19:
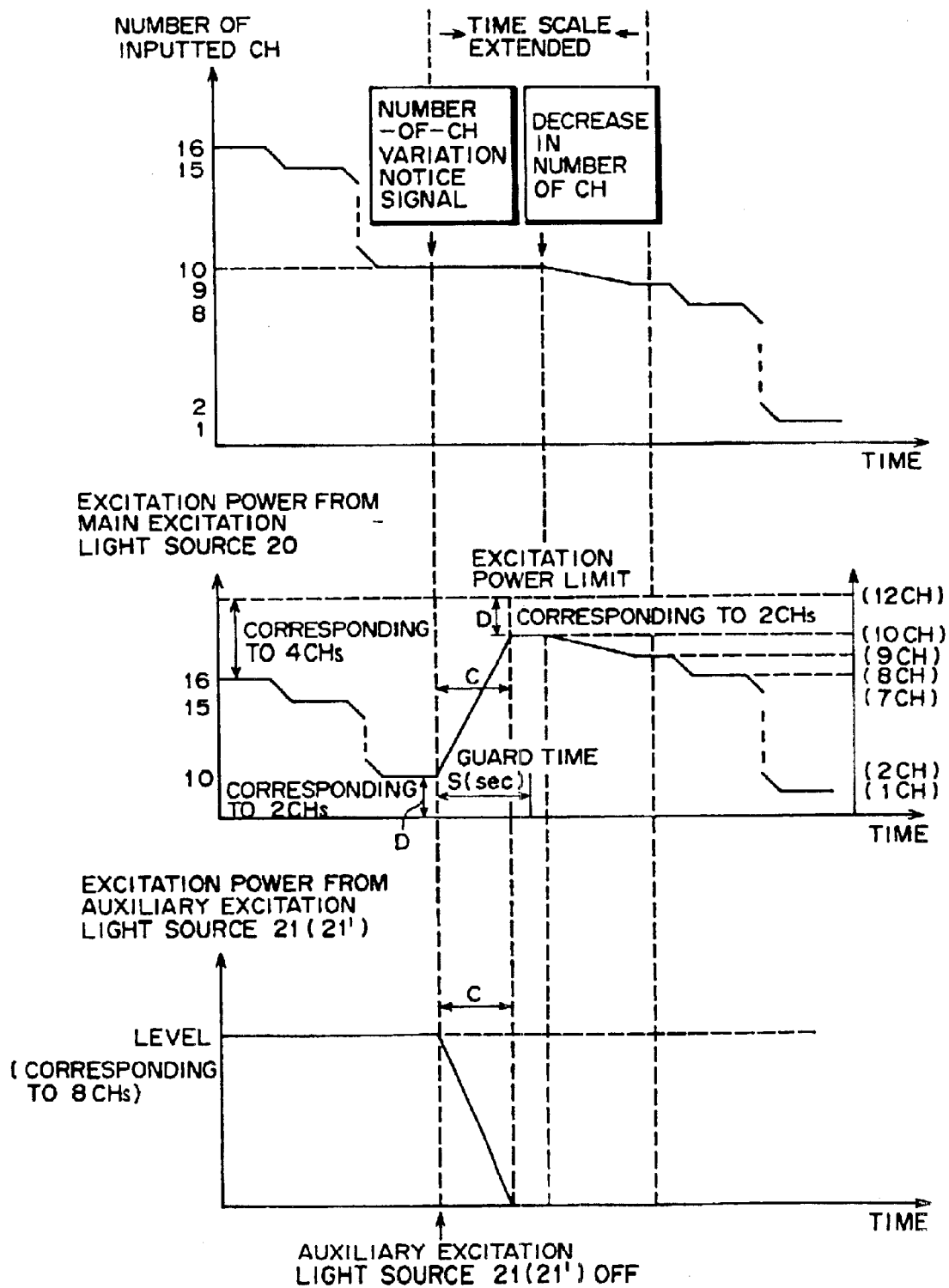

FIGS. 18 and 19 are illustrations of, in the case that such a main excitation light source 20 is put to use, the variations of quantities of excitation light from the main excitation light source 20 and the auxiliary excitation light source 21 when the number of channels in signal light increases and decreases. In FIGS. 18 and 19, the control dynamic range for 2 channels is designated at a reference mark D.

For the increase in the number of channels in the signal light, when the number of channels in the signal light increases from "9" to "10", only the main excitation light source 20 is controlled to output excitation light corresponding to 10 channels (see a reference mark A in FIG. 18), and subsequently, the auxiliary excitation light source 21 is turned ON.

In this way, as indicated by a reference mark B in FIG. 18, the excitation light is gradually outputted from the auxiliary excitation light source 21 (or the excitation light source 21': same in the following), and the excitation light is outputted from the main excitation light source 20 by a quantity determined in consideration of the excitation light quantity to be outputted from the auxiliary excitation light source 21.

Then, finally, the excitation light corresponding to 2 channels is outputted from the main excitation light source 20, while the excitation light corresponding to 8 channels is outputted from the auxiliary excitation light source 21, thus causing the output of the excitation light corresponding to 10 channels.

On the other hand, for the decrease in the number of channels in the signal light, when the number of channels in the signal light decreases from "10" to "9", the auxiliary excitation light source 21 is first turned OFF before decreasing the number of channels in the signal light.

Thus, as indicated by a reference mark C in FIG. 19, the excitation light quantity from the auxiliary excitation light source 21 gradually reduce, while excitation light is outputted from the main excitation light source 20 in a quantity determined in consideration of the excitation light quantity to be outputted from the auxiliary excitation light source 21. In consequence, the excitation light quantity from the auxiliary excitation light source 21 reaches zero, whereas the excitation light corresponding to 10 channels is outputted from the main excitation light source 20.

Following this, the main excitation light source 20 is controlled to output excitation light in a quantity corresponding to the number of channels in the signal light after decreased (the excitation light corresponding to 9 channels).

Incidentally, before and after the aforesaid increase/ decrease in the number of channels in the signal light, as in the first embodiment, the freeze processing and the freeze release processing are carried into execution.

Figure 20:
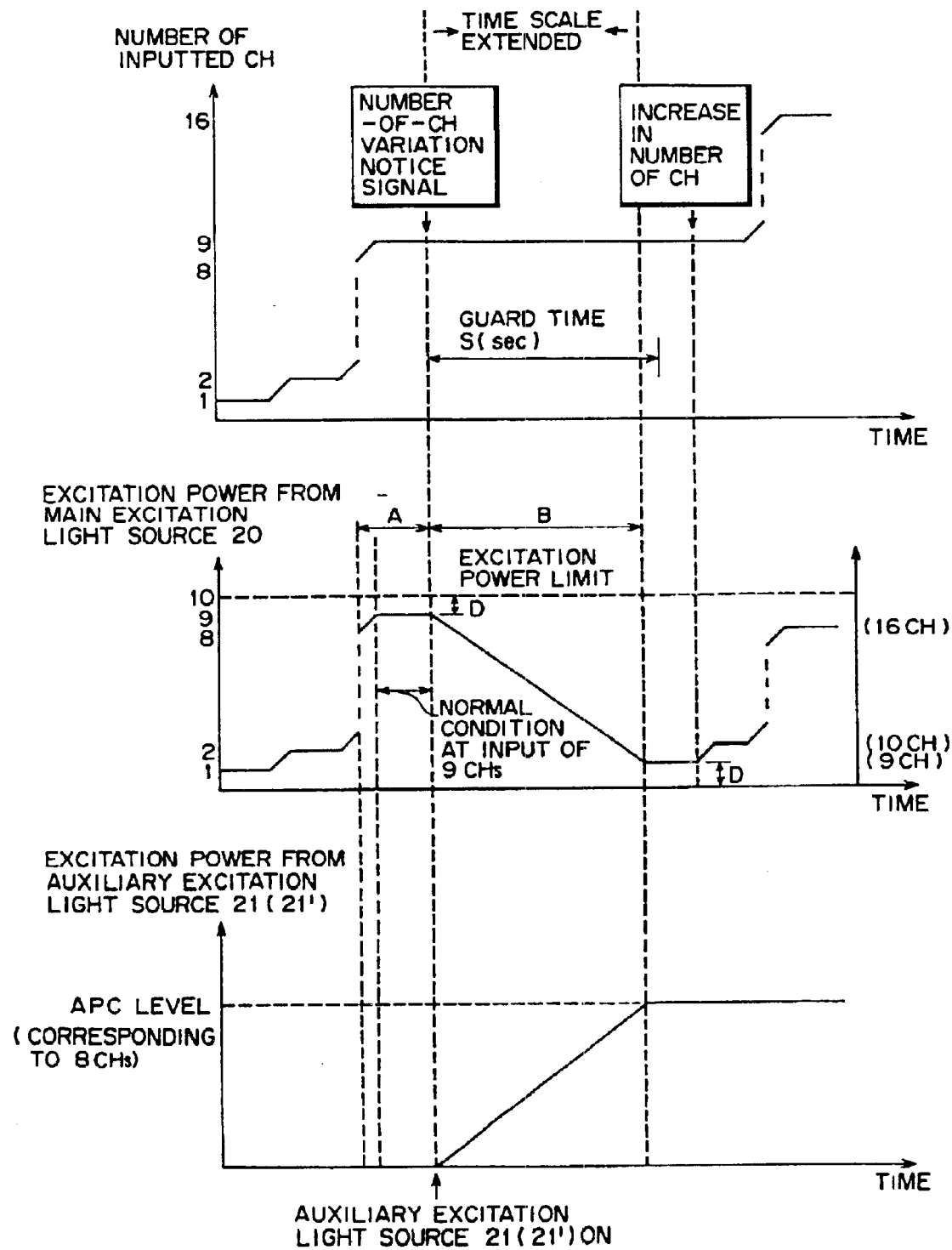
Figure 21:
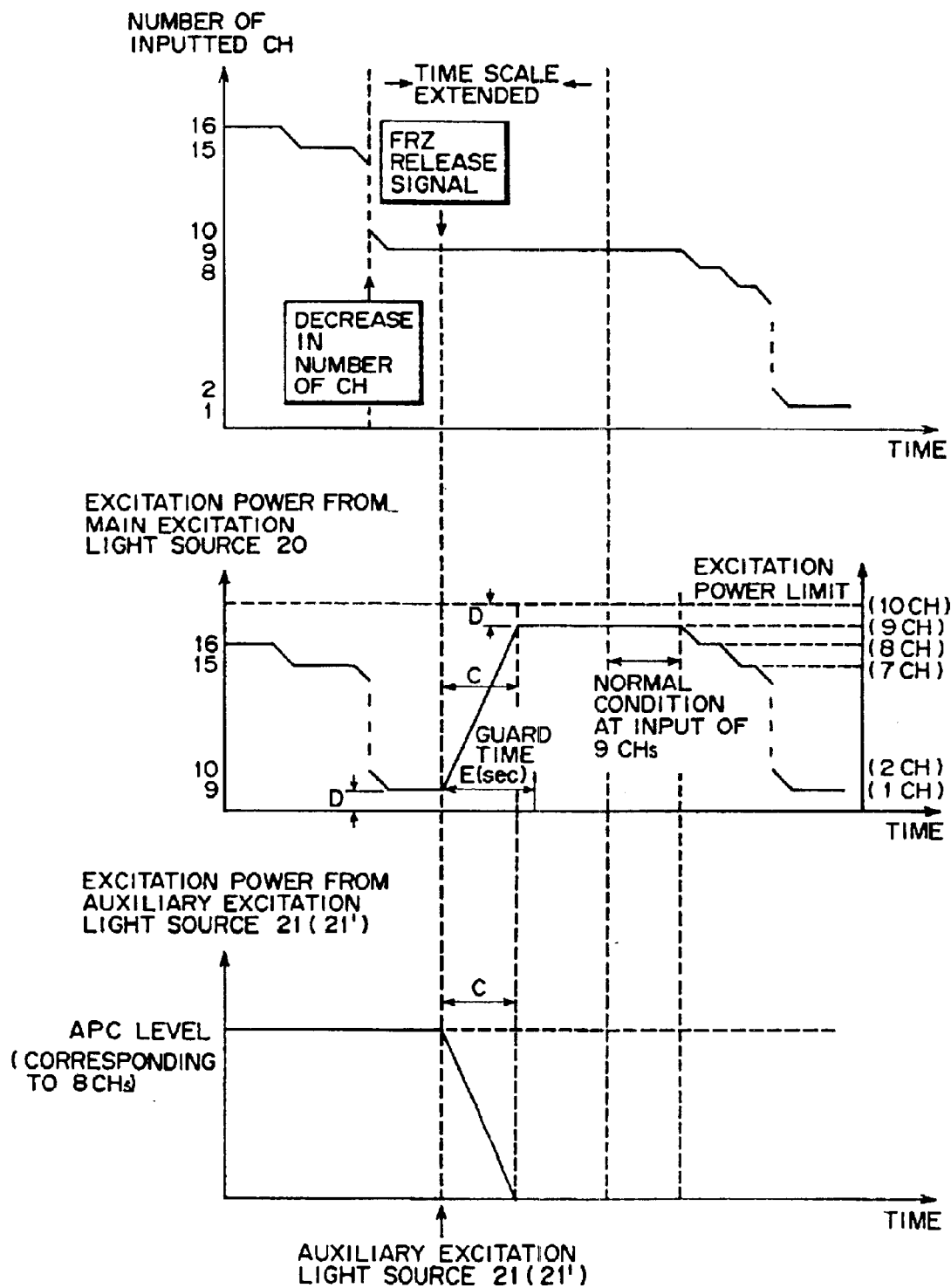

(2) Instance that Excitation Light Corresponding to 9 Channels is Outputted when Main Excitation Light Source 20 is in Steady State Although, in the above-described first and second embodiments, in the case that the excitation light corresponding to 9 channels is outputted in the steady state, the main excitation light source 20 outputs the excitation light corresponding to 1 channel while the auxiliary excitation light source 21 outputs the excitation light corresponding to 8 channels, it is also acceptable that, as shown in FIGS. 20 and 21, the main excitation light source 20 outputs the excitation light corresponding to 9 channels in the steady state.

(3) Instance that Auxiliary Excitation Light Source 21 is Composed of 2 Excitation Light Sources each Outputting Excitation Light Corresponding to 4 Channels In this instance, the ON/OFF control for the excitation light sources can be carried out in 2 steps. Further, in this case, "4" and "8" are set as the aforesaid predetermined number of channels in a memory or the like in the decision section 19A (or decision section 51A) of the MCU 19 (or MCU 51).

Figure 22:
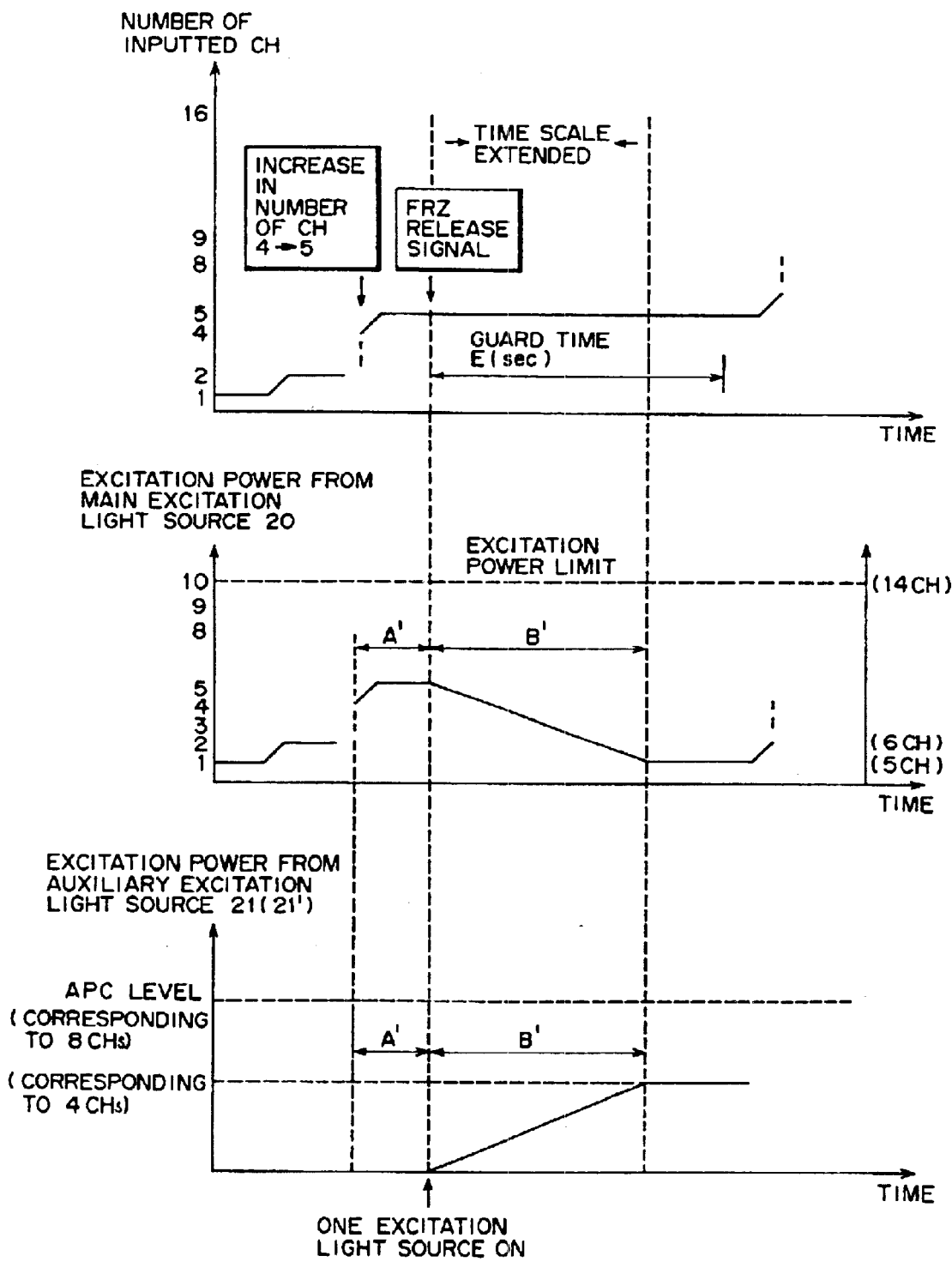
Figure 23:
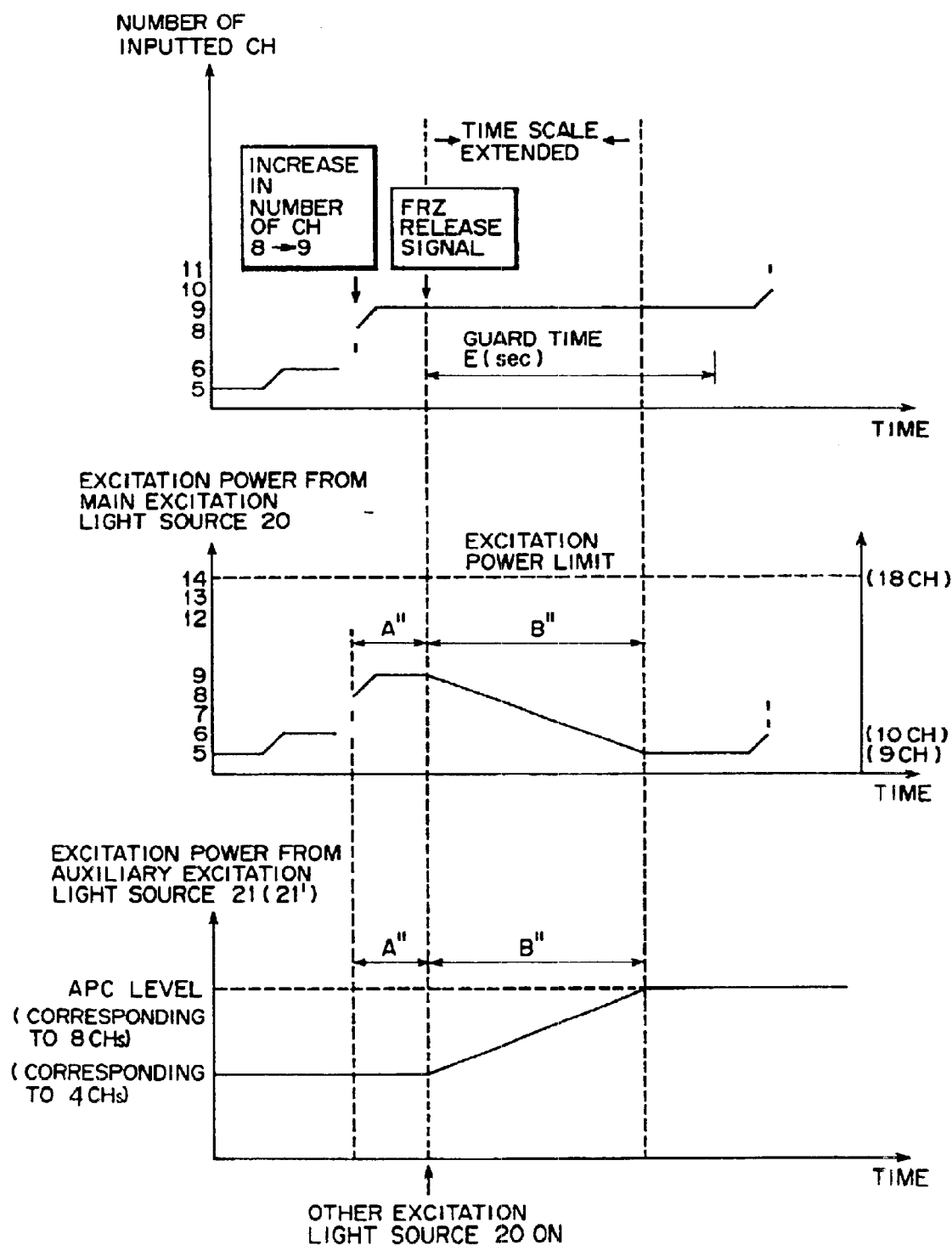
Figure 24:
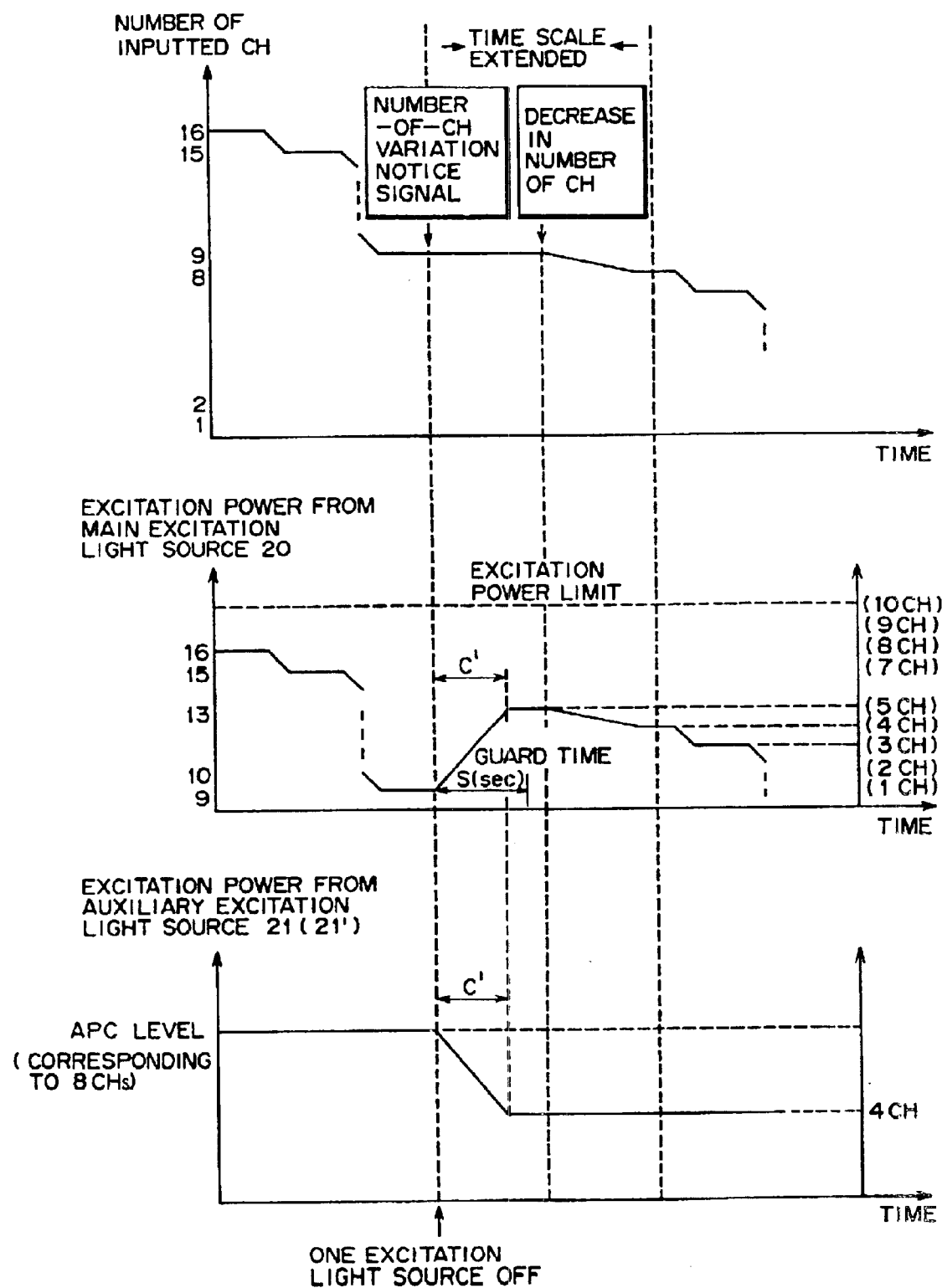
Figure 25:
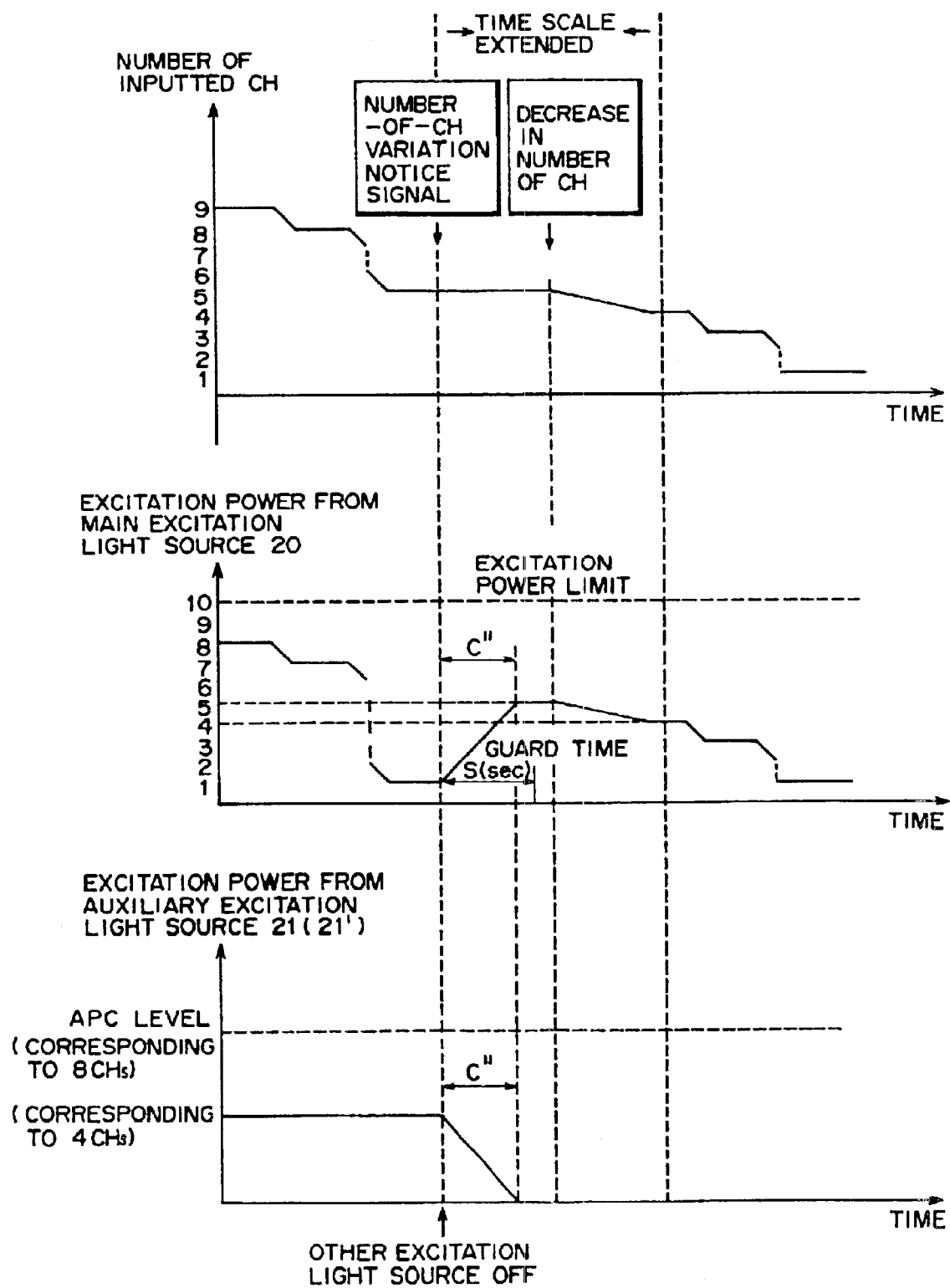

FIGS. 22 and 23 show, in the case of using such an auxiliary excitation light source 21, the variations of the quantities of excitation light (excitation powers) from the main excitation light source 20 and the auxiliary excitation light source 21 when the number of channels in signal light increases, and FIGS. 24 and 25 show the variations of the quantities of excitation light (excitation light powers) from the main excitation light source 20 and the auxiliary excitation light source 21 when the number of channels in the signal light decreases.

For the increase in the number of channels in the signal light, when the number of channels in the signal light increases from "4" to "5", the main excitation light source 20 is controlled to output the excitation light corresponding to 5 channels (see a reference mark A' in FIG. 22), and subsequently, one excitation light source included in the auxiliary excitation light source 21 is turned ON.

Thus, as indicated by a reference mark B' in FIG. 22, this first excitation light source gradually outputs excitation light, while the main excitation light source 20 outputs excitation light in a quantity determined in consideration of the excitation light quantity to be outputted from the first excitation light.

Then, finally, the excitation light corresponding to 1 channel is outputted from the main excitation light source 20, while the excitation light corresponding to 4 channels is outputted from the auxiliary excitation light source 21, thus causing the excitation light corresponding to 5 channels.

Furthermore, when the number of channels in the signal light increases from "8" to "9", after the main excitation light source 20 is controlled to output the excitation light corresponding to 9 channels (see a reference mark A" in FIG. 23), the other excitation light source included in the auxiliary excitation light source 21 is turned ON.

Thus, as indicated by a reference mark B" in FIG. 23, this second excitation light source gradually outputs excitation light excitation light source, while the main excitation light source 20 outputs excitation light in a quantity determined in consideration of the excitation light quantity to be outputted from the second excitation light source.

Finally, the excitation light corresponding to 1 channel is outputted from the main excitation light source 20, while the excitation light corresponding to 8 channels is outputted from the auxiliary excitation light source 21, thus producing the output of the excitation light corresponding to 9 channels.

On the other hand, for the decrease in the number of channels in the signal light, when the number of channels in the signal light decreases from "9" to "8", one excitation light source included in the auxiliary excitation light source 21 is first turned OFF before the decrease in the number of channels in the signal light.

In this way, as indicated by a reference mark C' in FIG. 24, the quantity of excitation light from this first excitation light source gradually decreases, and the main excitation light source 20 outputs excitation light in a quantity determined in consideration of the excitation light quantity to be outputted from the first excitation light source. As a result, the excitation light corresponding to 4 channels is outputted from the auxiliary excitation light source 21, while the excitation light corresponding to 5 channels is outputted from the main excitation light source 20.

After this, in order to output excitation light in a quantity corresponding to the number of channels in the signal light after decreased (the excitation light corresponding to 8 channels), the control is carried out so that the quantity of the excitation light to be outputted from the main excitation light source 20 is reduced by 1 channel. In consequence, the excitation light corresponding to 4 channels is outputted from the auxiliary excitation light source 21, while the excitation light corresponding to 4 channels is outputted from the main excitation light source 20.

Moreover, when the number of channels in the signal light decreases from "5" to "4", the other excitation light source included in the auxiliary excitation light source 21 is turned OFF before decreasing the number of channels in the signal light.

In this way, as indicated by a reference mark C" in FIG. 25, excitation, light quantity from this second excitation light source gradually decreases, while the main excitation light source 20 outputs excitation light in a quantity determined in consideration of the excitation light quantity to be outputted to the second excitation light source. As a result, the excitation light quantity from the auxiliary excitation light source 21 reaches zero, while the excitation light corresponding to 5 channels is outputted from the main excitation light source 20.

Thereafter, in order to output excitation light in a quantity corresponding to the number of channels in the signal light after decreased (the excitation light corresponding to 4 channels), the control is carried out so that the quantity of the excitation light to be outputted from the main excitation light source 20 is reduced by 1 channel. In consequence, the excitation light corresponding to 4 channels is outputted from the auxiliary excitation light source 21.

Incidentally, before and after the aforesaid increase/decrease in the, number of channels in the signal light, as in the first embodiment, the freeze processing and the, freeze release processing are carried into execution.

Moreover, as in the case mentioned before, it is naturally possible to secure the control dynamic range for 2 waves.

Besides, as the foregoing main excitation light source 20 and auxiliary excitation light source 21 (or auxiliary excitation light source 21'), it is also possible to employ a type which outputs excitation light other than 8 channels, such as a type which outputs excitation light corresponding to 4 channels and a type which outputs excitation light corresponding to 12 channels. In this case, the control for the output quantities of excitation light from the main excitation light source 20 and the auxiliary excitation light source 21 (or auxiliary excitation light source 21') can be executed as well as those described in the first and second embodiments.

Furthermore, it is also appropriate that the temperature control section 53 described in the second embodiment is additionally provided on the auxiliary excitation light source 21 of the optical amplifier 10 according to the first embodiment, or that it is additionally placed on the main excitation light sources 20 of the optical amplifiers 10 and 50 according to the first and second embodiments.

Still further, it is also acceptable to provide a plurality of auxiliary excitation light sources each equal to the above-described auxiliary excitation light source and to apply this invention in controlling the output of excitation light from the second auxiliary excitation light source.

Although, in each of the above-described embodiments, each of the auxiliary excitation light sources 21, 21' is controlled to output excitation light after the freeze release processing is carried into execution (that is, after the control for the optical, amplifying section 17 is returned to the level-fixing control), it is also appropriate that each of the auxiliary excitation light sources 21, 21' is controlled to output the excitation light before the freeze release processing is carried into execution (that is, while the optical amplifying section 17 is under the gain-fixing control).

Besides, it is also possible that the signal transmission section 101 or the transmission side optical amplifier is equipped with the function of the MCU 19. Particularly, if the function of the MCU 19 is given to the signal transmission section 101, the freeze release signal can be used as a timing signal for ON/OFF of the auxiliary excitation light sources 21, 21'.

Each of the optical amplifiers 10, 50 according to each of the above-described embodiments is equipped with an amplification optical fiber (a component of the optical amplifying section 17), which is doped with a rare earth element and receives a plurality of optical signals having different wavelengths, and is constructed to increase or decrease the number of excitation light sources (the number of auxiliary excitation light sources 21, 21') for supplying excitation light to the amplification optical fiber in accordance with the number of optical signals to be inputted.

Furthermore, each of the optical amplifiers 10, 50 of each of the above-described embodiments are controlled to identify the number of a plurality of optical signals having different wavelengths and to vary the number of excitation light sources (the number of auxiliary excitation light sources 21, 21') for supplying excitation light to the aforesaid amplification optical fiber in accordance with the number of optical signals identified.

(4) Instance that Decision is Made, on the Basis of the Monitoring Result of Power of Inputted Signal Light, as to Whether or not the Number of Channels in Inputted Signal Light is Greater Than a Predetermined Number of Channels Although, in the description of the first embodiment, the decision section 19A of the MCU 19 recognizes the number of channels in inputted signal light on the basis of number-of-channel information, extracted from a number-of-channel variation notice signal included in a monitoring signal, to decide whether or not the number of channels in the inputted signal light is more than a predetermined number of channels "8", it is also appropriate that a decision section 19A of an MCU decides, on the basis of the monitoring result of power of the inputted signal light, whether the number of channels in the inputted signal light is more than the predetermined number of channels "8". Although a monitor for the power of the inputted signal light (that is, a monitor for the power of input "2") is omitted from the optical amplifier 10 shown in FIG. 2, an input monitor such as a PD provided in the AGC 25 can fulfill the function to monitor the power of the inputted signal light.

In the optical amplifier 10 shown in FIG. 2, the power of inputted signal light to the optical amplifying section 17, forming a succeeding amplifying section, is controlled to be constant (for example, −12 dBm/ch) at the initial start-up. For instance, in this optical amplifier 10, the attenuation factor of the variable attenuator 15 is controlled so that the power of the inputted signal light to the optical amplifying section 17 becomes −12 dBm/ch, that is, when the inputted signal light holds 8 channels, so that the power of the inputted signal light becomes −3 dBm [−12 +9=−3 (dBm)]. In FIG. 2, because of being congested, the control lines are omitted from the illustration.

The aforesaid value of −12 dBm/ch does not vary in the case of the level-fixing control (ALC control), the gain-fixing control (AGC control) or the increase/decrease in the number of channels in inputted signal light. For this reason, it is also possible that the ON/OFF control of the auxiliary excitation light source 21 is carried out by comparing the magnitude of the power of the inputted signal light to the optical amplifying section 17 with a predetermined threshold.

More specifically, the threshold can be set to −3 dBm when the inputted signal light holds 8 channels (in fact, the threshold can be set to a value between the power of the inputted signal light when the number of channels is "8" and the power of the inputted signal light when the number of channels is "9") so that a decision is made to that the number of channels in the inputted signal light is more than "8" when the power of the inputted signal light to the optical amplifying section 17 exceeds −3 dBm, thereby making the auxiliary excitation light source 21 emit light.

In this case, the speed of the increase/decrease in the number of channels is set so that the operations of the main excitation light source 20 and the auxiliary excitation light source 21 are sufficiently followable. In other words, the speed of the ON/OFF control of the auxiliary excitation light source 21 is set to be higher than the speed of the increase/decrease in the number of channels (switching speed of the number of channels).

In the case that the number of channels increases to exceed a predetermined number of channels "8" (for example, in the case that the number of channels changes from "4" to "12"), if the speed of turning ON the auxiliary excitation light source 21 is lower than the speed of switching the number of channels, there is a need to increase the number of channels in three steps: from "4" to "8", from "8" to "9" and from "9" to "12". The above-mentioned manner, by contrast, can offer an advantage in that the number of channels can be increased from "4" to "12" at a time because the speed of turning ON the auxiliary excitation light source 21 is higher than the variation of the power of the inputted signal light at the switching of the number of channels.

Figure 26:
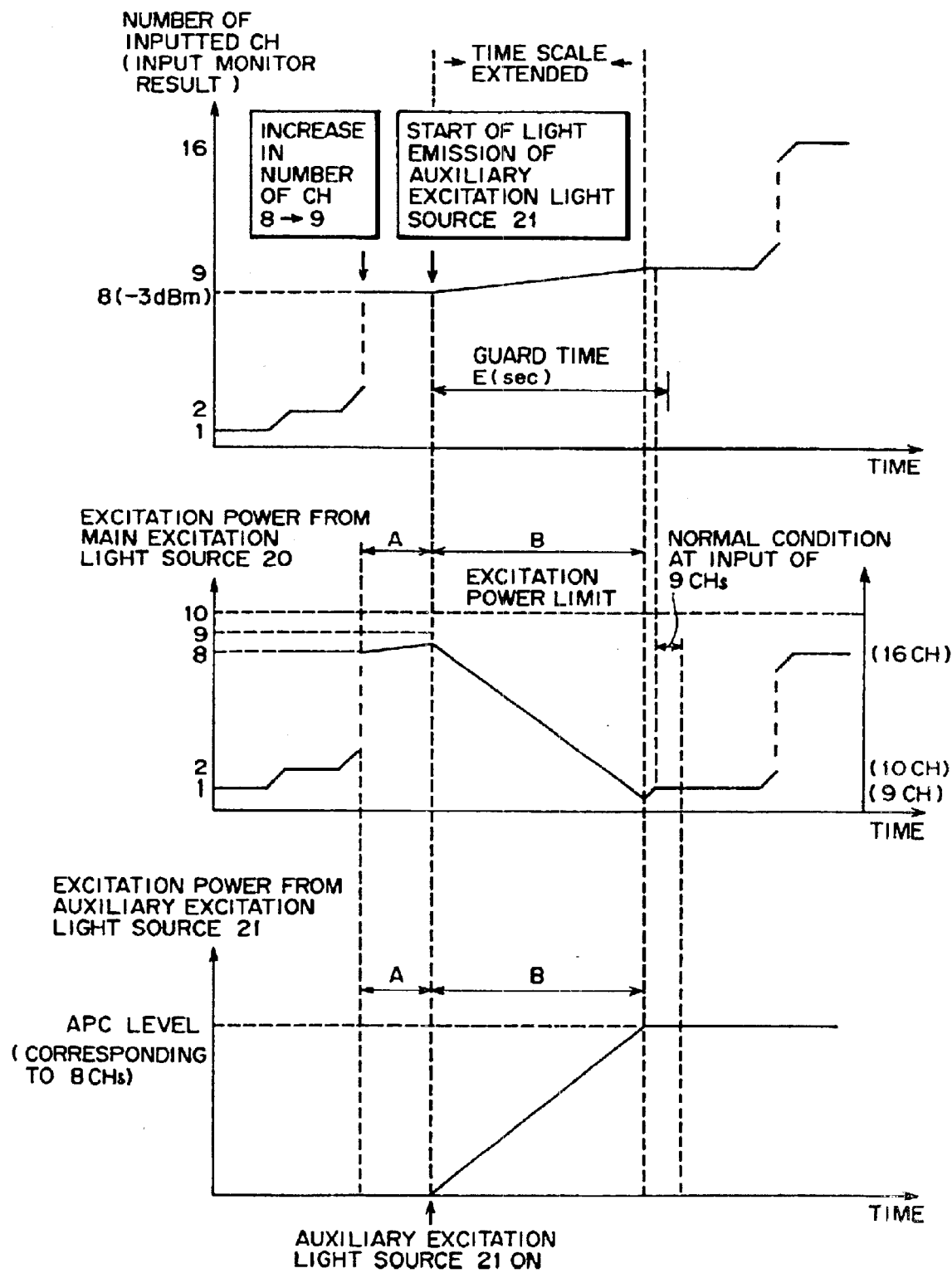

In this case, shown in FIG. 26 are the variations of excitation light quantities (excitation light powers) from the main excitation light source 20 and the auxiliary excitation light source 21 at the increase in the number in channels in signal light.

Besides, the other points are the same as those in the first embodiment.

(5) Instance that the Number of Channels in Signal Light is Recognized on the Basis of a Number-of-Channel Variation Notice Signal, Included in a Monitoring Signal, and that a Speed of Increase/Decrease in the Number of Channels is Set so that Operations of Main Excitation Light Source 20 and Auxiliary Excitation Light Source 21 are Sufficiently Followable That is, even if, like the above-described first embodiment, the decision section 19A of the MCU 19 recognizes the number of channels in inputted signal light on the basis of number-of-channel information, extracted from a number-of-channel variation notice signal included in a monitoring signal, to decide whether or not the number of channels in the inputted signal light is more than a predetermined number of channels "8" and, as described in (4), the speed of the increase/decrease in the number of channels is set so that the operations of the main excitation light source 20 and the auxiliary excitation light source 21 are sufficiently followable (the speed of the ON/OFF control of the auxiliary excitation light source 21 is set to be higher than the speed of the increase/decrease in the number of channels), the same advantages as those of the first embodiment and those described in (4) are obtainable.

Industrial Applicability

As described above, in an optical amplifier according to this invention, since the operations of a main excitation light source and an auxiliary excitation light source are controlled by an excitation light source control section, even in the case that the output of excitation light from the auxiliary excitation light source is controlled in connection with an increase/decrease in the number of channels in inputted signal light, excitation light can be supplied to an optical amplifying section by a quantity conforming to the number of channels after increased or decreased without exerting adverse influence on the channels being in operation. Whereupon, even when an optical communication system is in operation, the auxiliary excitation light source is capable of stably installing or removing in accordance with the increase/decrease in the number of channels in the signal light.

Accordingly, this invention can suitably be used in increasing or decreasing the number of channels in signal light while the optical communication system is in operation, and it is considered that it has an extremely high usability.

What is claimed is:

1. An optical communication system comprising:
    an optical transmission line;
    a transmitting section transmitting an optical signal through the transmission line, the optical signal having a variable number of channels associated with different wavelengths;
    a receiving section receiving the optical signal transmitted through the transmission line; and
    an optical amplifier to which a plurality of pumping light sources are optically and separably connected and which amplifies the optical signal after being transmitted by the transmitting section and before being received by the receiving section, wherein a pumping power provided by each of the pumping light sources enables the optical amplifier to amplify the optical signal having a predetermined number of channels, and the number of the pumping light sources to be connected to the optical amplifier is determined based on the number of channels included in the optical signal and the predetermined number of channels,
    the number of pumping light sources providing pumping power to the optical amplifier to amplify the optical signal thereby being controlled in accordance with the number of channels included in the optical signal and so that, if required in accordance with the number of channels included in the optical signal, two or more pumping light sources concurrently provide pumping power to the optical amplifier to amplify the optical signal.

2. An optical communication system according to claim 1, wherein the optical amplifier comprises:
    a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

3. An optical communication system according to claim 1, further comprising:
    a controller having a constant gain mode in which the optical amplifier is controlled to amplify the optical signal with an approximately constant gain, the controller being operable in the constant gain mode when the number of the pumping light sources to be connected to the optical amplifier is adjusted in response to variation of the number of channels.

4. An optical communication system according to claim 3, wherein the optical amplifier comprises:
    a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

5. An optical communication system according to claim 1, further comprising:
    a controller having a predetermined level mode in which the optical amplifier is controlled to output the amplified optical signal with a predetermined level when each of the pumping light sources, connected to the optical amplifier, provides the pumping power to the optical amplifier.

6. An optical communication system according to claim 5, wherein the optical amplifier comprises:
    a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

7. An optical transmission system comprising:
    an optical transmission line;
    a transmitting section transmitting an optical signal through the transmission line, the optical signal having a variable number of channels associated with different wavelengths;
    a receiving section receiving the optical signal transmitted through the transmission line; and
    an optical amplifier amplifying the optical signal after being transmitted by the transmitting section and before being received by the receiving section; and
    means for optically and separably connecting, to the optical amplifier, a plurality of pumping light sources each of which is able to provide a pumping power, wherein the pumping power enables the optical amplifier to amplify the optical signal having a predetermined number of channels, and the number of the pumping light sources to be connected to the optical amplifier by said means is determined based on the number of channels included in the optical signal and the predetermined number of channels, the number of pumping light sources providing pumping power to the optical amplifier to amplify the optical signal thereby being controlled in accordance with the number of channels included in the optical signal and so that, if required in accordance with the number of channels included in the optical signal, two or more pumping light sources concurrently provide pumping power to the optical amplifier to amplify the optical signal.

8. An optical communication system according to claim 7, wherein said means comprises:

a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

9. An optical communication system according to claim 7, further comprising:

a controller having a constant gain mode in which the optical amplifier is controlled to amplify the optical signal with an approximately constant gain, the controller being operable in the constant gain mode when the number of the pumping light sources to be connected to the optical amplifier is adjusted in response to variation of the number of channels.

10. An optical communication system according to claim 9, wherein said means comprises:

a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

11. An optical communication system according to claim 7, further comprising:

a controller having a predetermined level mode in which the optical amplifier is controlled to output the amplified optical signal with a predetermined level when each of the pumping light sources, connected to the optical amplifier, provides the pumping power to the optical amplifier.

12. An optical communication system according to claim 11, wherein said means comprises:

a controller which receives a supervisory signal transmitted from upstream of the optical amplifier, determines the number of channels in the optical signal from the received supervisory signal, determines which pumping light sources to connect to the optical amplifier in accordance with the determined number of channels, and then connects the determined pumping light sources to the optical amplifier.

13. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line; and an optical amplifier to which a plurality of pumping light sources are optically connectable and which amplifies the optical signal after being transmitted by the transmitting section and before being received by the receiving section, wherein the plurality of pumping light sources include a main pumping light source connected to the optical amplifier and at least one auxiliary pumping light source to be separably connected to the optical amplifier, a pumping power provided by each of the pumping light sources enables the optical amplifier to amplify the optical signal having a predetermined number of channels, and a number of the auxiliary pumping light sources to be connected to the optical amplifier is determined based on the number of channels included in the optical signal and the predetermined number of channels, the number of pumping light sources providing pumping power to the optical amplifier to amplify the optical signal thereby being controlled in accordance with the number of channels included in the optical signal and so that, if required in accordance with the number of channels included in the optical signal, the main pumping light source and at least one auxillary pumping light source concurrently provide pumping power to the optical amplifier to amplify the optical signal.

14. An optical communication system according to claim 13, wherein the optical amplifier comprises:

a controller which receives a supervisory signal transmitted from upstream of the optical amplifier, determines the number of channels in the optical signal from the received supervisory signal, determines which auxiliary pumping light sources to connect to the optical amplifier in accordance with the determined number of channels, and then connects the determined auxiliary pumping light sources to the optical amplifier.

15. An optical communication system, comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section; and means for optically connecting, to the optical amplifier, a plurality of pumping light sources each of which is able to provide a pumping power, wherein the plurality of pumping light sources include a main pumping light source connected to the optical amplifier and at least one auxiliary pumping light source to be separably connected to the optical amplifier, a pumping power provided by each of the pumping light sources enables the optical amplifier to amplify the optical signal having a predetermined number of channels, and a number of auxiliary pumping light sources to be connected to the optical amplifier is determined based on the number of channels included in the optical signal and the predetermined number of channels, the number of pumping light sources providing pumping power to the optical amplifier to amplify the optical signal thereby being controlled in accordance with the number of channels included in the optical signal and so that, if required in accordance with the number of channels included in the optical signal, the main pumping light source and at least one auxilary pumping light source concurrentyly provide pumping power to the optical amplifier to amplify the optical signal.

16. An optical communication system according to claim 15, wherein said means comprises:

a controller which receives a supervisory signal transmitted from upstream of the optical amplifier, determines the number of channels in the optical signal from the received supervisory signal, determines which auxiliary pumping light sources to connect to the optical amplifier in accordance with the determined number of channels, and then connects the determined auxiliary pumping light sources to the optical amplifier.

17. An optical communication system, comprising:

an optical transmission line;

a transmitting section transmitting an optical signal through the transmission line, the optical signal having a variable number of channels;

a receiving section receiving the optical signal transmitted through the transmission line;

an optical amplifier amplifying the optical signal after being transmitted by the transmitting section and before being received by the receiving section;

a plurality of pumping light sources; and a controller controlling each of the pumping light sources to be in a first state in which the pumping light source provides pump light to the optical amplifier or a second state in which the pumping light source does not provide pump light to the optical amplifier, the optical amplifier amplifying the optical signal in accordance with pump light provided by the pumping light sources controlled to be in the first state, each pumping light source having a corresponding predetermined number indicating a number of channels included in the optical signal at which pump power provided by the respective pumping light source is to be used for amplifying the optical signal, wherein the controller determines which of said plurality of pumping light sources are controlled to be in the first state in accordance with a number of channels actually included in the optical signal and the predetermined number corresponding to each pumping light source, the number of pumping light sources providing pump light to the optical amplifier to amplify the optical signal thereby being controlled in accordance with the number of channels actually included in the optical signal and so that, if required in accordance with the number of channels actually included in the optical signal, at least two pumping light sources concurrently provide pump light to the optical amplifier to amplify the optical signal.

18. An optical communication system according to claim 17, wherein the controller receives a supervisory signal transmitted from upstream of the optical amplifier, determines the number of channels in the optical signal from the received supervisory signal, determines which of the plurality of pumping light sources are to be controlled to be in the first state in accordance with the determined number of channels, and then controls the determined pumping light sources to be in the first state.

19. An optical communication system according to claim 17, further comprising:

a gain controller having a constant gain mode in which the optical amplifier is controlled to amplify the optical signal with an approximately constant gain, the gain controller being operable in the constant gain mode when a number of the pumping light sources controlled to be in the first state is adjusted in response to variation of the number of channels.

20. An optical communication system according to claim 19, wherein the controller receives a supervisory signal transmitted from upstream of the optical amplifier, determines the number of channels in the optical signal from the received supervisory signal, determines which of the plurality of pumping light sources are to be controlled to be in the first state in accordance with the determined number of channels, and then controls the determined pumping light sources to be in the first state.

21. An optical communication system according to claim 17, further comprising:

a level controller having a predetermined level mode in which the optical amplifier is controlled to output the amplified optical signal with a predetermined level when each of said plurality of pumping light sources is in the first state.

22. An optical communication system according to claim 21, wherein the controller receives a supervisory signal transmitted from upstream of the optical amplifier, determines the number of channels in the optical signal from the received supervisory signal, determines which of the plurality of pumping light sources are to be controlled to be in the first state in accordance with the determined number of channels, and then controls the determined pumping light sources to be in the first state.

23. An optical communication system according to claim 17, wherein the controller electrically controls each of the pumping light sources to be in the first or second state.

24. An optical communication system according to claim 23, wherein the controller receives a supervisory signal transmitted from upstream of the optical amplifier, determines the number of channels in the optical signal from the received supervisory signal, determines which of the plurality of pumping light sources are to be controlled to be in the first state in accordance with the determined number of channels, and then controls the determined pumping light sources to be in the first state.

25. An optical communication system comprising:

an optical transmission line;

a transmitting section transmitting an optical signal through the transmission line, the optical signal having a variable number of channels;

a receiving section receiving the optical signal transmitted through the transmission line;

an optical amplifier amplifying the optical signal after being transmitted by the transmitting section and before being received by the receiving section;

a plurality of pumping light sources;

means for controlling each of the pumping light sources to be in a first state in which the pumping light source provides pump light to the optical amplifier or a second state in which the pumping light source does not provide pump light to the optical amplifier, the optical amplifier amplifying the optical signal in accordance with pump light provided by the pumping light sources controlled to be in the first state, each pumping light source having a corresponding predetermined number indicating a number of channels included in the optical signal at which pump power provided by the respective pumping light source is to be used for amplifying the optical signal; and means for determining which of said plurality of pumping light sources are controlled to be in the first state in accordance with the number of channels actually included in the optical signal and the predetermined number corresponding to each pumping light source, the number of pumping light sources providing pump light power to the optical amplifier to amplify the optical signal thereby being controlled in accordance with the number of channels actually included in the optical signal and so that, if required in accordance with the number of channels actually included in the optical signal, at least two pumping light sources concurrently provide pump light to the optical amplifier to amplify the optical signal.

26. An optical communication system according to claim 25, wherein said means for determining comprises:

means for receiving a supervisory signal transmitted from upstream of the optical amplifier, for determining the number of channels in the optical signal from the received supervisory signal and for determining which of the plurality of pumping light sources are to be controlled to be in the first state in accordance with the determined number of channels, the apparatus further comprising means for controlling the determined pumping light sources to be in the first state.

27. An optical communication system comprising:

an optical transmission line;

a transmitting section transmitting an optical signal through the transmission line, the optical signal having a variable number of channels associated with different wavelengths;
a receiving section receiving the optical signal transmitted through the transmission line;

an optical amplifier amplifying the optical signal after being transmitted by the transmitting section and before being received by the receiving section;

first and second pumping light sources each being controllable to be in a first state in which the respective pumping light source provides pump light to the optical amplifier or a second state in which the respective pumping light source does not provide pump light to the optical amplifier; and a controller controlling each of the first and second pumping light sources to be in the first or second state in accordance with a number of channels actually included in the optical signal, the optical amplifier amplifying the optical signal in accordance with pump light provided by each of the pumping light sources controlled to be in the first state, the number of pumping light sources providing pumping power to the optical amplifier to amplify the optical signal thereby being controlled in accordance with the number of channels actually included in the optical signal and so that, if required in accordance with the number of channels actually included in the optical signal, both the first and second pumping light sources concurrently provide pump light to the optical amplifier to amplify the optical signal.

28. An optical communication system according to claim 27, wherein the controller receives a supervisory signal transmitted from upstream of the optical amplifier, determines the number of channels in the optical signal from the received supervisory signal, determines which of the first and second pumping light sources are to be controlled to be in the first state in accordance with the determined number of channels, and then controls the determined pumping light sources to be in the first state.

29. An optical communication system according to claim 27, wherein the controller electrically controls each of the first and second pumping light sources to be in the first or second state.

30. An optical communication system according to claim 29, wherein the controller receives a supervisory signal transmitted from upstream of the optical amplifier, determines the number of channels in the optical signal from the received supervisory signal, determines which of the first and second pumping light sources are to be controlled to be in the first state in accordance with the determined number of channels, and then controls the determined pumping light sources to be in the first state.

31. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power supplied thereto, the optical amplifier having first and second pump light sources optically and separately connectable to the optical amplifier to provide said pump power, pump power provided by the first pump light source, without pump power provided by the second pump light source, being sufficient to amplify a predetermined number of channels in the optical signal, and pump power provided by the first and second pump light sources together being required to sufficiently amplify a number of channels in the optical signal greater than the predetermined number, which of the first and second pump light sources is connected to the optical amplifier being automatically determined based on the number of channels actually in the optical signal and the predetermined number, the number of pump light sources providing pump power to the optical amplifier to amplify the optical signal thereby being controlled in accordance with the number of channels actually included in the optical signal and so that, if required in accordance with the number of channels actually included in the optical signal, both the first and second pump light sources concurrently provide pump power to the optical amplifier to amplify the optical signal.

32. An optical communication system according to claim 31, wherein the optical amplifier comprises:

a controller which receives a supervisory signal transmitted from upstream of the optical amplifier, determines the number of channels in the optical signal from the received supervisory signal, determines which of the first and second pump light sources to connect to the optical amplifier in accordance with the determined number of channels, and then connects the determined pumping light sources to the optical amplifier.

33. An optical communication system according to claim 31, further comprising:
a controller having a constant gain mode in which the optical amplifier is controlled to amplify the optical signal with an approximately constant gain, the controller being operable in the constant gain mode when a number of pump light sources connected to the optical amplifier is adjusted in response to variation of the number of channels.

34. An optical communication system according to claim 33, wherein the optical amplifier comprises:
a controller which receives a supervisory signal transmitted from upstream of the optical amplifier, determines the number of channels in the optical signal from the received supervisory signal, determines which of the first and second pump light sources to connect to the optical amplifier in accordance with the determined number of channels, and then connects the determined pumping light sources to the optical amplifier.

35. An optical communication system according to claim 31, further comprising:
a controller having a predetermined level mode in which the optical amplifier is controlled to output the amplified optical signal with a predetermined level when the first and second pumping light sources are both connected to, and providing pump power to, the optical amplifier.

36. An optical communication system according to claim 35, wherein the optical amplifier comprises:
a controller which receives a supervisory signal transmitted from upstream of the optical amplifier, determines the number of channels in the optical signal from the received supervisory signal, determines which of the first and second pump light sources to connect to the optical amplifier in accordance with the determined number of channels, and then connects the determined pumping light sources to the optical amplifier.

37. An optical communication system comprising:
an optical transmission line;
a transmitting section transmitting an optical signal through the transmission line, the optical signal having a variable number of channels associated with different wavelengths;
a receiving section receiving the optical signal transmitted through the transmission line;
an optical amplifier amplifying the optical signal after being transmitted by the transmitting section and before being received by the receiving section, in accordance with pump power supplied thereto;
means for optically and separately connecting first and second pump light sources to the optical amplifier to provide said pump power, pump power provided by the first pump light source, without pump power provided by the second pump light source, being sufficient to amplify a predetermined number of channels in the optical signal, and pump power provided by the first and second light sources together being required to sufficiently amplify a number of channels in the optical signal greater than the predetermined number; and
means for determining which of the first and second pump light sources is connected to the optical amplifier based on the number of channels in the optical signal and the predetermined number,
the number of pumping light sources providing pump power to the optical amplifier to amplify the optical signal thereby being controlled in accordance with the number of channels included in the optical signal and so that, if required in accordance with the number of channels included in the optical signal, both the first and second pump light sources concurrently provide pumping power to the optical amplifier to amplify the optical signal.

38. An optical communication system according to claim 37, further comprising:
a controller having a constant gain mode in which the optical amplifier is controlled to amplify the optical signal with an approximately constant gain, the controller being operable in the constant gain mode when the number of the pumping light sources to be connected to the optical amplifier is adjusted in response to variation of the number of channels.

39. An optical communication system according to claim 37, further comprising:
a controller having a predetermined level mode in which the optical amplifier is controlled to output the amplified optical signal with a predetermined level when the first and second pump light sources are both connected to, and providing pump power to, the optical amplifier.

40. An optical communication system comprising:
an optical transmission line;
a transmitting section transmitting an optical signal through the transmission line, the optical signal having a predetermined number of channels;
a receiving section receiving the optical signal transmitted through the transmission line;
an optical amplifier amplifying the optical signal after being transmitted by the transmitting section and before being received by the receiving section;
a plurality of pump light sources; and
a controller controlling each pump light source to be in a first state in which the respective pump light source provides pump light to the optical amplifier or a second state in which the respective pump light source does not provide pump light to the optical amplifier, the optical amplifier amplifying the optical signal in accordance with pump light provided by the pump light sources controlled to be in the first state, wherein the controller determines which of the pump light sources are controlled to be in the first state in accordance with a number of channels actually included in the optical signal and an amount of pump power required to sufficiently amplify said number of channels.
the number of pumping light sources providing pump light to the optical amplifier to amplify the optical signal thereby being controlled in accordance with the number of channels actually included in the optical signal and so that, if required in accordance with the number of channels actually included in the optical signal, two or more pump light sources concurrently provide pump light to the optical amplifier to amplify the optical signal.

41. An optical communication system according to claim 40, wherein the controller receives a supervisory signal transmitted from upstream of the optical amplifier, determines the number of channels in the optical signal from the received supervisory signal, determines which of the plurality of pump light sources are to be in the first state in accordance with the determined number of channels, and then controls the determined pump light sources to be in the first state.

42. An optical communication system according to claim 40, further comprising:
a gain controller having a constant gain mode in which the optical amplifier is controlled to amplify the optical signal with an approximately constant gain, the gain controller being in the constant gain mode when the number of the pump light sources controlled to be in the first state is adjusted in response to variation of the number of channels.

43. An optical communication system according to claim 42, wherein the controller receives a supervisory signal transmitted from upstream of the optical amplifier, determines the number of channels in the optical signal from the received supervisory signal, determines which of the plurality of pump light sources are to be in the first state in accordance with the determined number of channels, and then controls the determined pump light sources to be in the first state.

44. An optical communication system according to claim 40, further comprising:
a level controller having a predetermined level mode in which the optical amplifier is controlled to output the amplified optical signal with a predetermined level when each of said plurality of pumping light sources is in the first state.

45. An optical communication system according to claim 44, wherein the controller receives a supervisory signal transmitted from upstream of the optical amplifier, determines the number of channels in the optical signal from the received supervisory signal, determines which of the plurality of pump light sources are to be in the first state in accordance with the determined number of channels, and then controls the determined pump light sources to be in the first state.

46. An optical communication system according to claim 40, wherein the controller electrically controls each of the pumping light sources to be in the first or second state.

47. An optical communication system according to claim 46, wherein the controller receives a supervisory signal transmitted from upstream of the optical amplifier, determines the number of channels in the optical signal from the received supervisory signal, determines which of the plurality of pump light sources are to be in the first state in accordance with the determined number of channels, and then controls the determined pump light sources to be in the first state.

48. An optical communication system comprising:
an optical transmission line;
a transmitting section transmitting an optical signal through the transmission line, the optical signal having a predetermined number of channels;
a receiving section receiving the optical signal transmitted through the transmission line;
an optical amplifier amplifying the optical signal after being transmitted by the transmitting section and before being received by the receiving section;
a plurality of pump light sources;
means for controlling each of the pump light sources to be in a first state in which the respective pump light source provides pump light to the optical amplifier or a second state in which the respective pump light source does not provide pump light to the optical amplifier, the optical amplifier amplifying the optical signal in accordance with pump light provided by the pump light sources controlled to be in the first state; and
means for determining a number of pump light sources controlled to be in the first state in accordance with the number of channels actually included in the optical signal and an amount of pump power required to sufficiently amplify said number of channels,
the number of pumping light sources providing pump light to the optical amplifier to amplify the optical signal thereby being controlled in accordance with the number of channels actually included in the optical signal and so that, if required in accordance with the number of channels actually included in the optical signal, two or more pump light sources concurrently provide pump light to the optical amplifier to amplify the optical signal.

49. An optical communication system comprising:
an optical transmission line;
a transmitting section transmitting an optical signal through the transmission line, the optical signal having a predetermined number of channels;
a receiving section receiving the optical signal transmitted through the transmission line;
an optical amplifier amplifying the optical signal after being transmitted by the transmitting section and before being received by the receiving section;
first and second pumping light sources each being controllable to be in a first state in which the respective pumping light source provides pump light to the optical amplifier or a second state in which the respective pumping light source does not provide pump light to the optical amplifier; and
a controller controlling each of the first and second pumping light sources to be in the first or second state in accordance with a number of channels actually included in the optical signal and an amount of pump power required to sufficiently amplify said number of channels, the optical amplifier amplifying the optical signal in accordance with pump light provided by each of the pump light sources controlled to be in the first state,
the number of pumping light sources providing pump light to the optical amplifier to amplify the optical signal thereby being controlled in accordance with the number of channels actually included in the optical signal and so that, if required in accordance with the number of channels actually included in the optical signal, both the first and second pumping light sources concurrently provide pump light to the optical amplifier to amplify the optical signal.

50. An optical communication system according to claim 49, wherein the controller receives a supervisory signal transmitted from upstream of the optical amplifier, determines the number of channels in the optical signal from the received supervisory signal, determines which of the first and second pumping light sources are to be in the first state in accordance with the determined number of channels, and then controls the determined pump light sources to be in the first state.

51. An optical communication system according to claim 49, wherein the controller electrically controls each of the first and second pump light sources to be in the first or second state.

52. An optical communication system according to claim 51, wherein the controller receives a supervisory signal transmitted from upstream of the optical amplifier, determines the number of channels in the optical signal from the received supervisory signal, determines which of the first and second pumping light sources are to be in the first state in accordance with the determined number of channels, and then controls the determined pump light sources to be in the first state.

53. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power provided to the optical amplifier;

a first pump light source controllable to be in a first mode in which the first pump light source provides pump power to the optical amplifier and a second mode in which the first pump light source does not provide pump light to the optical amplifier, the first pump light source having a corresponding predetermined number of channels indicating a number of channels included in the optical signal at which pump power provided by the first pump light source is to be used for amplifying the optical signal;

a second pump light source controllable to be in a first mode in which the second pump light source provides pump power to the optical amplifier and a second mode in which the second pump light source does not provide pump light to the optical amplifier, the second pump light source having a corresponding predetermined number of channels indicating a number of channels included in the optical signal at which pump power provided by the second pump light source is to be used for amplifying the optical signal; and a controller controlling each of the first and second pump light sources to be in either the first or second mode in accordance with a number of channels actually in the optical signal, the predetermined number corresponding to the first pump light source and the predetermined number corresponding to the second pump light source, the number of pump light sources providing pump power to the optical amplifier to amplify the optical signal thereby being controlled in accordance with the number of channels actually included in the optical signal and so that, if required in accordance with the number of channels actually included in the optical signal, both the first and second pump light sources concurrently provide pump power to the optical amplifier to amplify the optical signal.

54. An optical communication system according to claim 53, wherein the controller receives a supervisory signal transmitted from upstream of the optical amplifier, determines the number of channels in the optical signal from the received supervisory signal, determines which of the first and second pump light sources are to be in the first mode in accordance with the determined number of channels, and then controls the determined pump light sources to be in the first mode.

55. An optical communication system as in claim 53, wherein the predetermined number corresponding to the second pump light source is higher than the predetermined number corresponding to the second pump light source.

56. An optical communication system according to claim 55, wherein the controller receives a supervisory signal transmitted from upstream of the optical amplifier, determines the number of channels in the optical signal from the received supervisory signal, determines which of the first and second pump light sources are to be in the first mode in accordance with the determined number of channels, and then controls the determined pump light sources to be in the first mode.

57. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power provided thereto;

first and second pump light sources to provide said pump power, pump power of the first pump light source, but not of the second pump light source, being required to sufficiently amplify the optical signal when the number of channels in the optical signal is less then or equal to a predetermined number, pump power provided by both the first and second pump light sources being required to sufficiently amplify the optical signal when the number of channels in the optical signal is greater than the predetermined number; and a controller controlling the first and second pump light sources in accordance with variations in the number of channels in the optical signal so that the first pump source provides pump power to the optical amplifier, and the second pump source does not provide pump power to the optical amplifier, when the number of channels actually included in the optical signal is less then or equal to the predetermined number, and so that the first and second pump sources concurrently provide pump power to the optical amplifier when the number of channels actually included in the optical signal is greater than the predetermined number.

58. An optical communication system according to claim 57, wherein the controller receives a supervisory signal transmitted from upstream of the optical amplifier, determines the variation in the number of channels in the optical signal from the received supervisory signal, and controls the first and second pump light sources in accordance with the determined variation.

59. An optical communication system as in claim 57, wherein the controller continuously monitors the number of channels actually included in the optical signal, and electronically controls the second pump light source to provide power, or to not provide power, in accordance with the number of channels actually included in the optical signal and the predetermined number.

60. An optical communication system according to claim 59, wherein the controller receives a supervisory signal transmitted from upstream of the optical amplifier, determines the variation in the number of channels in the optical signal from the received supervisory signal, and controls the first and second pump light sources in accordance with the determined variation.

61. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power provided thereto;

first and second pump light sources to provide said pump power, pump power of the first pump light source, but not of the second pump light source, being required to sufficiently amplify the optical signal when the number of channels in the optical signal is less then or equal to a predetermined number, pump power provided by both the first and second pump light sources being required to sufficiently amplify the optical signal when the number of channels in the optical signal is greater than the predetermined number; and means for controlling the first and second pump light sources in accordance with variations in the number of channels in the optical signal so that the first pump source provides pump power to the optical amplifier, and the second pump source does not provide pump power to the optical amplifier, when the number of channels actually included in the optical signal is less then or equal to the predetermined number, and so that the first and second pump sources concurrently provide pump power to the optical amplifier when the number of channels actually included in the optical signal is greater than the predetermined number.

62. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power provided thereto;

a plurality of pump light sources to provide said pump power, pump power of at least one pump light source but not all of the pump light sources being required to sufficiently amplify the optical signal when the number of channels in the optical signal is less then or equal to a predetermined number, pump power provided by said at least one pump light source plus pump light power provided by at least one other pump light source of said plurality of pump light sources being required to sufficiently amplify the optical signal when the number of channels in the optical signal is greater than the predetermined number; and a controller controlling the plurality of pump light sources in accordance with variations in the number of channels in the optical signal so that said at least one pump source but not all of the pump light sources provides pump power to the optical amplifier when the number of channels actually included in the optical signal is less then or equal to the predetermined number, and said at least one pump light source plus pump light power provided by at least one other pump light source of said plurality of pump light sources concurrently provide pump power to the optical amplifier when the number of channels actually included in the optical signal is greater than the predetermined number.

63. An optical communication system according to claim 62, wherein the controller receives a supervisory signal transmitted from upstream of the optical amplifier, determines the variation in the number of channels in the optical signal from the received supervisory signal, and controls the plurality of pump light sources in accordance with the determined variation.

64. An optical communication system as in claim 62, wherein the controller electronically controls the plurality of pump light sources in accordance with automatic monitoring of the actual number of channels in the optical signal.

65. An optical communication system according to claim 64, wherein the controller receives a supervisory signal transmitted from upstream of the optical amplifier, determines the variation in the number of channels in the optical signal from the received supervisory signal, and controls the plurality of pump light sources in accordance with the determined variation.

66. An optical communication system comprising:

an optical transmission line;

a transmitting section transmitting an optical signal through the transmission line, the optical signal having a variable number of channels associated with different wavelengths;

a receiving section receiving the optical signal transmitted through the transmission line;

an optical amplifier amplifying the optical signal after being transmitted by the transmitting section and before being received by the receiving section, in accordance with pump power provided thereto;

a plurality of pump light sources to provide said pump power, pump power of at least one pump light source but not all of the pump light sources being required to sufficiently amplify the optical signal when the number of channels in the optical signal is less then or equal to a predetermined number, pump power provided by said at least one pump light source plus pump light power provided by at least one other pump light source of said plurality of pump light sources being required to sufficiently amplify the optical signal when the number of channels in the optical signal is greater than the predetermined number; and means for controlling the plurality of pump light sources in accordance with variations in the number of channels in the optical signal so that said at least one pump source but not all of the pump light sources provides pump power to the optical amplifier when the number of channels actually included in the optical signal is less then or equal to the predetermined number, and so that said at least one pump light source plus at least one other pump light source of said plurality of pump light sources concurrently provides pump power to the optical amplifier when the number of channels actually included in the optical signal is greater than the predetermined number.

67. An optical communication system comprising:

an optical transmission line;

a transmitting section transmitting an optical signal through the transmission line, the optical signal having a predetermined number of channels;

a receiving section receiving the optical signal transmitted through the transmission line;

an optical amplifier amplifying the optical signal after being transmitted by the transmitting section and before being received by the receiving section;

a plurality of pump light sources; and a controller controlling each pump light sources to be in a first state in which the respective pump light source provides pump light to the optical amplifier or a second state in which the respective pump light source does not provide pump light to the optical amplifier, the optical amplifier amplifying the optical signal in accordance with pump light provided by the pump light sources controlled to be in the first state, wherein the controller automatically determines which of the pump light sources are controlled to be in the first state, and then controls the determined pump light sources in real-time to be in the first state, in accordance with a signal transmitted to the controller indicating the number of channels actually included in the optical signal and in accordance with an amount of pump power required to sufficiently amplify said number of channels, the number of pumping light sources providing pumping power to the optical amplifier to amplify the optical signal thereby being controlled in accordance with the number of channels actually included in the optical signal and so that, if required in accordance with the number of channels actually included in the optical signal, two or more pump light sources concurrently provide pump light to the optical amplifier to amplify the optical signal.

* * * * *

UNITED STATES PATENT AND TRADEMARK OFFICE
CERTIFICATE OF CORRECTION

PATENT NO. : 6,873,457 B2
DATED : March 29, 2005
INVENTOR(S) : Susumu Kinoshita et al.

It is certified that error appears in the above-identified patent and that said Letters Patent is hereby corrected as shown below:

Column 37,
Lines 55-56, change "pumping power" to -- pump light --.

Column 44,
Lines 20 and 33, change "then" to -- than --.

Column 45,
Lines 9, 22, 43 and 57, change "then" to -- than --.

Column 48,
Line 2, change "pumping power" to -- pump light --.

Signed and Sealed this

Twenty-second Day of November, 2005

JON W. DUDAS
*Director of the United States Patent and Trademark Office*